US012388704B2

(12) United States Patent
Bharrat et al.

(10) Patent No.: US 12,388,704 B2
(45) Date of Patent: Aug. 12, 2025

(54) LEARNING-BASED AUTOMATED CALL FLOW TESTING

(71) Applicant: Ribbon Communications Operating Company, Inc., Westford, MA (US)

(72) Inventors: Shaun Jaikarran Bharrat, Edison, NJ (US); Sanchit Chaudhary, Acton, MA (US); Subhransu S. Nayak, Acton, MA (US); Rajangam Subramanian, Bangalore (IN); Subhashis Chand, Bangalore (IN); André Ouellet, Ottawa (CA); Gopannan Ramachandran, Bangalore (IN)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 18/407,380

(22) Filed: Jan. 8, 2024

(65) Prior Publication Data

US 2025/0219895 A1   Jul. 3, 2025

Related U.S. Application Data

(60) Provisional application No. 63/615,256, filed on Dec. 27, 2023.

(51) Int. Cl.
*H04L 41/0631* (2022.01)
*H04L 65/1104* (2022.01)

(52) U.S. Cl.
CPC ...... *H04L 41/0631* (2013.01); *H04L 65/1104* (2022.05)

(58) Field of Classification Search
CPC .......................... H04L 41/0631; H04L 65/1104
(Continued)

(56) References Cited

U.S. PATENT DOCUMENTS 10,791,221 B1 *  9/2020  Vislocky .............. H04M 3/5116
11,509,704 B1 * 11/2022  Menon ................ H04L 65/1069
(Continued)

FOREIGN PATENT DOCUMENTS

WO        2025012968 A1    1/2025

OTHER PUBLICATIONS

Caixia Chi, Dong Wang, Ruibing Hao and Wei Zhou, "Performance evaluation of SIP servers," 2008 Third International Conference on Communications and Networking in China, Hangzhou, 2008, pp. 674-679, (Year: 2008).*

(Continued)

*Primary Examiner* — Taylor A Elfervig
(74) *Attorney, Agent, or Firm* — Straub & Straub; Stephen T. Straub; Michael P. Straub

(57) ABSTRACT

The present invention relates to methods, systems, and apparatus for learning-based automated call flow testing. An exemplary method of testing a Session Initiation Protocol (SIP) call processing entity includes the steps of generating a first test case based on a first reference call flow record for a first SIP call or a trace record for the first SIP call; executing the first test case which includes sending one or more SIP messages to the first SIP call processing entity; generating a first test case call flow record for a first SIP test call corresponding to the first test case; and determining whether or not the first SIP call processing entity failed the first test case based on a comparison of the first test case call flow record and the first reference call flow record.

23 Claims, 45 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2004/0160896 A1* | 8/2004 | Luna | H04M 3/2236 |
| | | | 370/235 |
| 2007/0008892 A1 | 1/2007 | Gilfix et al. | |
| 2021/0153042 A1 | 5/2021 | Briggs | |
| 2021/0385331 A1 | 12/2021 | Kovvali et al. | |
| 2022/0247678 A1* | 8/2022 | Atwal | H04B 7/18519 |
| 2023/0081333 A1 | 3/2023 | Menon et al. | |

OTHER PUBLICATIONS

Rozhon, J., Voznak, M. (2011). SIP Registration Burst Load Test. In: Snasel, V., Platos, J., El-Qawasmeh, E. (eds) Digital Information Processing and Communications. ICDIPC 2011. Communications in Computer and Information Science, vol. 189. Springer, Berlin, Heidelberg. p. 329-330 (Year: 2011).*

Voznak, M., Rozhon, J. Approach to stress tests in SIP environment based on marginal analysis. Telecommun Syst 52, 1583-1593 (2013) (Year: 2013).*

Voznak et al., "Methodology for SIP Infrastructure Performance Testing", WSEAS Transactions on Computers, Department of Telecommunications, VSB—Technical University of Ostrava, Issue 9, vol. 9, Sep. 2010 (Year: 2010).*

Voznak et al., "SIP Infrastructure Performance Testing", Proceedings of the 9th WSEAS International Conference on Telecommunications and Informatics, Department of Telecommunications, VSB—Technical University of Ostrava, p. 153-158, May 2010 (Year: 2010).*

T. Li, Z. Wang and X. Yin, "SIP conformance testing based on TTCN-2," in Tsinghua Science and Technology, vol. 12, No. S1, pp. 223-228, Jul. 2007, (Year: 2007).*

Rosenberg, et al., SIP: Session Initiation Protocol, Request for Comment (RFC) 3261, Jun. 2002, Internet Engineering Task Force (IETF), 269 pages.

Begen, et al., SDP: Session Description Protocol, Request for Comment (RFC) 8866, Jan. 2021, Internet Engineering Task Force (IETF), 57 pages.

Gayraud, et al., SIPp reference documentation, downloaded from https://sipp.readthedocs.io/en/latest/perftest.html on Oct. 25, 2023, 76 pages.

3rd Generation Partnership Project; Technical Specification Group Services and System Aspects; Telecommunication management; Subscriber and equipment trace; Trace control and configuration management (Release 18), 3GPP TS 32.422 V18.0.0, Sep. 2023, 236 pages.

Worley Nortel Networks D: "SIP Tracing Facility; draft-worley-trace-00.txt", SIP Tracing Facility; Draft-Worley-Trace -00. TXT, Internet Engineering Task Force, IETF; Standardworkingdraft, Internet Society (ISOC) 4, Rue Des Falaises CH- 1205 Geneva, Switzerland, Mar. 3, 2009.

PCT Invitation to Pay Additional Fees and, Where Applicable, Protest Fee with Annex to Form PCT/ISA/206 Communication Relating to the Results of the Partial International Search, Apr. 1, 2025, 17 pages.

Notification of Transmittal of the International Search Report and the Written Opinion of the International Searching Authority, International Search Report and Written Opinion of the International Searching Authority from PCT/US2024/061986, dated May 23, 2025, 22 pages.

* cited by examiner

```
SIP/2.0 200 OK
Allow: INVITE, ACK, CANCEL, BYE, UPDATE, NOTIFY, OPTIONS, REFER, REGISTER
Call-ID: 1d0773d6843aba30
Contact: <sip:10.1.1.74:5060;transport=UDP>
Cotent-Length: 192
Content-Type: application/sdp
CSeq: 1 INVITE
From: <sip:1408348111201.1.1.74>;tag=b87f9f19
Server: NET UX 2.2.1v187 UX
Supported: replaces, uodate, 100rel
To: <sip:3539;usrparam:pass@10.1.1.74>;tag=a01014a-1856
Via: SIP/2.0/UDP 10.1.1.90:6162;branch=z9hG4bK-d87443-840323593-1--d87443-;rport
```

FIGURE 18

| | 2002 | 2004 | 2006 | 2008 | 2010 | 2012 | 2014 |
|---|---|---|---|---|---|---|---|
| | TRANSFORM ID | CONFIGURED IP INTERFACE ID | CURRENT CONFIGURATION PATH NAME | CURRENT IP ADDRESS OR VARIABLE | POST-TRANSFORM IP ADDRESS OR VARIABLE | CURRENT IP PREFIX OR VARIABLE | POST-TRANSFORM IP PREFIX OR VARIABLE |
| 2016 | TRANSFORM ID 1B | IP INTERFACE 1 | FULL CONFIGURATION PATH NAME FOR IP INTERFACE 1 | CURRENT IP ADDRESS OR VARIABLE FOR IP INTERFACE 1 | POST-TRANSFORM IP ADDRESS OR VARIABLE FOR IP INTERFACE 1 | CURRENT IP PREFIX OR VARIABLE FOR IP INTERFACE 1 | POST-TRANSFORM IP PREFIX OR VARIABLE FOR IP INTERFACE 1 |
| 2018 | TRANSFORM ID 2B | IP INTERFACE 2 | FULL CONFIGURATION PATH NAME FOR IP INTERFACE 2 | CURRENT IP ADDRESS OR VARIABLE FOR IP INTERFACE 2 | POST-TRANSFORM IP ADDRESS OR VARIABLE FOR IP INTERFACE 2 | CURRENT IP PREFIX OR VARIABLE FOR IP INTERFACE 2 | POST-TRANSFORM IP PREFIX OR VARIABLE FOR IP INTERFACE 2 |
| 2020 | ... | ... | ... | ... | ... | ... | ... |
| 2022 | TRANSFORM ID NB | IP INTERFACE N | FULL CONFIGURATION PATH NAME FOR INTERFACE N | CURRENT IP ADDRESS OR VARIABLE FOR IP INTERFACE N | POST-TRANSFORM IP ADDRESS OR VARIABLE FOR IP INTERFACE N | CURRENT IP PREFIX OR VARIABLE FOR IP INTERFACE N | POST-TRANSFORM IP PREFIX OR VARIABLE FOR IP INTERFACE N |

FIGURE 20

AUDIT RESULT REPORT

2300

| Column | Type | Description | Default Value | Example / Remarks |
|---|---|---|---|---|
| #BINDER_ID | varchar(16) | Automatically generated UUID of length 8 | | 0a740a46 |
| #EXECUTION_ID | varchar | Execution Id | | 20001 |
| #RUN_ID | varchar | Run Id | | 20230725030101 |
| #TEST_SUITE_ID | varchar | Test Suite ID | | 1 |
| #TC_ID | varchar | GCID in case of SBC jobs | | 0x00000120 |
| #ITERATION | integer | Iterate count | | 1 |
| AUDIT_RESULT | varchar | Pass/Fail | | |
| TOTAL_FEATURE_COUNT | integer | Count of total features | 0 | |
| TOTAL_MATCH_COUNT | integer | Count of total feature that is matched | 0 | |
| TC_FEATURES_NOTMATCH | jsonb | Features not match | Null | {<br>"Signaling Error": [<br>{<br>"Testcase Id": 1,<br>"Call Leg": "1",<br>"Side": "egress",<br>"Msg Index": "1",<br>"Msg": "INVITE",<br>"Header":<br>"1x_original_callid",<br>"Header Index": "",<br>"Param": "",<br>"Baseline Value":<br>"False",<br>"Testrun Value": "True"<br>}<br>],<br>"SDP Error": [<br>{<br>"Testcase Id": "1",<br>"Call Leg": "1",<br>"Side": "egress",<br>"Msg Index": "1",<br>"Msg": "INVITE",<br>"level": "media",<br>"mediaIndex": "1",<br>"codec": "",<br>"attribute": "mode",<br>"param": "",<br>"Baseline Value":<br>"NA",<br>"Testrun Value":<br>"sendrecv"<br>}<br>} |
| AUDIT_ERROR_DETAILS | varchar | Error description | Null | "\n\t\tSIP Header or parameter error in ingress |

Sonus Networks, Inc.0000000001600000000000000000000128V12.00.00R000
00000000000000000000000000000000TRC20230808130818000000000000000
Cloud Instance, Unknown
858 08082023 130838.205405:1.01.00.00622.MAJOR  .SIPSG:CALL:FILTER=test GCID=0x00000036: EXTRA
INFO: SipSgLogLevel4 - gcid=0x00000036 Ingress: received msg for CallId:1-1966@10.52.155.12 from IP/
port:10.52.155.12/7033, Local IP/port:10.52.155.16/5060, SMM: INBOUND PRE-SMM, TRUNKGROUP:
CTS_TG_INTERNAL, MSGID: 622 PART: 001-001
RAW PDU:
INVITE sip:9896543210@10.52.155.16:5060 SIP/2.0
Via: SIP/2.0/UDP 10.52.155.12:7033;branch=z9hG4bK-1966-1-0
From: sipp <sip:9964608271@10.52.155.12:7033>;tag=1966SIPpTag001
To: sut <sip:9896543210@10.52.155.16:5060>
Call-ID: 1-1966@10.52.155.12
CSeq: 1 INVITE
Contact: sip:sipp@10.52.155.12:7033
Max-Forwards: 70
Subject: Performance Test
Content-Type: application/sdp
Content-Length:   135 v=0
o=user1 53655765 2353687637 IN IP4 10.52.155.12
s=-
c=IN IP4 10.52.155.12
t=0 0
m=audio 9898 RTP/AVP 0
a=rtpmap:0 PCMU/8000

610 08082023 130838.206439:1.01.00.00623.MAJOR  .SIPSG:CALL:FILTER=test GCID=0x00000036: EXTRA
INFO: SipSgLogLevel4 - gcid=0x00000036 Ingress: sent msg for CallId:1-1966@10.52.155.12 to IP/port:10.52.155.12/
7033, Local IP/port:10.52.155.16/5060, SMM: OUTBOUND POST-SMM, TRUNKGROUP: CTS_TG_INTERNAL,
MSGID: 623 PART: 001-001
RAW PDU:
SIP/2.0 100 Trying
Via: SIP/2.0/UDP 10.52.155.12:7033;branch=z9hG4bK-1966-1-0
From: sipp <sip:9964608271@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 1 INVITE
Content-Length: 0

```
1530 08082023 130838.316862:1.01.00.00624.MAJOR  .SIPSG:CALL:FILTER=test GCID=0x00000036: EXTRA INFO:
SipSgLogLevel4 - gcid=0x00000036 Egress: sent msg for CallId:54_1173854251563fe0c@10.52.156.16 to IP/
port:10.52.155.13/5555, Local IP/port:10.52.156.16/5060, SMM: OUTBOUND POST-SMM, TRUNKGROUP:
CTS_TG_EXTERNAL, MSGID: 624 PART: 001-001
RAW PDU:
INVITE sip:9896543210;phone-context=private@10.52.155.13:5555;user=phone SIP/2.0
Via: SIP/2.0/UDP 10.52.156.16:5060;branch=z9hG4bK00B007d736c13125dbe_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>
Call-ID: 54_1173854251563fe0c@10.52.156.16
CSeq: 828935 INVITE
Max-Forwards: 70
Allow:
INVITE,ACK,CANCEL,BYE,REGISTER,REFER,INFO,SUBSCRIBE,NOTIFY,PRACK,UPDATE,OPTIONS,MESSAGE,PUBLISH
Accept: application/sdp, application/isup, application/dtmf, application/dtmf-relay, multipart/mixed
Contact: "sipp" <sip:9964608271@10.52.156.16:5060>
P-Preferred-Identity: "sipp" <sip:9964608271;phone-context=private@10.52.156.16:5060;user=phone>
Supported: timer,100rel,precondition,replaces
Session-Expires: 1800
Min-SE: 90
Content-Length:  252
Content-Disposition: session; handling=required
Content-Type: application/sdp v=0
o=Sonus_UAC 942478 153557 IN IP4 10.52.156.16
s=SIP Media Capabilities
c=IN IP4 10.52.156.17
t=0 0
m=audio 1136 RTP/AVP 0 8 18
a=rtpmap:0 PCMU/8000
a=rtpmap:8 PCMA/8000
a=rtpmap:18 G729/8000
a=fmtp:18 annexb=no
a=sendrecv
a=maxptime:10

800 08082023 130838.329408:1.01.00.00625.MAJOR  .SIPSG:CALL:FILTER=test GCID=0x00000036: EXTRA INFO:
SipSgLogLevel4 - gcid=0x00000036 Egress: received msg for CallId:54_1173854251563fe0c@10.52.156.16 from IP/
port:10.52.155.13/5555, Local IP/port:10.52.156.16/5060, SMM: INBOUND PRE-SMM, TRUNKGROUP: CTS_TG_EXTERNAL,
MSGID: 625 PART: 001-001
RAW PDU:
SIP/2.0 301 Moved Permanently
Via: SIP/2.0/UDP 10.52.156.16:5060;branch=z9hG4bK00B007d736c13125dbe_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>
Call-ID: 54_1173854251563fe0c@10.52.156.16
CSeq: 828935 INVITE
Contact: <sip:9896543212@10.52.155.11:5555>
Max-Forwards: 70
Subject: Performance Test
Content-Length: 0
```

```
771 08082023 130838.332456:1.01.00.00626.MAJOR  .SIPSG:CALL:FILTER=test GCID=0x00000036: EXTRA INFO:
SipSgLogLevel4 - gcid=0x00000036 Egress: sent msg for CallId:54_1173854251563fe0c@10.52.156.16 to IP/port:10.52.155.13/
5555, Local IP/port:10.52.156.16/5060, SMM: OUTBOUND POST-SMM, TRUNKGROUP: CTS_TG_EXTERNAL, MSGID: 626
PART: 001-001
RAW PDU:
ACK sip:9896543210;phone-context=private@10.52.155.13:5555;user=phone SIP/2.0
Via: SIP/2.0/UDP 10.52.156.16:5060;branch=z9hG4bK00B007d736c13125dbe_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>
Call-ID: 54_1173854251563fe0c@10.52.156.16
CSeq: 828935 ACK
Max-Forwards: 70
Content-Length: 0

1497 08082023 130838.339343:1.01.00.00627.MAJOR  .SIPSG:CALL:FILTER=test GCID=0x00000036: EXTRA INFO:
SipSgLogLevel4 - gcid=0x00000036 Egress: sent msg for CallId:54_1173854251563fe0c@10.52.156.16 to IP/port:10.52.155.11/
5555, Local IP/port:10.52.156.16/5060, SMM: OUTBOUND POST-SMM, TRUNKGROUP: CTS_TG_EXTERNAL, MSGID: 627
PART: 001-001
RAW PDU:
INVITE sip:9896543212@10.52.155.11:5555 SIP/2.0
Via: SIP/2.0/UDP 10.52.156.16:5060;branch=z9hG4bK00B007e2688cf19d76d_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>
Call-ID: 54_1173854251563fe0c@10.52.156.16
CSeq: 828936 INVITE
Max-Forwards: 70
Allow:
INVITE,ACK,CANCEL,BYE,REGISTER,REFER,INFO,SUBSCRIBE,NOTIFY,PRACK,UPDATE,OPTIONS,MESSAGE,PUBLISH
Accept: application/sdp, application/isup, application/dtmf, application/dtmf-relay, multipart/mixed
Contact: "sipp" <sip:9964608271@10.52.156.16:5060>
P-Preferred-Identity: "sipp" <sip:9964608271;phone-context=private@10.52.156.16:5060;user=phone>
Supported: timer,100rel,precondition,replaces
Session-Expires: 1800
Min-SE: 90
Content-Length: 252
Content-Disposition: session; handling=required
Content-Type: application/sdp v=0
o=Sonus_UAC 942478 153557 IN IP4 10.52.156.16
s=SIP Media Capabilities
c=IN IP4 10.52.156.17
t=0 0
m=audio 1136 RTP/AVP 0 8 18
a=rtpmap:0 PCMU/8000
a=rtpmap:8 PCMA/8000
a=rtpmap:18 G729/8000
a=fmtp:18 annexb=no
a=sendrecv
a=maxptime:10
```

```
767 08082023 130838.341130:1.01.00.00628.MAJOR  .SIPSG:CALL:FILTER=test GCID=0x00000036: EXTRA INFO:
SipSgLogLevel4 - gcid=0x00000036 Ingress: sent msg for CallId:1-1966@10.52.155.12 to IP/port:10.52.155.12/7033, Local IP/
port:10.52.155.16/5060, SMM: OUTBOUND POST-SMM, TRUNKGROUP: CTS_TG_INTERNAL, MSGID: 628 PART: 001-001
RAW PDU:
SIP/2.0 183 Session Progress
Via: SIP/2.0/UDP 10.52.155.12:7033;branch=z9hG4bK-1966-1-0
From: sipp <sip:9964608271@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 1 INVITE
Contact: <sip:9896543210@10.52.155.16:5060>
Allow:
INVITE,ACK,CANCEL,BYE,REGISTER,REFER,INFO,SUBSCRIBE,NOTIFY,PRACK,UPDATE,OPTIONS,MESSAGE,PUBLISH
Content-Length: 0

769 08082023 130838.342538:1.01.00.00629.MAJOR  .SIPSG:CALL:FILTER=test GCID=0x00000036: EXTRA INFO:
SipSgLogLevel4 - gcid=0x00000036 Egress: received msg for CallId:54_1173854251563fe0c@10.52.156.16 from IP/
port:10.52.155.11/5555, Local IP/port:10.52.156.16/5060, SMM: INBOUND PRE-SMM, TRUNKGROUP: CTS_TG_EXTERNAL,
MSGID: 629 PART: 001-001
RAW PDU:
SIP/2.0 180 Ringing
Via: SIP/2.0/UDP 10.52.156.16:5060;branch=z9hG4bK00B007e2688cf19d76d_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>;tag=1962SIPpTag011
Call-ID: 54_1173854251563fe0c@10.52.156.16
CSeq: 828936 INVITE
Contact: <sip:10.52.155.11:5555;transport=UDP>
Content-Length: 0

926 08082023 130838.345286:1.01.00.00630.MAJOR  .SIPSG:CALL:FILTER=test GCID=0x00000036: EXTRA INFO:
SipSgLogLevel4 - gcid=0x00000036 Egress: received msg for CallId:54_1173854251563fe0c@10.52.156.16 from IP/
port:10.52.155.11/5555, Local IP/port:10.52.156.16/5060, SMM: INBOUND PRE-SMM, TRUNKGROUP: CTS_TG_EXTERNAL,
MSGID: 630 PART: 001-001
RAW PDU:
SIP/2.0 200 OK
Via: SIP/2.0/UDP 10.52.156.16:5060;branch=z9hG4bK00B007e2688cf19d76d_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>;tag=1962SIPpTag011
Call-ID: 54_1173854251563fe0c@10.52.156.16
CSeq: 828936 INVITE
Contact: <sip:10.52.155.11:5555;transport=UDP>
Content-Type: application/sdp
Content-Length:  135 v=0
o=user1 53655765 2353687637 IN IP4 10.52.155.11
s=-
c=IN IP4 10.52.155.11
t=0 0
m=audio 8988 RTP/AVP 0
a=rtpmap:0 PCMU/8000
```

```
758 08082023 130838.368650:1.01.00.00631.MAJOR  .SIPSG:CALL:FILTER=test GCID=0x00000036: EXTRA INFO:
SipSgLogLevel4 - gcid=0x00000036 Ingress: sent msg for CallId:1-1966@10.52.155.12 to IP/port:10.52.155.12/7033, Local IP/
port:10.52.155.16/5060, SMM: OUTBOUND POST-SMM, TRUNKGROUP: CTS_TG_INTERNAL, MSGID: 631 PART: 001-001
RAW PDU:
SIP/2.0 180 Ringing
Via: SIP/2.0/UDP 10.52.155.12:7033;branch=z9hG4bK-1966-1-0
From: sipp <sip:9964608271@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 1 INVITE
Contact: <sip:9896543210@10.52.155.16:5060>
Allow:
INVITE,ACK,CANCEL,BYE,REGISTER,REFER,INFO,SUBSCRIBE,NOTIFY,PRACK,UPDATE,OPTIONS,MESSAGE,PUBLISH
Content-Length: 0

1170 08082023 130838.381943:1.01.00.00632.MAJOR  .SIPSG:CALL:FILTER=test GCID=0x00000036: EXTRA INFO:
SipSgLogLevel4 - gcid=0x00000036 Ingress: sent msg for CallId:1-1966@10.52.155.12 to IP/port:10.52.155.12/7033, Local IP/
port:10.52.155.16/5060, SMM: OUTBOUND POST-SMM, TRUNKGROUP: CTS_TG_INTERNAL, MSGID: 632 PART: 001-001
RAW PDU:
SIP/2.0 200 OK
Via: SIP/2.0/UDP 10.52.155.12:7033;branch=z9hG4bK-1966-1-0
From: sipp <sip:9964608271@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 1 INVITE
Accept: application/sdp, application/isup, application/dtmf, application/dtmf-relay, multipart/mixed
Contact: <sip:9896543210@10.52.155.16:5060>
Allow:
INVITE,ACK,CANCEL,BYE,REGISTER,REFER,INFO,SUBSCRIBE,NOTIFY,PRACK,UPDATE,OPTIONS,MESSAGE,PUBLISH
Supported: timer,replaces
Session-Expires: 1800;refresher=uas
Content-Length:  181
Content-Disposition: session; handling=required
Content-Type: application/sdp v=0
o=Sonus_UAC 378742 297368 IN IP4 10.52.155.16
s=SIP Media Capabilities
c=IN IP4 10.52.155.17
t=0 0
m=audio 1116 RTP/AVP 0
a=rtpmap:0 PCMU/8000
a=sendrecv
a=maxptime:10

760 08082023 130838.381949:1.01.00.00633.MAJOR  .SIPSG:CALL:FILTER=test GCID=0x00000036: EXTRA INFO:
SipSgLogLevel4 - gcid=0x00000036 Egress: sent msg for CallId:54_1173854251563fe0c@10.52.156.16 to IP/
port:10.52.155.11/5555, Local IP/port:10.52.156.16/5060, SMM: OUTBOUND POST-SMM, TRUNKGROUP:
CTS_TG_EXTERNAL, MSGID: 633 PART: 001-001
RAW PDU:
ACK sip:10.52.155.11:5555;transport=UDP SIP/2.0
Via: SIP/2.0/UDP 10.52.156.16:5060;branch=z9hG4bK00B007fbbbc8a4b31f8_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>;tag=1962SIPpTag011
Call-ID: 54_1173854251563fe0c@10.52.156.16
CSeq: 828936 ACK
Max-Forwards: 70
Content-Length: 0
```

710 08082023 130838.381953:1.01.00.00634.MAJOR  .SIPSG:CALL:FILTER=test GCID=0x00000036: EXTRA INFO:
SipSgLogLevel4 - gcid=0x00000036 Ingress: received msg for CallId:1-1966@10.52.155.12 from IP/port:10.52.155.12/
7033, Local IP/port:10.52.155.16/5060, SMM: INBOUND PRE-SMM, TRUNKGROUP: CTS_TG_INTERNAL, MSGID: 634
PART: 001-001
RAW PDU:
ACK sip:9896543210@10.52.155.16:5060 SIP/2.0
Via: SIP/2.0/UDP 10.52.155.12:7033;branch=z9hG4bK-1966-1-5
From: sipp <sip:sipp@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 1 ACK
Contact: sip:sipp@10.52.155.12:7033
Max-Forwards: 70
Subject: Performance Test
Content-Length: 0

710 08082023 130908.342851:1.01.00.00635.MAJOR  .SIPSG:CALL:FILTER=test GCID=0x00000036: EXTRA INFO:
SipSgLogLevel4 - gcid=0x00000036 Ingress: received msg for CallId:1-1966@10.52.155.12 from IP/port:10.52.155.12/
7033, Local IP/port:10.52.155.16/5060, SMM: INBOUND PRE-SMM, TRUNKGROUP: CTS_TG_INTERNAL, MSGID: 635
PART: 001-001
RAW PDU:
BYE sip:9896543210@10.52.155.16:5060 SIP/2.0
Via: SIP/2.0/UDP 10.52.155.12:7033;branch=z9hG4bK-1966-1-8
From: sipp <sip:sipp@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 3 BYE
Contact: sip:sipp@10.52.155.12:7033
Max-Forwards: 70
Subject: Performance Test
Content-Length: 0

597 08082023 130908.375458:1.01.00.00636.MAJOR  .SIPSG:CALL:FILTER=test GCID=0x00000036: EXTRA INFO:
SipSgLogLevel4 - gcid=0x00000036 Ingress: sent msg for CallId:1-1966@10.52.155.12 to IP/port:10.52.155.12/7033,
Local IP/port:10.52.155.16/5060, SMM: OUTBOUND POST-SMM, TRUNKGROUP: CTS_TG_INTERNAL, MSGID: 636
PART: 001-001
RAW PDU:
SIP/2.0 200 OK
Via: SIP/2.0/UDP 10.52.155.12:7033;branch=z9hG4bK-1966-1-8
From: sipp <sip:sipp@10.52.155.12:7033>;tag=1966SIPpTag001
To: sut <sip:9896543210@10.52.155.16:5060>;tag=gK0080666b_cK1563fe0c
Call-ID: 1-1966@10.52.155.12
CSeq: 3 BYE
Content-Length: 0

```
760 08082023 130908.377980:1.01.00.00637.MAJOR  .SIPSG:CALL:FILTER=test GCID=0x00000036: EXTRA INFO:
SipSgLogLevel4 - gcid=0x00000036 Egress: sent msg for CallId:54_1173854251563fe0c@10.52.156.16 to IP/
port:10.52.155.11/5555, Local IP/port:10.52.156.16/5060, SMM: OUTBOUND POST-SMM, TRUNKGROUP:
CTS_TG_EXTERNAL, MSGID: 637 PART: 001-001
RAW PDU:
BYE sip:10.52.155.11:5555;transport=UDP SIP/2.0
Via: SIP/2.0/UDP 10.52.156.16:5060;branch=z9hG4bK00B00803f338a4b31f8_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>;tag=1962SIPpTag011
Call-ID: 54_1173854251563fe0c@10.52.156.16
CSeq: 828937 BYE
Max-Forwards: 70
Content-Length: 0

761 08082023 130908.378478:1.01.00.00638.MAJOR  .SIPSG:CALL:FILTER=test GCID=0x00000036: EXTRA INFO:
SipSgLogLevel4 - gcid=0x00000036 Egress: received msg for CallId:54_1173854251563fe0c@10.52.156.16 from IP/
port:10.52.155.11/5555, Local IP/port:10.52.156.16/5060, SMM: INBOUND PRE-SMM, TRUNKGROUP:
CTS_TG_EXTERNAL, MSGID: 638 PART: 001-001
RAW PDU:
SIP/2.0 200 OK
Via: SIP/2.0/UDP 10.52.156.16:5060;branch=z9hG4bK00B00803f338a4b31f8_cK1563fe0c
From: "sipp" <sip:9964608271;phone-context=private@10.52.156.16;user=phone>;tag=gK000067c7_cK1563fe0c
To: <sip:9896543210;phone-context=private@10.52.155.13;user=phone>;tag=1962SIPpTag011
Call-ID: 54_1173854251563fe0c@10.52.156.16
CSeq: 828937 BYE
Contact: <sip:10.52.155.11:5555;transport=UDP>
Content-Length: 0
```

FIGURE 24G

| |
|---|
| FIGURE 24A |
| FIGURE 24B |
| FIGURE 24C |
| FIGURE 24D |
| FIGURE 24E |
| FIGURE 24F |
| FIGURE 24G |

2501 Record 'STOP'

```
1. Record Type                              : STOP
2. Gateway Name                             : arunvsbcSystem-sc
3. Accounting ID                            : 0x0001C03F00000036
4. Start Time (system ticks)                : 244522503
5. Node Time Zone                           : Etc-UTC
6. Start Time (MM/DD/YYYY)                  : 08/08/2023
7. Start Time (HH/MM/SS.s)                  : 13:08:38.2
8. Ticks from Setup Msg to Policy Response  : 3
9. Ticks from Setup Msg to Alert/Proc/Prog  : 7
10. Ticks from Setup Msg to Service Est     : 11
11. Disconnect Time (MM/DD/YYYY)            : 08/08/2023
12. Disconnect Time (HH:MM:SS.s)            : 13:09:08.3
13. Ticks from Disconnect to Call Termination : 3
14. Call Service Duration                   : 3002
15. Call Disconnect Reason                  : 16
16. Service Delivered                       : VoIP
17. Call Direction                          : IP-TO-IP
18. Service Provider                        : DEFAULT
19. Transit Network Selection Code (TNS)    :
20. Calling Number                          : 9964608271
21. Called Number                           : 9896543210
22. Extra Called Address Digits             :
23. Number of Called Num Translations       : 0
24. Called Number Before Translation #1     :
25. Translation Type #1                     : 0
26. Called Number Before Translation #2     :
27. Translation Type #2                     : 0
28. Billing Number                          : 9964608271
29. Route Label                             : SBX_OUT_RL
30. Route Attempt Number                    : 1
31. Route Selected                          : ARUNVSBCSYSTEM-SC:CTS_TG_EXTERNAL
32. Egress Local Signaling IP Address       : 10.52.156.16
33. Egress Remote Signaling IP Address      : 10.52.155.13
34. Ingress Trunk Group Name                : CTS_TG_INTERNAL
35. Ingress PSTN Circuit End Point          :
```

FIGURE 25A

```
2502 ┐ 36. Ingress IP Circuit End Point        : 10.52.155.17:1116/10.52.155.12:9898
      │ 37. Egress PSTN Circuit End Point       :
      │ 38. Egress IP Circuit End Point         : 10.52.156.17:1136/10.52.155.11:8988
        39. Ingress Number of Audio Bytes Sent   :
        40. Ingress Number of Audio Packets Sent :
        41. Ingress Number of Audio Bytes Received   : 240240
        42. Ingress Number of Audio Packets Received : 3003
        43. Originating Line Information (OLIP)    : 0
        44. Jurisdiction Information Parameter (JIP) :
        45. Carrier Code                          :
        46. Call Group ID                         : 0x0080002E
        47. Script Log Data                       :
        48. Ticks from Setup Msg to Rx of EXM     :
        49. Ticks from Setup Msg to Generation of EXM :
        50. Calling Party Nature of Address       : 2
        51. Called Party Nature of Address        : 2
        52. Ingress Protocol Variant Specific Data :
            52.1  Protocol Variant                : "SIP
            52.2  Call ID                         : 1-1966@10.52.155.12
            52.3  From Field                      :
        %22sipp%22<sip:9964608271@10.52.155.12:7033>;tag=1966SIPpTag001
            52.4  To Field                        :
        %22sut%22<sip:9896543210@10.52.155.16:5060>;tag=gK0080666b_cK1563fe0c
            52.5  Redirect Attempt Count          : 0
            52.6  Reserved                        :
            52.7  Display name of SIP URI PAI header :
            52.8  User Parameter of P-K-CallForwardingLast Header :
            52.9  Userinfo and Hostname of SIP Request URI Header :
        sip:9896543210@10.52.155.16:5060
            52.10 Userinfo and Hostname of SIP URI PAI header :
            52.11 Username parameter of the Proxy-Authorization header :
            52.12 Displayname of Tel URI PAI header :
            52.13 INVITE Contact header           : sip:sipp@10.52.155.12:7033
            52.14 200OK-INVITE Contact header     : sip:9896543210@10.52.155.16:5060
            52.15 Redirecting Reason Parameter of P-K-CallForwardOriginal header :
            52.16 Userinfo of Tel URI PAI header  :
            52.17 Contractor Number value of P-Sig-Info header :
            52.18 ACK Received for 200 OK         : 1
            52.19 Status Msg for Call Release     : BYE
            52.20 Reason Header value Q850        :
            52.21 NAPT Status of the SIP SG for Signaling : 0
            52.22 NAPT Status of the SIP SG for Media     : 0
            52.23 Original Peer SDP Address for NAPT      :
            52.24 UUI Sending Count               : 0
            52.25 UUI Receiving Count             : 0
            52.26 Service Information
            52.27 ICID                            :
            52.28 Generated Host                  :
```

52.29 Originating IOI :
52.30 Terminating IOI :
52.31 P-K-Adn Header Number :
52.32 IP Address for FQDN calls or IP address of route header selected as next hop:
52.33 Transport Protocol : 1
52.34 Direct Media Call : 0
52.35 Inbound SMM Indicator : 0
52.36 Outbound SMM Indicator : 0
52.37 Originating Charge Area :
52.38 Terminating Charge Area :
52.39 Feature Tag in Contact Header :
52.40 Feature Tag in Accept-Contact Header :
52.41 P-Charging-Function-Address :
52.42 P-Called-Party-Id :
52.43 P-Visited-Network-Id :
52.44 Direct Media with NAPT Call : 0
52.45 IPTG Ingress SMM Profile Name :
52.46 IPTG Egress SMM Profile Name :
52.47 P-Access-Network-Information header :
52.48 IMS Node functionality : 7
52.49 IMS node role : 1
52.50 IMS Use PcfaCcf :
52.51 P-CSCF calling party :
52.52 P-CSCF called party :
52.53 ICE used on Call : 0
52.54 ICE Complete - Time-stamp when ICE Completes :
52.55 Transit IOI List :
52.56 Loop Back Ravel Call : 0
52.57 Optimal Media Routing Applied : 0
52.58 IMS PAI Service Header :
52.59 Feature-Caps header :
52.60 Called Asserted Identity :
52.61 NNI-Type : 0
52.62 Neighbour Address :
52.63 Relationship mode :
52.64 Session direction :
52.65 SMM CDR Field 1 :
52.66 SMM CDR Field 2 :
52.67 SMM CDR Field 3 :
52.68 SMM CDR Field 4 :
52.69 SMM CDR Field 5 :
52.70 Origination ID :
52.71 STI Service Type :
52.72 STI Service Status :
52.73 STI Reason Code :
52.74 Global Ingress SMM Profile Name :
52.75 Global Egress SMM Profile Name :

FIGURE 25C

```
52.76 Ac Ingress SMM Profile Name         :
   52.77 Ac Egress SMM Profile Name          :
   52.78 Zone Ingress SMM Profile Name       :
   52.79 Zone Egress SMM Profile Name        :
   52.80 STI Display Name                    :
   52.81 AniDnis Loop Detection Fail         : 0
   52.82 P-K-Info                            :
   52.83 Attestation Ind                     :
   52.84 STI RPH Service Type                :
   52.85 STI RPH Service Status              :
   52.86 STI RPH Reason Code                 :
   52.87 STI RCD Service Type                : 0
   52.88 STI RCD Service Status              : 0
   52.89 STI RCD Reason Code                 : "
53. Ingress Signaling Type                   : 12
54. Egress Signaling Type                    : 12
55. Ingress Far End Switch Type              : 0
56. Egress Far End Switch Type               : 1
57. Carrier Code of Carrier who Owns iTG Far End :
58. Carrier Code of Carrier who Owns eTG Far End :
59. Calling Party Category                   : 0x0a
60. Dialed Number                            : 9896543210
61. Carrier Selection Information            : 1
62. Called Number Numbering Plan             : 1
63. Generic Address Parameter                :
64. Disconnect Initiator                     : 1
65. Ingress Number of Packets Recorded as Lost : 0
66. Ingress Interarrival Packet Jitter       : 0
67. Ingress Last Measurement for Latency     : 0
68. Egress Trunk Group Name                  : CTS_TG_EXTERNAL
69. Egress Protocol Variant Specific Data    :
   69.1  Protocol Variant                    : "SIP
   69.2  Call ID                             : 54_1173854251563fe0c@10.52.156.16
   69.3  From Field                          : %22sipp%22<sip:9964608271;phone-context=private@10.52.156.16:5060;user=phone>;tag=gK000067c7_cK1563fe0c
   69.4  To Field                            : <sip:9896543210;phone-context=private@10.52.155.13:5555;user=phone>;tag=1962SIPpTag011
   69.5  Redirect Attempt Count              : 1
   69.6  Reserved                            :
   69.7  Display name of SIP URI PAI header  :
   69.8  User Parameter of P-K-CallForwardingLast Header :
   69.9  Userinfo and Hostname of SIP Request URI Header :
sip:9896543212@10.52.155.11:5555
   69.10 Userinfo and Hostname of SIP URI PAI header :
   69.11 Username parameter of the Proxy-Authorization header :
```

```
69.12 Displayname of Tel URI PAI header        :
69.13 INVITE Contact header                    : sip:9964608271@10.52.156.16:5060
69.14 200OK-INVITE Contact header              : sip:10.52.155.11:5555;transport=UDP
69.15 Redirecting Reason Parameter of P-K-CallForwardOriginal  header :
69.16 Userinfo of Tel URI PAI header           :
69.17 Contractor Number value of P-Sig-Info header :
69.18 ACK Received for 200 OK                  :
69.19 Status Msg for Call Release              : BYE
69.20 Reason Header value Q850                 : 16
69.21 NAPT Status of the SIP SG for Signaling  : 0
69.22 NAPT Status of the SIP SG for Media      : 0
69.23 Original Peer SDP Address for NAPT       :
69.24 UUI Sending Count                        : 0
69.25 UUI Receiving Count                      : 0
69.26 Service Information                      :
69.27 ICID                                     :
69.28 Generated Host                           :
69.29 Originating IOI                          :
69.30 Terminating IOI                          :
69.31 P-K-Adn Header Number                    :
69.32 IP Address for FQDN calls or IP address of route header selected as next hop:
69.33 Transport Protocol                       : 1
69.34 Direct Media Call                        : 0
69.35 Inbound SMM Indicator                    : 0
69.36 Outbound SMM Indicator                   : 0
69.37 Originating Charge Area                  :
69.38 Terminating Charge Area                  :
69.39 Feature Tag in Contact Header            :
69.40 Feature Tag in Accept-Contact Header     :
69.41 P-Charging-Function-Address              :
69.42 P-Called-Party-Id                        :
69.43 P-Visited-Network-Id                     :
69.44 Direct Media with NAPT Call              : 0
69.45 IPTG Ingress SMM Profile Name            :
69.46 IPTG Egress SMM Profile Name             :
69.47 P-Access-Network-Information header      :
69.48 IMS Node functionality                   : 7
69.49 IMS node role                            : 1
69.50 IMS Use PcfaCcf                          :
69.51 P-CSCF calling party                     :
69.52 P-CSCF called party                      :
69.53 ICE used on Call                         : 0
69.54 ICE Complete - Time-stamp when ICE Completes :
69.55 Transit IOI List                         :
69.56 Loop Back Ravel Call                     : 0
```

FIGURE 25E

```
       69.57 Optimal Media Routing Applied    : 0
       69.58 IMS PAI Service Header           :
2506   69.59 Feature-Caps header              :
       69.60 Called Asserted Identity         :
       69.61 NNI-Type                         : 0
       69.62 Neighbour Address                :
       69.63 Relationship mode                :
       69.64 Session direction                :
       69.65 SMM CDR Field 1                  :
       69.66 SMM CDR Field 2                  :
       69.67 SMM CDR Field 3                  :
       69.68 SMM CDR Field 4                  :
       69.69 SMM CDR Field 5                  :
       69.70 Origination ID                   :
       69.71 STI Service Type                 :
       69.72 STI Service Status               :
       69.73 STI Reason Code                  :
       69.74 Global Ingress SMM Profile Name  :
       69.75 Global Egress SMM Profile Name   :
       69.76 Ac Ingress SMM Profile Name      :
       69.77 Ac Egress SMM Profile Name       :
       69.78 Zone Ingress SMM Profile Name    :
       69.79 Zone Egress SMM Profile Name     :
       69.80 STI Display Name                 :
       69.81 AniDnis Loop Detection Fail      : 0
       69.82 P-K-Info                         :
       69.83 Attestation Ind                  :
       69.84 STI RPH Service Type             :
       69.85 STI RPH Service Status           :
       69.86 STI RPH Reason Code              :
       69.87 STI RCD Service Type             : 0
       69.88 STI RCD Service Status           : 0
       69.89 STI RCD Reason Code              : "
       70. Incoming Calling Number            : 9964608271
       71. AMA Call Type                      : 110
       72. Message Billing Indicator (MBI)    :
       73. LATA                               :
       74. Route Index Used                   : 1
       75. Calling Party Presentation Restriction : 1
       76. Incoming ISUP Charge Number        :
       77. Incoming ISUP Nature Of Address    :
       78. Dialed Number Nature of Address    : 2
       79. Ingress Codec Info                 : P:1:1
       80. Egress Codec Info                  : P:1:1
       81. Ingress RTP Packetization Time     : 10
       82. Global Call ID (GCID)              : 0x00000036
```

FIGURE 25F

2507
```
83. Originator Echo Cancellation      :
84. Terminator Echo Cancellation      :
85. Charge Flag                       : 0
86. AMA slp ID                        :
87. AMA BAF Module                    :
88. AMA Set Hex AB Indication         :
89. Service Feature ID                :
90. FE Parameter                      :
91. Satellite Indicator               : 0
92. PSX Billing Info                  :
93. Originating TDM Trunk Group Type  :
94. Terminating TDM Trunk Group Type  :
95. Ingress Trunk Member Number       : 1
96. Egress Trunk Group ID             :
97. Egress Switch ID                  :
98. Ingress Local ATM Address         :
99. Ingress Remote ATM Address        :
100. Egress Local ATM Address         :
101. Egress Remote ATM Address        :
102. PSX Call Type                    : 6
103. Outgoing Route Trunk Group ID    :
104. Outgoing Route Message ID        :
105. Incoming Route ID                :
106. Calling Name                     : "sipp"
107. Calling Name Type                : 2
108. Incoming Calling Party Numbering Plan : 1
109. Outgoing Calling Party Numbering Plan : 1
110. Calling Party Business Group ID  : 1
111. Called Party Business Group ID   : 1
112. Calling Party PPDN               :
113. Ticks from Setup Msg to Last Route Attempt : 5
114. Billing Number Nature of Address : 2
115. Incoming Calling Number Nature of Address : 2
116. Egress Trunk Member Number       : 1
117. Selected Route Type              : 7
118. Telcordia Long Duration Record Type : 0
119. Ticks From Previous Record       : 3002
120. Cumulative Route Index           : 1
121. Call Disconnect Reason Sent to Ingress :
122. Call Disconnect Reason Sent to Egress  :
123. ISDN PRI Calling Party Subaddress :
124. Outgoing Trunk Group Number in EXM :
125. Ingress Local Signaling IP Address  : 10.52.155.16
126. Ingress Remote Signaling IP Address : 10.52.155.12
127. Record Sequence Number           : 95
128. Transmission Medium Requirement  : 16
129. Information Transfer Rate        : 8
```

130. USI User Info Layer 1 :
131. Unrecognized Raw ISUP Calling Party Category :
132. FSD: Egress Release Link Trunking :
133. FSD: Two B-Channel Transfer :
134. Calling Party Business Unit :
135. Called Party Business Unit :
136. FSD: Redirecting :
137. FSD: Ingress Release Link Trunking :
138. PSX Index : 1
139. PSX Congestion Level :
140. PSX Processing Time (milliseconds) : 34
141. Script Name : TANDEM
142. Ingress External Accounting Data :
143. Egress External Accounting Data :
144. Egress RTP Packetization Time : 10
145. Egress Number of Audio Bytes Sent : 240240
146. Egress Number of Audio Packets Sent : 3003
147. Egress Number of Audio Bytes Received :
148. Egress Number of Audio Packets Received :
149. Egress Number of Packets Recorded as Lost : 0
150. Egress Interarrival Packet Jitter : 0
151. Egress Last Measurement for Latency : 0
152. Ingress Maximum Packet Outage : 12
153. Egress Maximum Packet Outage :
154. Ingress Packet Playout Buffer Quality :
155. Egress Packet Playout Buffer Quality :
156. Answer Supervision Type :
157. Ingress Sip Refer or Sip Replaces Feature Specific Data:
158. Egress Sip Refer or Sip Replaces Feature Specific Data:
159. Network Transfers Feature Specific Data :
160. Call Condition : 13
161. Toll Indicator : 1
162. Generic Number ( Number ) :
163. Generic Number Presentation Restriction Indicator:
164. Generic Number Numbering Plan :
165. Generic Number Nature of Address :
166. Generic Number Type :
167. Originating Trunk Type :
168. Terminating Trunk Type :
169. Remote GSX Billing Indicator :
170. VPN Calling Private Presence Number :
171. VPN Calling Public Presence Number :
172. External Furnish Charging Info :
173. Ingress Policing Discards :
174. Egress Policing Discards :
175. Announcement Id :
176. Network Data - Source Information :

FIGURE 25H 2509
177. Network Data - Partition ID        :
178. Network Data - Network ID         :
179. Network Data - NCOS               :
180. Ingress SRTP (Secure RTP/RTCP)    :
181. Egress SRTP (Secure RTP/RTCP)     :
182. ISDN access Indicator             : 0
183. Call Disconnect Location          : 9
184. Call Disconnect Location Transmitted to Ingress:
185. Call Disconnect Location Transmitted to Egress:
186. Network Call Reference - Call Identity    :
187. Network Call Reference - Signaling Point Code:
188. Ingress MIME Protocol Variant Specific Data :
189. Egress MIME Protocol Variant Specific Data :
190. Modem Tone Type                   :
191. Modem Tone Signal Level           :
192. Video Data                        :
193. Video Statistics - Ingress/Egress Video Statistics.:
194. SVS Customer                      :
195. SVS Vendor - Deprecated in 7.2.2 as part of Pcr1624:
196. Call To Test PSX                  :
197. Psx Overlap Route Requests        :
198. Call Setup Delay                  :
   198.1  Request Latency (msec)     : "2
   198.2  Downstream Latency (msec)  : 4
   198.3  Response Latency (msec)    : 13
   198.4  Upstream Latency (msec)    : 19"
199. Overload Status                   : 0
200. reserved                          :
201. reserved                          :
202. Ingress DSP Data Bitmap           :
203. Egress DSP Data Bitmap            :
204. Call Recorded Indicator           :
205. Call Recorded RTP Tx Ip Address   :
206. Call Recorded RTP Tx Port Number  :
207. Call Recorded RTP Rv Ip Address   :
208. Call Recorded RTP Rv Port Number  :
209. Mlpp Precedence Level             :
210. reserved                          :
211. reserved                          :
212. reserved                          :
213. reserved                          :
214. reserved                          :
215. reserved                          :
216. reserved                          :
217. Global Charge Reference           :
218. reserved: IP Call Limit at Ingress SIP Peer :

FIGURE 25I

```
219. reserved: IP Call Limit at Ingress IPTG    :
220. reserved: IP BW Limit at Ingress IPTG      :
221. reserved: IP Call Limit at Egress SIP Peer :
222. reserved: IP Call Limit at Egress IPTG     :
223. reserved: IP BW Limit at Egress IPTG       :
224. reserved: PSX Name                         : CATS_REMOTE_PSX
225. reserved: No of PSX tried                  :
226. Ingress Inbound R-Factor                   :
227. Ingress Outbount R-Factor                  :
228. Egress Inbound R-Factor                    :
229. Egress Outbount R-Factor                   :
230. Media Stream Data - All the media streams data:
    230.1  Number of streams            : "01
    230.2  mediaType1                   : audio
    230.3  streamIndex1                 : 1
    230.4  ingress codec used1          : G711
    230.5  ingress local IP1            : 10.52.155.17:1116
    230.6  ingress remote IP1           : 10.52.155.12:9898
    230.7  ingress SRTP info1           : 0:0:0:0
    230.8  ingress bw1                  : 124
    230.9  egress codec used1           : G711
    230.10 egress local IP1             : 10.52.156.17:1136
    230.11 egress remote IP1            : 10.52.155.11:8988
    230.12 egress SRTP info1            : 0:0:0:0
    230.13 egress bw1                   : 124
    230.14 ingress private leg local EP1    :
    230.15 ingress private leg remote EP1   :
    230.16 egress private leg local EP1     :
    230.17 egress private leg remote EP1    : "
231. Media Stream Statistics - All the media streams statistics:
    231.1  Number of streams            : "01
    231.2  mediaType1                   : audio
    231.3  streamIndex1                 : 1
    231.4  ingress packetSent1          : 0
    231.5  ingress packetReceived1      : 3003
    231.6  ingress octetSent1           : 0
    231.7  ingress octetReceived1       : 240240
    231.8  ingress packetLost1          : 0
    231.9  ingress packetDiscarded1     : 0
    231.10 egress packetSent1           : 3003
    231.11 egress packetReceived1       : 0
    231.12 egress octetSent1            : 240240
    231.13 egress octetReceived1        : 0
    231.14 egress packetLost1           : 0
    231.15 egress packetDiscarded1      : 0"
```

FIGURE 25J

```
232. Transcoded Indicator                          : 0
233. Negotiated HD Codec Rate                      :
234. Remote Ingress Audio RTCP Learned Metrics     :
235. Remote Egress Audio RTCP Learned Metrics      :
236. Final Route Label                             :
237. MTA Information                               :
238. VBR Common Billing Data                       :
239. VBR Route Billing Data                        :
240. Access Transfer Specific Data                 :
241. Emergency Indicator                           : 0
242. Ingress Dtls-Srtp: Dtls-Srtp Ingress Status Info:
243. Egress Dtls-Srtp: Dtls-Srtp Egress Status Info:
244. UE Roaming Status                             : 0
245. Access Network Charging Information           :
246. Ingress Signaled Session Bandwidth in kbps    : 0
247. Ingress Rx Computed Session Bandwidth in kbps : 117
248. Ingress Tx Computed Session Bandwidth in kbps : 0
249. Ingress Configured Bandwidth Reduction Factor : 0
250. Ingress Estimated Bandwidth Reduction Factor  : 0
251. Egress Signaled Session Bandwidth in kbps     : 0
252. Egress Rx Computed Session Bandwidth in kbps  : 0
253. Egress Tx Computed Session Bandwidth in kbps  : 117
254. Egress Configured Bandwidth Reduction Factor  : 0
255. Egress Estimated Bandwidth Reduction Factor   : 0
256. Additional Media Stream Statistics            :
     256.1  Entries per stream                     : "7
     256.2  Number of streams                      : 01
     256.3  ingress lostPktBursts1                 : 0
     256.4  ingress lostPktSingles1                : 0
     256.5  ingress codecParams1                   : P:1:
     256.6  egress lostPktBursts1                  : 0
     256.7  egress lostPktSingles1                 : 0
     256.8  egress codecParams1                    : P:1:
     256.9  transcode indicator1                   : 0"
257. Ingress Zone Name                             : ZONE_ING
258. Egress Zone Name                              : ZONE_EGR
259. Ingress Zone Id                               : 2
260. Egresss Zone Id                               : 3
261. Video Cac                                     :
262. Ingress IpPrefix TgName                       :
263. Transcode Resource Type                       :
264. MRF INFORMATION                               :
265. Parent Call GCID                              : 0x00000000
266. Call Recorder 1 RTP Tx Ip Address             :
267. Call Recorder 1 RTP Tx Port Number            :
268. Call Recorder 1 RTP Rx Ip Address             :
269. Call Recorder 1 RTP Rx Port Number            :
270. Call Recorder 2 RTP Tx Ip Address             :
```

FIGURE 25K

271. Call Recorder 2 RTP Tx Port Number     :
272. Call Recorder 2 RTP Rx Ip Address      :
273. Call Recorder 2 RTP Rx Port Number     :
274. Call Recorder 3 RTP Tx Ip Address      :
275. Call Recorder 3 RTP Tx Port Number     :
276. Call Recorder 3 RTP Rx Ip Address      :
277. Call Recorded 3 RTP Rx Port Number     :
278. Signaling Only Mode                    :
279. Audio Stream Statistics                :
    279.1 Entries per stream             : "2
    279.2 Number of streams             : 01
    279.3 ingress mosCq1                : 85879608.6
    279.4 egress mosCq1                 : 85879608.6"
280. Audio Stream RTCP-XR Voice Metric Statistics :
281. Media Stream SRTP Statistics           :
    281.1 Entries per stream             : "4
    281.2 Number of streams             : 01
    281.3 ingress authFailureCount1     : 0
    281.4 ingress outsideReplayCount1   : 0
    281.5 egress authFailureCount1      : 0
    281.6 egress outsideReplayCount1    : 0"
282. DSP insertion/rejection reason         :
    282.1 Entries per stream             : "2
    282.2 Number of streams             : 01
    282.3 ingress dspReason1            : No DSP inserted
    282.4 egress dspReason1             : No DSP inserted"
283. Call Established Time                  : 08/08/2023 13:08:38.3
284. Over Flow Packets Count                :
    284.1 ingress overFlowPacketsCount1 : "0
    284.2 egress overFlowPacketsCount1  : 0"
285. Ingress Trunk Group for PSX Routing    : CTS_TG_INTERNAL
286. T140 Information                       :
287. Remote T140 RTCP Learned Metrics       :
288. VTP Information                        :
289. Beep Tone Inserted                     : 0
290. Direction of Beep Tone                 :
291. Start Time (Local) (mm/dd/yyyy hh:mm:ss.s) : 08/08/2023 13:08:38.2
292. Disconnect Time (Local) (mm/dd/yyyy hh:mm:ss.s): 08/08/2023 13:09:08.3
293. Call Established Time (Local) (mm/dd/yyyy hh:mm:ss.s): 08/08/2023 13:08:38.3

FIGURE 25L

```
294. Global Unique ID (GUID)          : a1da86aa-1451-418e-8eb8-
05e2a2ff968c64d23e56003600
295. Media IPSec Information          :
    295.1  IPSec Enabled              : "
    295.2  Ingress Remote Tunnel IP   :
    295.3  Egress Remote Tunnel IP    : "
296. nodeName                         : blr-pc5-ocp2-comp10.blr-ocp2.lab.rbbn.com
297. podName                          : cats-sbc-sc-69f5d5c66c-6dccn
298. containerID                      :
7f1ce247c81eab2ef7a6e272b9f8886eb6402c067a346579dc8fccab05ee608e
299. Ingress Identity Headers Received :
300. Egress Identity Headers Sent     :
```

FIGURE 25M

| FIGURE 25A |
| FIGURE 25B |
| FIGURE 25C |
| FIGURE 25D |
| FIGURE 25E |
| FIGURE 25F |
| FIGURE 25G |
| FIGURE 25H |
| FIGURE 25I |
| FIGURE 25J |
| FIGURE 25K |
| FIGURE 25L |
| FIGURE 25M |

FIGURE 25

LEARNING-BASED AUTOMATED CALL FLOW TESTING

RELATED APPLICATIONS

The present application claims the benefit of U.S. Provisional Patent Application Ser. No. 63/615,256 which was filed on Dec. 27, 2023 and which is hereby expressly incorporated by reference in its entirety. Each of the proceeding patent applications and publications are hereby expressly incorporated by reference in their entirety.

FIELD OF INVENTION

The present invention relates to methods, systems, and apparatus for learning-based automated call flow testing.

BACKGROUND

Testing automation is at the nexus of many network equipment vendors' problems. Customers of network equipment vendors take too long (e.g., 12-18 months) to test, fix, and upgrade to a new release (e.g., software release). Manual testing (e.g., by human(s)) of network equipment device new releases, features, and inter-operability with other equipment is costly and time consuming. Furthermore, manual testing (e.g., regression testing) leaves large gaps in the coverage of what is tested causing a high rate of upgrade failures. As a result, many network equipment vendor customers will choose to stay on a particular network equipment release for many years, and are slow to launch new revenue generating services and are also disturbingly late in keeping up with security updates to their network equipment devices. Furthermore, the expenditure of resources such as the dedication of Research & Development (R&D) staff to performing such testing can be a significant percentage of a network equipment vendor's R&D budget which limits the vendor's ability to develop and offer new features. This results in fewer features desired by customers per release which in turn further drives customers' reluctance to upgrade to new product releases which perpetuates the problem.

Creating call flow test plans in a manual fashion is human resource intensive, time-consuming, and expensive. Constructing a lab configuration for testing purposes that closely mimics a production configuration is time-consuming and error prone. Due to this difficulty, the lab configuration is often not updated as changes occur in the production environment resulting in inexact testing. Manually executing call flow testing is human resource intensive, time-consuming, and expensive. Many call flows on a customer network are unknown, and call flows are dynamic with new call flows appearing and old ones disappearing on a continuous basis. Due to overhead of manual test preparation and execution, multiple call flows are often collapsed into a single test case leading to gaps in true coverage. Manual call flow testing often uses easy but superficial measures of correctness (such as call completion) which does not accurately reflect the true correctness of the software.

From the foregoing it is apparent that there is a need for a technological solution to how to effectively, efficiently and in a cost-efficient manner, provide learning-based automated communications network equipment testing for customers. There is also a need for new and/or improved methods and apparatus for accurately learning and simulating/mimicking production network equipment customer configurations in labs for testing purposes, such as for testing of new product releases (e.g., software and/or hardware releases) for example using automated testing. From the foregoing, it is apparent there is a further need for new and/or improved methods of capturing and/or learning customer call flows for creating and executing automated tests, e.g., regression testing of new software product releases for verifying no software faults or bugs have been introduced by the new software release and that the newly released software functions as expected with respect to previously released features. From the foregoing, it is also apparent that there is a need for new and/or improved methods of customizing and automating testing for customers so that the customers can perform their own automating testing with respect to their specific product and network configurations, traffic patterns, call flows and product feature usage.

SUMMARY

The present invention provides new and/or improved methods, systems, and apparatus for automated verification testing. Various embodiments of the present invention provide new and/or improved methods, systems and apparatus for learning-based automated call flow testing of network equipment, e.g., Session Initiation Protocol (SIP) call processing entities such as Session Border Controllers. Various embodiments of the present invention address and solve one or more of the problems discussed above.

Various embodiments of the present invention provide new and/or improved methods, systems, and apparatus for efficiently and effectively building and/or generating a stochastic traffic model (in terms of call flows, not volume) of a production network by automatically learning call flows based on continuous, in-production sampling of real network traffic. Various embodiments of the present invention provide new and/or improved methods, systems, and apparatus for the discovery and/or identification, and subsequent validation of call flows that customers are not even aware are present on the network. Various embodiments of the present invention provide new and/or improved methods, systems, and apparatus for pruning a set of learned call flows to generate a sub-set of unique call flows from which a set of unique test cases can be generated and executed thereby eliminating unnecessary test duplication. Various embodiments of the present invention provide new and/or improved methods, systems, and apparatus for creating and/or generating device and lab environment configurations for testing based on production device configurations and production network configurations requiring no or limited/minimal human involvement depending on the specific configuration. The automation of various aspects of configuring the device-under-test and lab environment also requires only updating the device-under-test and lab environment configurations with respect to specific objects (e.g., remote server contact and/or IP address information) added or changed in the production device and/or production network in order to simulate production conditions after the changes. This allows for regular updating of the device-under-test and lab configurations producing testing which is more representative of actual current production conditions. Various embodiments of the present invention provide new and improved methods, systems and apparatus for automating the generation of test cases and associated meta data with significant reduction in time and resource costs. Various embodiments of the present invention provide new and improved methods, systems and apparatus for automating the auditing of test case results for confirming whether or not the test results of a device-under-test accurately reflect whether or not a device-under-test has properly processed a test call flow. Various embodiments of the present invention provide new and improved methods, systems and apparatus for automating test case execution and the performance of regression testing in different environments allowing for efficient and effective repeated and regular testing at significantly reduced time and financial cost.

An exemplary method of testing a first Session Initiation Protocol (SIP) call processing entity in a lab environment includes the steps of generating, by an automated test system, a first test case based on a first reference call flow record for a first SIP call or a trace record for the first SIP call; executing, by the automated test system, the first test case, said executing the first test case including sending one or more SIP messages to the first SIP call processing entity; generating, by the automated test system, a first test case call flow record for a first SIP test call corresponding to the first test case; and determining, by the automated test system, whether or not the first SIP call processing entity failed the first test case based on a comparison of the first test case call flow record and the first reference call flow record.

An exemplary method embodiment of testing a first Session Initiation Protocol (SIP) call processing entity (e.g., SBC) in a lab environment in accordance with the present invention includes the steps of generating, by an automated test system, configuration information (e.g., a configuration file or record) for use in configuring the first SIP call processing entity for a first test case, said first test case being based on a first reference call flow record; executing, by the automated test system, the first test case, said executing the first test case including sending one or more SIP messages to the first SIP call processing entity; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

In some embodiments, the method further includes the step of generating, by the automated test system (e.g., learning-based testing system 114), the first test case based on the first reference call flow record.

In some embodiments, the method further includes the step of generating, by the automated test system (e.g., learning-based testing system 114), the first test case based on information contained in a first trace record corresponding to a first SIP call processed by a second SIP call processing entity operating in a production network, said first test case being a test script including instructions for exchanging messages with the first SIP call processing entity based on messages captured in the first trace record as being exchanged with the second SIP call processing entity during the first SIP call. In some such embodiments, a configuration twinning operation is performed on the configuration of the second SIP call processing entity to obtain information for use in configuring the first SIP call processing entity for execution of the first test case in the lab environment.

In some embodiments, the first reference call flow record is one of a plurality of call flow records generated from a plurality of non-test SIP calls processed by a second SIP call processing entity operating in a production network, said second SIP call processing entity being a commercially released SIP call processing entity, said production network being a non-test customer network. In some embodiments, the plurality of call flow records each include a unique set of features extracted from a call detail record and/or a trace record for the SIP call to which the call flow record corresponds and the first test case is one of a plurality of test cases generated from the plurality of call flow records.

In some embodiments, the first reference call flow record is one of a plurality of call flow records learned by the automated test system based on continuous, in-production sampling of real network traffic.

In some embodiments, the plurality of learned call flow records is a stochastic traffic model of a production network in terms of call flows processed or handled by a SIP call processing entity (e.g., SBC) of the production network.

In some embodiments, the step of determining, by the automated test system, whether or not the first SIP call processing entity failed the first test case is further based on a determination of whether or not the first test case did not complete successfully, the first test case will be determined to not have completed successfully when one or more of the following occur: (i) the execution of the test case does not complete (e.g., the test case is aborted during execution because of a failure experienced by a client device or the first SIP call processing device, (ii) an anomalous condition is detected after the completion of the execution of the test case (e.g., a coredump of the first SIP call processing device is detected or ASAN logs indicate issues occurred during the execution of the test case).

In some embodiments, the step of determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates one or more of the following: (i) that the number of SIP messages included in the first test case call flow record and the number of SIP messages included in the first reference call record are different, (ii) that a list of SIP header fields included in each of the SIP messages included in the first test case call flow record and a list of SIP header fields included in each of the SIP messages included in the first reference call flow record are different, and (iii) that a list of parameters included in each of the SIP header fields included in each of the SIP messages included in the first test case call flow record and a list of parameters included in each of the SIP header fields included in each of the SIP messages included in the first reference call flow record are different.

In some embodiments, the method further includes the additional steps of: generating, by the automated test system, the first reference call flow record by extracting features from a first call detail record and a first trace record, said first call detail record and said first trace record both corresponding to a first SIP call processed by a second SIP call processing entity operating in a production network; storing, by the automated test system, the extracted features in the first reference call flow record, and wherein the features extracted from the first call detail record and the first trace record include for each call leg of the first SIP call: (i) a call leg identifier, (ii) a listing of SIP messages received by the second SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

Another exemplary method of testing a first Session Initiation Protocol (SIP) call processing entity (e.g., lab SBC) in a lab environment in accordance with an embodiment of the present invention includes the steps of: performing, by an automated test system, a twinning configuration procedure on a second SIP call processing entity (e.g. production SBC), said second SIP call processing entity operating in a production network; generating, by the automated test system, configuration information for use in configuring the first SIP call processing entity in the lab environment for a plurality of test cases based on configuration information obtained during said twinning configuration procedure, said plurality of test cases including a first test case based on a first reference call flow record for a first SIP call processed by the second SIP call processing entity or based on a first trace record for the first SIP call; storing, by the automated test system, said generated configuration information; and executing, by the automated test system, the first test case, said executing the first test case including sending one or more SIP messages to the first SIP call processing entity while said first SIP call processing entity is operating in said lab environment, said first SIP call processing entity being configured using said generated configuration information.

In some embodiments, the first SIP call processing entity is a first Session Border Controller. In some embodiments, the first Session Border Controller is a hardware device. In some embodiments, the first Session Border Controller is a virtual device implemented as an application executing on a compute node in a cloud. In some embodiments, the automated test system is implemented as a plurality of applications executing on one or more nodes or servers. In some such embodiments, the automated test system is implemented on a Kubernetes system including a plurality of Pods and a data lake or repository, the plurality of Pods being implemented on Kubernetes nodes of the Kubernetes system.

The invention is also directed to systems and apparatus that are used to implement the various method embodiments of the invention. In some apparatus embodiments, each of the apparatus/nodes/devices of the system includes a processor and a memory, the memory including instructions that when executed by the processor control the apparatus/node/device of the system to operate to perform the steps of various method embodiments of the invention.

An exemplary automated test system in accordance with an embodiment of the invention includes: a memory and a first processor, said first processor controlling the automated test system to perform the following operations: generating, by the automated test system, configuration information for use in configuring the first SIP call processing entity for a first test case, said first test case being based on a first reference call flow record; executing, by the automated test system, the first test case, said executing the first test case including sending one or more SIP messages to the first SIP call processing entity; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 18 illustrates exemplary SIP packet parameters.

FIG. 20 illustrates an exemplary transform record including a plurality of exemplary transform entries for exemplary Internet Protocol interfaces.

FIG. 23 illustrates an exemplary audit result report in accordance with an embodiment of the present invention.

FIG. 24 illustrates the combination of FIGS. 24A, 24B, 24C, 24D, 24E, 24F and 24G.

FIG. 24A illustrates the first part of an exemplary trace record for a call.

FIG. 24B illustrates the second part of an exemplary trace record for a call.

FIG. 24C illustrates the third part of an exemplary trace record for a call.

FIG. 24D illustrates the fourth part of an exemplary trace record for a call.

FIG. 24E illustrates the fifth part of an exemplary trace record for a call.

FIG. 24F illustrates the sixth part of an exemplary trace record for a call.

FIG. 24G illustrates the seventh part of an exemplary trace record for a call.

FIG. 25 illustrates the combination of FIGS. 25A, 25B, 25C, 25D, 25E, 25F, 25G, 25H, 25I, 25J, 25K, 25L, and 25M.

FIG. 25A illustrates the first part of an exemplary call detail record for the call.

FIG. 25B illustrates the second part of an exemplary call detail record for a call.

FIG. 25C illustrates the third part of an exemplary call detail record for a call.

FIG. 25D illustrates the fourth part of an exemplary call detail record for a call.

FIG. 25E illustrates the fifth part of an exemplary call detail record for a call.

FIG. 25F illustrates the sixth part of an exemplary call detail record for a call.

FIG. 25G illustrates the seventh part of an exemplary call detail record for a call.

FIG. 25H illustrates the eighth part of an exemplary call detail record for a call.

FIG. 25I illustrates the ninth part of an exemplary call detail record for a call.

FIG. 25J illustrates the tenth part of an exemplary call detail record for a call.

FIG. 25K illustrates the eleventh part of an exemplary call detail record for a call.

FIG. 25L illustrates the twelfth part of an exemplary call detail record for a call.

FIG. 25M illustrates the thirteenth part of an exemplary call detail record for a call.

DETAILED DESCRIPTION

Figure 1:
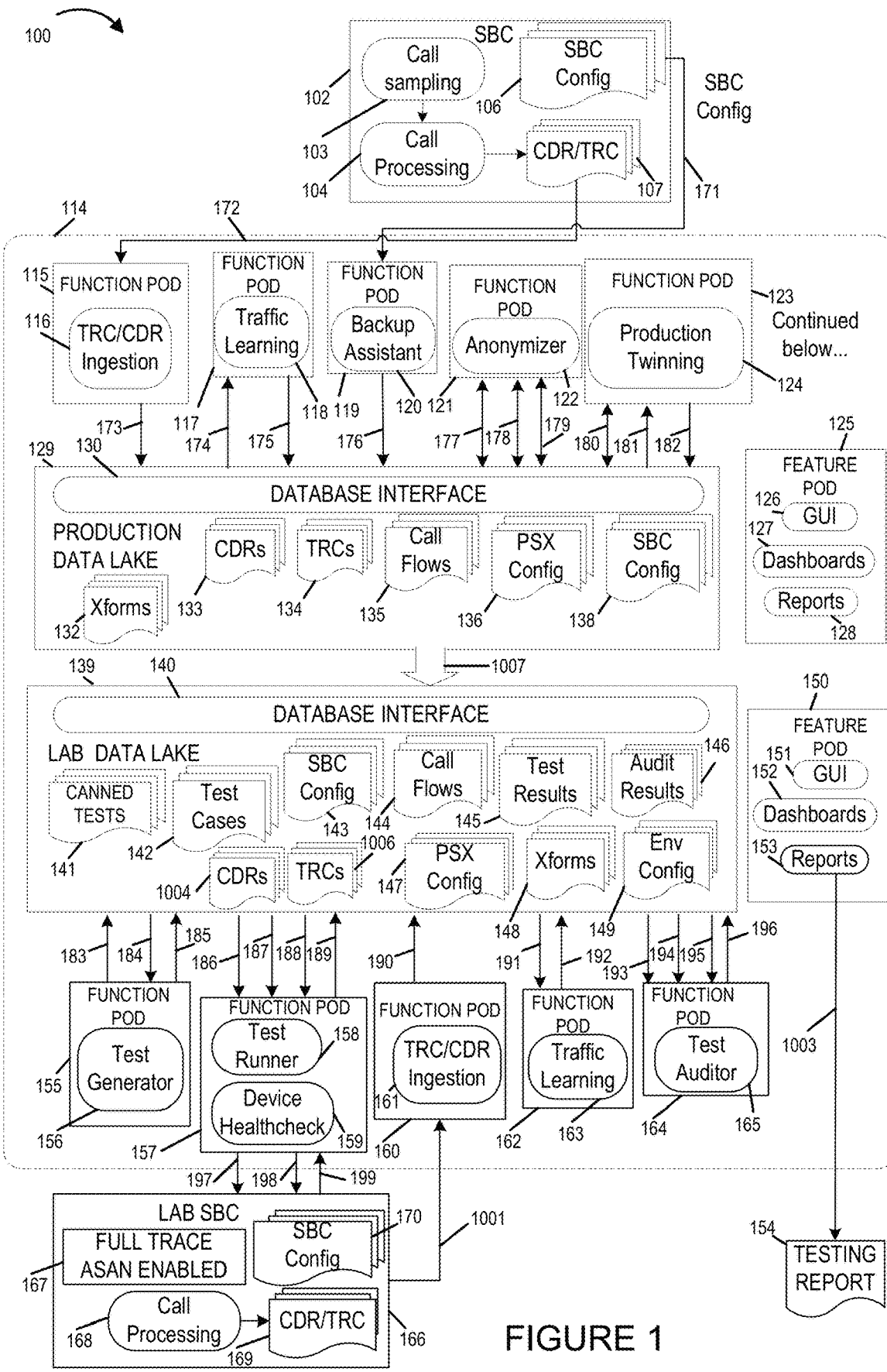
FIG. 1 illustrates an exemplary system and a software pipeline illustrating the flow of information/data between components of the system as well as processing steps and/or operations for implementing learning-based testing using the exemplary system in accordance with an embodiment of the present invention.

FIG. 1 illustrates a system 100 for learning-based testing of a network equipment device, e.g., a SIP call processing entity or device such as a Session Border Controller, in accordance with an embodiment of the present invention. FIG. 1 further illustrates a software pipeline illustrating the flow of information/data between components of the system 100 as well as processing steps and/or operations for implementing learning-based testing using system 100.

The system 100 in FIG. 1 is implemented for testing a network equipment device which in the exemplary system 100 is a Session Border Controller (SBC) running Session Initiation Protocol-Session Initiation Protocol (SIP-SIP).

Descriptions of Session Initiation Protocol (SIP) messages is described in the "SIP: Session Initiation Protocol" Request for Comment 3261 published June 2002 by the Internet Engineering Taskforce (IETF) and last revised Jan. 21, 2020 which is incorporated herein by reference in its entirety. Descriptions of Session Description Protocol messages are described in the "SDP: Session Description Protocol" Request for Comment 8866 published January 2021 by the Internet Engineering Taskforce (IETF) which is incorporated herein by reference in its entirety. Features of SIP and SDP messages are also described in U.S. Provisional Patent Application No. 62/817,548 filed on Mar. 13, 2019 which is hereby incorporated by reference in its entirety. Descriptions regarding the contents of exemplary Call Detail Records are included in U.S. Provisional Patent Application No. 62/595,111 filed Dec. 6, 2017 which is hereby incorporated by reference in its entirety.

The system 100 includes a learning-based testing system 114 to which the SBC 102 and Lab SBC 166 are coupled and/or connected. Information (e.g., records, production SBC configuration information, Lab SBC configuration information for call flows, transforms (xforms), reports, test results, canned tests, SIP-SIP test information (e.g., SIP-SIP tests), audit results) are communicated and/or transmitted between elements of system 100 via the communications paths 171, 172, 173, 174, 175, 176, 177, 178, 179, 180, 181, 182, 183, 184, 185, 186, 187, 188, 189, 190, 191, 192, 193, 194, 195, 196, 197, 198, 199, 1001, and 1003 as shown in FIG. 1. The exemplary learning-based testing system 114 in the exemplary system 100 is implemented on a Kubernetes system with the feature Pods 125 and 150 and the function Pods 115, 117, 119, 121, 123, 155, 157, 160, 162, and 164 being Kubernetes Pods implemented on one or more Kubernetes nodes in a cloud environment or cloud system platform such as for example Amazon Web Services (AWS) cloud platform. The cloud environment or system platform may be a private cloud environment or system platform or a public cloud environment or system platform. The exemplary learning-based testing system 114 includes two data lakes: a production data lake 130 and a Lab data lake 139. The production data lake 130 and the Lab data lake are storage devices such as, for example, database storage systems. The production data lake 130 and the Lab data lake 139 may be, and in some embodiments are, cloud database storage systems such as for example AWS data lakes. While the exemplary learning-based testing system 114 utilizes two separate data lakes with the production data lake being used for storing information corresponding to production SBC 102 (i.e., a SBC being utilized by the customer in the customer actual communications system) and a Lab data lake 139 for storing information for use in testing the Lab SBC 166 in a lab system or environment, in some embodiments a single data lake or database storage system is utilized for storing the information included in both production data lake 129 and lab data lake 139. It should be understood that the specific nodes, Pods, functions and components shown as attached to the production data lake 129 versus the lab data lake 139 in system 114 are only exemplary and different configurations of the nodes, Pods, functions and components are possible. For example, in some embodiments the function Pods 117, 119, 121, and 124 with their components are attached to the lab data lake 139 of the lab system instead of the production data lake 129 of the production system.

Production data lake 129 includes a database interface 130 used for inputted and outputting data. Lab data lake 139 includes a database interface 140 used for inputting and outputting data. The production data lake 129 is coupled and/or connected to the lab data lake 139 so that data can be exchanged between the data lakes. In particular, data stored in the production data lake 129 can be transferred to the lab data lake 139.

The SBC 102 is an exemplary representative production device being utilized by a customer in normal or regular customer usage (e.g., at a customer premises during business operations). The SBC 102 has production hardware and software (i.e., a version of hardware and software released for actual live use as opposed to a lab version for use in a test environment). The event/data records (e.g., Call Detail Records/Trace Records) and configuration information from the SBC 102 are used by the learning-based testing system 114 to generate/learn test cases which emulate and/or mimic the customer's usage of the SBC 102. The generated/learned test cases are then utilized by the learning-based test system 114 to test the Lab SBC 166 with a test report 154 being generated identifying problems (e.g., failed test cases).

The SBC 102 is a call processing device being utilized by the customer during actual business operations. The Lab SBC 166 is an exemplary representative device-under-test (DUT) (e.g., a newer version of the SBC 102 which has different and/or updated software and/or hardware). For example, when the SBC 102 is executing software release 1 then the Lab SBC 166 may be, and in some embodiments is, executing an updated or newer software release for the SBC such as software release 1.1 or software release 2.0 which includes changes to the software from the software release 1.0. The different or updated SBC software may, and in some embodiments does, include software changes to address bugs or problems identified in previous versions or software releases and/or the addition of new and/or enhanced features. Software as used herein includes firmware. The different and/or updated hardware may, and in some embodiments does, include hardware components having the same or similar specifications but are from different vendors and/or are from the same vendor but have different specifications and/or characteristics (e.g., increased processing capacity, different access times, increased storage capacity and/or different design characteristics/parameters (e.g., mechanical access hard disk drive storage device vs. solid state drive storage device)).

The system 100 can, and in some embodiments is, implemented for testing other call processing equipment other than SBCs such as for example application servers (e.g., Voice Over Internet Protocol application servers or SIP Application Servers), call controller equipment, call control servers, communications servers, and Policy and Routing Server (PSX). In some embodiments, the PSX is a centralized policy and routing server that provides a standards-compliant, multi-protocol solution providing a policy and call routing engine that works seamlessly in heterogeneous voice networks supporting Session Initiation Protocol (SIP), ENUM (E.164 NUmber Mapping (ENUM) standard), H.323 protocol, TDM (time division multiplexing), Signaling System 7/Common Channel Signaling System 7 (SS7/C7), Intelligent Network/Advanced Intelligent Network (IN/AIN), and Internet Protocol Multimedia Subsystem (IMS). In such embodiments, the SBC 102 is replaced by a different device to be tested (e.g., PSX server) and the Lab SBC 166 is replaced by lab version of the different device (i.e., the device-under-test or to be tested) (e.g., lab PSX server when the different device is a PSX server).

As previously discussed, the learning-based test system includes: feature Pod 125 and 150 and the function Pods 115, 117, 119, 121, 123, 155, 157, 160, 162, and 164. Each of the feature Pods and function Pods include one or more components for performing operations. In some embodiments, one or more of these components are implemented as one or more software containers or an application that performs a specific operation or function.

The function Pod 115 includes the TRC/CDR ingestion component. The function Pod 117 includes the traffic learning component 118. The function Pod 119 includes the backup assistant component 120. The function Pod 121 includes the anonymizer component 122. The function Pod 123 includes the production twinning component 124. The function Pod 155 includes the test generator component 156. The function Pod 157 includes the test runner component 158 and the device health check component 159. The function Pod 160 includes the TRC/CDR ingestion component 161. The function Pod 162 includes the traffic learning component 163. The function Pod 164 including the test auditor component 165.

The feature Pod 125 includes Graphical User Interface component 126, an optional Dashboards component 127, and an optional Reports component 128. The Graphical User Interface component 125 provides a graphical user interface for the input and output of data/information/commands displayed on a screen or display device for use by an operator of the learning-based test system 114. The Dashboard component 127 provide a variety of information graphically on a screen or display device to the operator of the learning-base test system 114 including for example CDR information, TRC information, call flow information, PSX configuration information, SBC configuration information, Production Twinning information, Backup Assistant information, information on state of various operations being executed (e.g., state of TRC/CDR ingestion, traffic learning, backup assistant, anonymizer, production twinning). The reports component 128 generates reports and outputs reports (e.g., to a display device) regarding the operations being performed by the learning-based test system 114.

The feature Pod 150 includes Graphic User Interface component 151, a Dashboards component 152 and a Reports component 153. The Graphical User Interface component 151 provides a graphical user interface for the input and output of data/information/commands displayed on a screen or display device for use by an operator of the learning-based test system 114. The Dashboard component 152 provides a variety of information graphically on a screen or display device to the operator of the learning-base test system 114 including for example CDR information, TRC information, call flow information, PSX configuration information, SBC configuration information, Transform information, Canned Test Cases, Test Results, Audit Results, and information on the state of various operations being executed (e.g., state of TRC/CDR ingestion by TRC/CDR ingestion component 161, state of tests being generated by Test Generator component 156, state of test cases being executed by test runner component 158, state of the health of the lab SBC which is being monitored by the device health check component 159, the state of traffic learning being implemented by the traffic learning component 163 and the state of test results being audited by the test auditor component 165). The reports component 153 generates reports 154 regarding the operations being performed by the learning-based test system 114 (e.g., test result reports and test audit reports) and outputs the reports (e.g., to a display device).

The process comprises a continuously running data capture and a pipeline of steps for creating and executing automated test cases. The initial data processing stages or operations include: (i) data capture and (ii) data ingestion. The data capture stage or operation includes sampling of event/data records. Exemplary event/data records include call detail records (CDRs) and trace records (TRCs).

FIG. 24 illustrates the combination of FIGS. 24A, 24B, 24C, 24D, 24E, 24F and 24G. FIG. 24A illustrates the first part of an exemplary trace record for a call. FIG. 24B illustrates the second part of an exemplary trace record for a call. FIG. 24C illustrates the third part of an exemplary trace record for a call. FIG. 24D illustrates the fourth part of an exemplary trace record for a call. FIG. 24E illustrates the fifth part of an exemplary trace record for a call. FIG. 24F illustrates the sixth part of an exemplary trace record for a call. FIG. 24G illustrates the seventh part of an exemplary trace record for a call. Due to the size of the exemplary trace record 2400 it is shown in seven parts: trace record part 1 2401 being shown on FIG. 24A, trace record part 2 2402 being shown on FIG. 24B, trace record part 3 2403 being shown on FIG. 24C, trace record part 4 2404 being shown on FIG. 24D, trace record part 5 2405 being shown on FIG. 24E, trace record part 6 2406 being shown on FIG. 24F, and trace record part seven 2407 being shown on FIG. 24G.

FIG. 25 illustrates the combination of FIGS. 25A, 25B, 25C, 25D, 25E, 25F, 25G, 25H, 25I, 25J, 25K, 25L, and 25M. FIG. 25A illustrates the first part of an exemplary call detail record for the call. FIG. 25B illustrates the second part of an exemplary call detail record for a call. FIG. 25C illustrates the third part of an exemplary call detail record for a call. FIG. 25D illustrates the fourth part of an exemplary call detail record for a call. FIG. 25E illustrates the fifth part of an exemplary call detail record for a call. FIG. 25F illustrates the sixth part of an exemplary call detail record for a call. FIG. 25G illustrates the seventh part of an exemplary call detail record for a call. FIG. 25H illustrates the eighth part of an exemplary call detail record for a call. FIG. 25I illustrates the ninth part of an exemplary call detail record for a call. FIG. 25J illustrates the tenth part of an exemplary call detail record for a call. FIG. 25K illustrates the eleventh part of an exemplary call detail record for a call. FIG. 25L illustrates the twelfth part of an exemplary call detail record for a call. FIG. 25M illustrates the thirteenth part of an exemplary call detail record for a call. The exemplary call detail record 2500 shown in FIG. 25 has been decoded showing the description of the call detail record field followed by a colon and the contents of that call detail record field. Due to the size of the exemplary call detail record 2500 it is shown in thirteen parts: call detail record part 1 2501 being shown on FIG. 25A, call detail record part 2 2502 being shown on FIG. 25B, call detail record part 3 2503 being shown on FIG. 25C, call detail record part 4 2504 being shown on FIG. 25D, call detail record part 5 2505 being shown on FIG. 25E, call detail record part 6 2506 being shown on FIG. 25F, call detail record part seven 2507 being shown on FIG. 25G, call detail record part eight 2508 being shown on FIG. 25H, call detail record part nine 2509 being shown on FIG. 25I, call detail record part ten 2510 being shown on FIG. 25J, call detail record part eleven 2511 being shown on FIG. 25K, call detail record part twelve 2512 being shown on FIG. 25L, and call detail record part thirteen 2513 being shown on FIG. 25M. The call detail record 2500 is for a STOP call detail record.

The exemplary trace record 2400 and the exemplary call detail record 2500 are for the same call. The information contained in the exemplary call detail record and the exemplary trace record being illustrative of call data captured in a production/customer network. In this example, the call detail records and trace records 107 are generated by the Session Border Controller 102 during usage by a customer.

In some embodiments, the data records include packet capture records referred to as PCAPs. Packet Capture records capture packets and/or packet information for a communications stream and/or streams. The packets can be for various protocols and packet types such as control packets or media packets. For example, packet capture records include packet capture records for SIP packets, User Datagram Protocol (UDP) packets, Transmission Control Protocol (TCP) packets, Real-time Transport Protocol (RTP) packets, Real-time Transport Control Protocol (RTCP) packets, etc.

As discussed above, in the exemplary embodiment of FIG. 1, the Session Border Controller 102 generates call detail records and trace records 107. The call sampling component 103 of the SBC 102 samples CDR and TRC records generated during the SBC's processing of calls by the SBC 102's call processing component 104. Alternatively, tracing for calls of interest can be obtained using a trace filter. When a trace filter is employed, the SBC 102 generates trace records and CDRs for calls meeting a trace filter criteria inputted into the SBC 102. The generated CDRs and TRCs 107 are typically initially stored within a storage device such as memory located locally within the SBC 102.

As previously explained, the call sampling component 103 of the SBC 102 samples CDR and TRC records generated during the SBC 102's processing of calls by the SBC 102's call processing component 104. The call sampling component 103 randomly samples or picks a fraction—typically a very small fraction—of calls (e.g., 0.5% of the SBC 102 processed calls). In such instances as only a very small fraction of the total number of calls processed by the SBC 102 are sampled, it may, and in many embodiments does, require a couple or several months of sampling to achieve or obtain a high probability that a significant number of relevant call flows have been captured in order to ensure sufficient call flow coverage or customer call flow history of different customer call flow scenarios.

Figure 7:
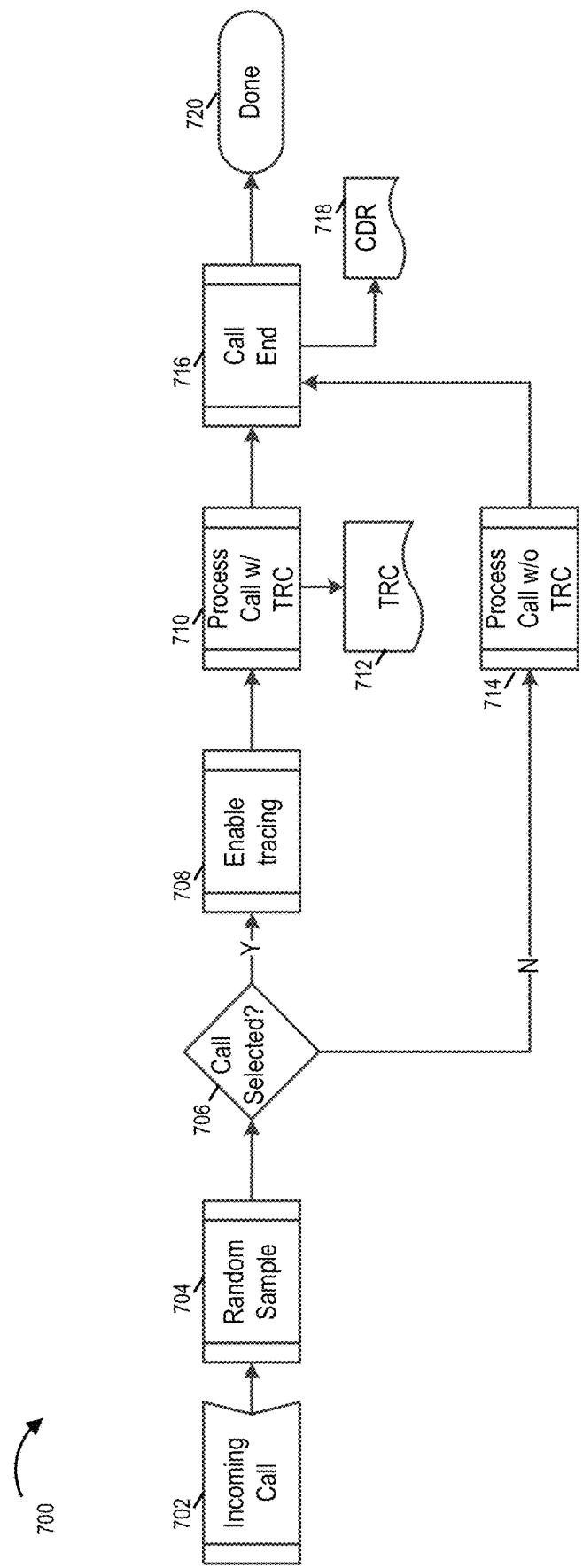
FIG. 7 illustrates an exemplary method for collecting call data via data sampling in accordance with an embodiment of the present invention.

FIG. 7 illustrates an exemplary method 700 for collecting call data via data sampling in accordance with an embodiment of the present invention. In some embodiments, the call sampling component 103 of SBC 102 performs the steps of method 700. In some embodiments, the call sampling component 103 of SBC 102 performs one or more of the steps of method 700. In some embodiments, the call sampling component 103 of SBC 102 coordinates and/or oversees the implementation of the remaining steps 700 by other components of SBC 102 (e.g., call processing component 104 or a separate CDR and/or TRC record generating component(s)). The method 700 begins with the call sampling component 103 receiving an incoming call or an indication that an incoming call has been received by the SBC 102. Operation proceeds from step 702 to step 704. In step 704 the call sampling component 103, implements a random sampling routine as part of determining whether the incoming call should be randomly sampled. Operation proceeds from step 704 to step 706. In step 706, the call sampling component 103 makes the determination of whether a call is selected (the percentage of incoming calls selected for sampling being an adjustable number of the total calls processed, for example less than 0.5% of the total calls received over a time period). In some embodiments step 706 is a sub-step of random sample step 704. In steps 704 and 706, the call sampling component determines whether the incoming call is to be selected for sampling and collection of data about the incoming call for learning-based testing. For example, in some embodiments, these steps 704 and 706 are implemented by generating a random integer number X from the set of integer numbers 1 to 1000 for each incoming call. Whenever the randomly generated number X is one of the following: 1, 2, 3, 4, 5, the call sampling component 103 determines that the incoming call is to be sampled. In another exemplary embodiment, a number X is chosen from the set of numbers of (0.000, 0.002, 0.003, . . . , 0.999). When the random number X is less than 0.005, the call sampling component determines the incoming call is to be selected for sampling for collection of data about the incoming call for learning based testing. When the call sampling component 103 determines that the incoming call is to be sampled (i.e., data is to be collected for learning-based testing for the incoming call), operation proceeds from step 706 to step 708. When the call sampling component 103 determines that the incoming call is not to be sampled (i.e., data is not to be collected for learning-based testing for the incoming call), operation proceeds from step 706 to step 714.

In step 708, the call sampling component 103 enables tracing for the incoming call. Operation proceeds from step 708 to step 710. In step 710, the incoming call is processed by the SBC 102 with tracing resulting in the generation of trace records 712.

In step 714, the SBC 102 processes the incoming call without tracing and no trace records are generated as this incoming call was not selected for data sampling/collection.

Operation proceeds from steps 710 and 714 to call end step 716 wherein at the completion of the call a call detail record (CDR) 718 is generated for the call. For the randomly selected calls a TRC 712 is a trace record for the incoming call and CDR 718 is a call detail record for the incoming call. These records may be, and in various embodiments are, stored in a storage device, e.g., memory, of SBC 102. Operation proceeds from step 716 to step 720 wherein the method 700 is done or complete for the incoming call. The method 700 is repeated for each incoming call.

In some embodiments, the sampling distribution of incoming calls is non-uniform. In some embodiments, the sampling distribution of incoming calls varies based on the number of calls being processed by the SBC 102. In some embodiments, the percentage of calls sampled is higher when the number of calls being processed by the system is below a first threshold value then when the number of calls being processed by the system is above a second threshold value. In some such embodiments, the first and second threshold values are the same value. For the selected incoming calls a log of events and Packet data Units (e.g., SIP packet data units) associated with the selected call are stored in a Trace record by the SBC 102. For the incoming calls selected for tracing, all SIP PDUs (on all legs) are captured and stored in the trace record for the call (e.g., TRC 712). The SIP PDU capture includes both the SIP headers and the complete SIP body. For the incoming calls selected for tracing, the SIP transport protocol (UDP/TCP/TLS) for all legs are captured and stored in the trace record for the call (e.g., TRC 712). Furthermore, for the incoming calls selected for tracing which are using an encrypted transport protocol (e.g., TLS), the captured information stored in the trace record for the call will include the SIP PDUs in unencrypted format. In various scenarios, the SBC 102, as part of routing a call, makes a policy request to a PSX server (e.g., using a Diameter protocol message). The PSX server in response to receiving the policy request chooses the route (and other policies to be applied to the call). The PSX server returns this information to the SBC 102 in a policy response message (e.g., a Diameter protocol response message). The SBC 102 then utilizes the route identified and implements any policies identified to be applied to the call. In at least some embodiments, the policy request and response messages include one or more proprietary extensions used for exchanging information related to the call and/or the routing and other policies to be applied. In various embodiments, the policy request and policy response messages including any proprietary extensions for a call are also captured and stored in the trace record. This captured information allows for the creation of test cases that also test the interactions and exchanges of messages with the PSX server.

Once the CDR and TRC records have been generated they are transferred to the function Pod 115 for data ingestion. The data ingestion operation includes the event/data records which in this example are the CDR records and TRC records 107 being continuously ingested into an analytics data lake 129. The analytics data lake 129 may be, and in some embodiments is, implemented as a Hadoop Distributed File System (HDFS)/Impala data storage system. The production network is a customer's actual communications network. The data collection and CDR and TRC record ingestion occurs in the production network and continuously operates. In this example, the analytics data lake 129 is a production analytics data lake used to store production data (i.e., data collected during actual customer usage of the SBC 102). Customers typically include communications network service providers such as AT&T and Verizon as well as smaller enterprises which operate their own communications networks.

The data ingestion operation is performed by the TRC/CDR ingestion component 116 of the function Pod 115. The TRC/CDR ingestion component 116 performs the operation of receiving and ingesting the CDR/TRC records 107 provided by the SBC 102. Communications path 172 shows the CDR/TRC records being transferred from the SBC 102 to the function POD 115 for ingestion by the TRC/CDR ingestion component 116. The CDR/TRC ingestion component performs the operation of data ingestion for the CDR/TRC records 107 from the SBC 102. The CDR and TRC records 107 are transferred from the function node 115 and stored in the production data lake 129 as part of the ingestion process. The CDR and TRC records 107 received by the TRC/CDR ingestion component 116 from the SBC 102 are communicated from the function Pod 116 to the production data lake 129 via communications path 173, the communicated CDRs and TRCs being stored as Call Detail Records (CDRs) 133 and Trace Records (TRCs) 134 respectively in the production data lake 129.

Once a sufficient call flow history (e.g., CDR and TRC records) has been collected and ingested, the actual automated test pipeline/operation/method can start. The stages and components of the automated test pipeline/operation/method will now be discussed.

The traffic learning component 118 of function Pod 117 receives call detail record and trace record information (e.g., CDR and TRC records) from the CDRs 133 and TRCs 134 stored in the production data lake 129 via database interface 130 and communications path 174. The traffic learning component 118 finds or identifies complete call flows from the trace records and CDRs received, extracts features, and applies transforms. Once the transforms have been applied in various embodiments, the traffic learning component 118 compares the call flows and eliminates duplicates so as to generate a minimal set of call flows. The learned call flows contain and/or include the SIP Packet Data Units (PDUs) of the call flow, the CDR for or corresponding to the call flow and the features extracted from the call flow. The SIP PDUs for the learned call flow may be in encrypted and/or unencrypted form. In many embodiments, the SIP PDUs of the call flow are in unencrypted form even when the original call flow had encrypted SIP PDUs. In such cases, the encrypted SIP PDUs received by the SBC 102 for the call flow will be unencrypted and captured when the trace record for the call flow is generated by the SBC 102 as previously discussed. The traffic learning component 118 communicates the learned call flows (typically after eliminating duplicates) from function Pod 117 to the production data lake 129 via communications path 175 and database interface 130, the learned call flows being stored in call flow records 135 of production data lake 129.

The backup assistant component 120 of function Pod 119 takes a current backup of the production SBC 102 and saves it to the production data lake 129. The SBC configuration information 106 which is a backup of the SBC 102's configuration settings is communicated from production SBC 102 via communications path 171 to the backup assistant component 120 of function Pod 119. The backup assistant component communicates the SBC configuration information to the production data lake 129 via communications path 176 where it is stored as SBC configuration records 138.

The anonymizer component is an optional component that anonymizes the content of call flows, CDRs, and the SBC configuration information. This functionality removes personal identifiers that may lead to an individual being identified. In some embodiments, customer identifiers are also removed so that the customer can not be identified from the content of the call flows, CDRs and the SBC configuration information. The anonymizer is typically only used when the lab environment or system and/or the Lab SBC is in a different privacy zone than the production environment (e.g., customer actual production communications network), production data lake and function pods 115, 117, 119, 121, 123.

The production twinning component 124 of the function Pod 123 generates a lab-environment SBC configuration and transforms using the production SBC configuration, a test environment configuration, and customer specified mappings. The production twinning component 124 obtains the production SBC 102 configuration information from the production data lake 129 SBC Configuration records 138 via communications path 180 and stores the generated lab-environment SBC Configuration information as one of the SBC Configuration records 138 in the data lake 129 via communications path 180. The production twinning component receives the test environment configuration information from the data lake 129 via communications path 181. The production twinning component stores the generated transforms in the data lake 129 as Xforms records 132 via communications path 182.

The test generator component 156 of the function Pod 155 receives call flows 144 from the lab data lake 139 via communications path 184. The test generator component 156 uses the received call flows 144 to generate test cases which it stores in the lab data lake 139 via communications path 185 as test cases 142. The generated test cases are for example SIP-SIP call flow tests which emulate or simulate a SIP-SIP call flow. In various embodiments, the tests include SIPp and wrapper scripts for every leg of a call and the necessary environmental information used by the Test Runner component 158 to execute the test. The environmental information includes IP addressing that will be used by SIP client simulators of the test runner component during testing. The environmental information allows the test generator to perform any necessary rewriting of IP addressing from what was included in the reference call flow to match the test environment in which the test runner component will be executing the test script. The test generator also installs canned tests 141 (e.g., static tests) generated (e.g., written) by system verification personnel into the lab data lake 139 via communications path 183. SIPp is a free Open Source test tool/traffic generator for the SIP protocol. The SIPp tool reads and implements custom XML scenario files describing from very simple to complex call flows. Additional information about SIPp can be found at https://sipp.readthedocs.io/en/latest/perftest.html. The "SIPp reference documentation by Richard Gayraud [initial code], Olivier Jacques [code/documentation], Robert Day [code/documentation], Charles P. Wright [code], and many other contributors [code] for version 3.4" downloaded from the Internet website "https://sipp.readthedocs.io/en/latest/perftest.html" on Oct. 25, 1023 is incorporated herein by reference in its entirety. With respect to the use of SIPp and wrapper scripts for the test cases, it is to be understood that a "wrapper" is a shell script that embeds a command or utility, that saves a set of parameters (e.g., test parameters) to be passed to that command, or that extracts or interprets the output or result of that command. Wrapping a script around a complex command line simplifies how it is invoked and/or how the results are interpreted.

By way of example, in addition to the test generator component 156 generating a SIPp script and wrapper script for each call leg of each call flow, if the call flow indicates a call recording, the test generator component generates a SIPp script and wrapper to simulate the call recording function. If the ingress media sent or received features indicates media on the ingress leg, the test generator component 156 generates a media source/sink script for the ingress leg of the call flow. If the egress media sent or received features indicates media on any egress leg, the test generator component 156 generates a media source/sink script for each egress leg of the call flow.

The Test Runner component 158 included on the function Pod 157 is responsible for executing specified test cases. For each specified test case, the test runner component 158 obtains/retrieves the lab SBC configuration for the test case from the SBC Config records 143 stored in the lab data lake 139 via communications path 186. The test runner component 158 obtains/retrieves the test case to be executed from the test cases records 142 in the lab data lake 139 vis communication path 187. The test runner component 158 obtains/retrieves the call flow for the test case from the call flows records 144 in the lab data lake 139 via communications path 188. If the lab SBC current Configuration records/files 170 differs from the SBC configuration necessary for the test case or if it is unknown, the test runner component 158 loads the obtained/retrieved lab SBC configuration onto the Lab SBC 166 by transferring the lab SBC configuration via communications path 197 to the memory of the lab SBC 166 via communications path 197. Lab SBC 166 stores received configuration records in the SBC Configuration records/files 170. The test runner component 158 then runs the test case using SIPp instances and generates test results for the test case. The test results for each test case are written back or stored in the test results records or files 145 of lab data lake 139 via communications path 189. The function Pod 157 sends messages (e.g., SIP messages from the test runner component 158 as part of the execution of a test case) to the lab SBC 166 via communications path 198 and receives messages from the lab SBC 166 (e.g., SIP messages as part of the execution of the test case) via communications path 199.

In some embodiments, the test generator component is a continuous automated test system component that receives test cases from test cases records/files 142 in the lab data lake 139, configures the lab SBC 166 for the test or test cases to be run, implements the test case(s) by sending SIP messages to the lab SBC 166 and receiving SIP messages from the lab SBC 166, and then generates test results for each of the executed test cases and stores the generated test results in the lab data lake 139 as test results 145.

The Device Healthcheck component 159 of the function Pod 157 monitors the status of the lab SBC 166 (e.g., during testing) and determines if there are any issues such as software coredumps, software crashes, software resets due to problem encounters (e.g., software bug) during or after the execution of one or more tests, memory access errors detected, stack and/or heap overflows, or software fault causing the lab SBC 166 to cease processing of SIP messages but otherwise continue to operate. In some embodiments, the device healthcheck component 159 is a sub-component of the test runner component 158. In some embodiments, the device healthcheck component 159 functionality is included in the test runner component 158.

The lab SBC 166 as previously discussed is the call processing equipment device-under-test. It is similar to the production SBC 102 but is a new version or release of the production SBC 102 running a target load with full tracing enabled for every call flow and the lab SBC configuration loaded by the test runner component 158. The lab SBC 166 may be running an Address Sanitizer (ASAN)-enabled target load to facilitate more extensive memory checking. The lab SBC configuration is typically generated by the production twinning component 124 as previously described as part of the twinning process. The ASAN software is used to detect memory access errors such as for example use-after-free, memory leaks, and stack and/or heap overflows. The lab SBC 166 includes full trace, optional ASAN enabled component 167, a call processing component 168, SBC configuration records/files 170, and CDR and TRC records 169 generated during processing of calls of one or more test cases, each call flow having a CDR and TRC record generated for the call flow. The CDRs and TRC records 169 generated for each test case are continuously communicated via communications path 1001 from the lab SBC 166 to the TRC/CDR Ingestion component 161 of the function Pod 160 which ingests the CDR and TRC records and stores them in the lab data lake 139 using communications path 190, the CDR records being stored as CDR records 1004 and the trace records being stored as TRC records 1006.

FIG. 24 illustrates exemplary trace record 2400 for a call. FIG. 25 illustrates an exemplary call detail record for the same call.

The traffic learning component 163 of function Pod 162 is a degenerate iteration of the traffic learning functionality discussed above in connection with the traffic learning component 118. The traffic learning component 163 receives call detail record and trace record information (e.g., CDR and TRC records) from the CDRs 1004 and TRCs 1006 for test cases stored in the lab data lake 139 via database interface 140 and communications path 191. The traffic learning component 163 finds or identifies complete call flows from the trace records and CDRs received and extracts features from the call flows. The learned call flows from the executed test(s) contain and/or include the SIP Packet Data Units (PDUs) of the call flow, the CDR for or corresponding to the call flow and the features extracted from the call flow. The SIP PDUs for the learned call flow may be in encrypted and/or unencrypted form. In many embodiments, the SIP PDUs of the call flow are in unencrypted form even when the original call flow had encrypted SIP PDUs. In such cases, the encrypted SIP PDUs received by the lab SBC 166 for the call flow will be unencrypted and captured when the trace record for the call flow is generated by the lab SBC 166 as previously discussed in connection with the SBC 102. The traffic learning component 163 communicates the learned call flows from function Pod 162 to the lab data lake 139 via communications path 192 and database interface 140, the learned call flows for the test cases being stored in call flow records 144 of lab data lake 139.

The Test Auditor component 165 of the function Pod 164 validates the test results by confirming the Test Runner component 158 results. This is done by comparing the reference call flow document/record (call flow record obtained/retrieved by the Test Generator component 155 as part of generating the test) to the test call flow document/record generated by the traffic learning component 163 based on the CDR and TRC records for the test cases (e.g., comparing the extracted signaling features, CDR content, and SIP Packet Data Units (PDUs) of the reference call flow to the test call flow). The Test Auditor component 165 obtains/retrieves the reference call flow record for a test from the call flow records 144 of the lab data lake 139 via communications path 194. The Test Auditor component 165 obtains/retrieves the test result record for the corresponding test from the test result records 145 via communications path 194. The test result record stores information directly available from executing the test case. This information includes whether or not the test call corresponding to the test case succeeded or failed as expected (which is encoded into the test script) and whether the healthcheck on the lab SBC 166 during/after the test indicates a problem such as for example a coredump.

The Test Auditor component 165 obtains/retrieves the test call flow generated from the CDR and TRC records for the test from call flow records 144 of the lab data lake 139 via communications path 195. The Test Auditor component 165 generates and stores the audit result record for the test to audit result records 146 in lab data lake 139. In various embodiments, the Test Auditor component generates and stores an audit result record for one or more tests and/or test cases executed. In some the Test Auditor component generates and stores an audit result record for each test/test case executed.

As previously discussed the production data lake 129 and lab data lake 139 are data storage systems. The production data lake 129 and lab data lake 139 may be, and in some embodiments are, logical data stores or warehouses used for storing, among other things, records and artifacts. In some embodiments, the production data lake 129 and lab data lake 139 are a single data lake.

The production data lake 129 includes Transform records 132, CDR records 133, Trace Records 134, Call Flow records 135, PSX Configuration Records 136, and SBC Configuration Records 138. The lab data 139 includes Canned Tests records 141, Test Case records 142, SBC Configuration records 143, call flow records 144, test result records 145, audit result records 146, PSX Configuration records 147, Transform records 148, and Environment configuration records 149.

The communications path 1007 shows that records from the production data lake 129 are transferred to the lab data lake 139 (e.g., production CDRs, production TRCs, production call flow records (also sometimes referred to as reference call flow records), transforms, SBC configuration records, PSX configuration records).

In various embodiments, the records include both original and modified records such as, for example, the SBC Configuration Records 143 include both the original backup SBC Configuration record and the modified SBC Configuration record after production twinning has occurred. The records are indexed so that the call flow and/or test to which various records correspond can be identified (e.g., CDR record 1, TRC record 1, call flow record 1, SBC Configuration record 1, anonymized CDR record 1, anonymized TRC record 1, anonymized SBC Configuration record 1, modified twinning SBC Configuration record 1, twinning transforms record 1, environment configuration record 1, test case record 1, PSX configuration 1, test case (e.g., SIP-SIP test case) 1, test call flow record 1, test CDR record 1, test TRC record 1, test result record 1, audit result record 1 are all identified as corresponding to a first call flow and a first test case (in some embodiments a unique identifier is included in each of these records to make the identification of the records corresponding to the first call flow and first test case easier to identify). It is to be understood that various methods and data structures can be used for organizing and indexing the stored information/records.

In various embodiments, the SBC 102 is coupled and/or connected to a PSX server which includes policy information (e.g., routing and other policies) applied by the SBC 102 to calls the SBC 102 receives. In some such embodiments, the Backup Assistant component 120 of function Pod 119 downloads and/or backups up the PSX server's configuration information and stores it in the PSX Configuration records 136 of the production data lake 129. This is done so that the PSX Configuration information including the routing and policies being provided to the SBC 102 during operation can be duplicated for testing in the lab environment. In some embodiments, a PSX server is coupled and/or connected to the lab SBC 166, the PSX server being configured by the test runner component 158 to have the same configuration as the call flow from which the test case was generated. In some embodiments, the functionality of the PSX server is duplicated and/or mimicked by the test runner 158 which utilizes the PSX server configuration information to supply the routing and policies to the lab SBC 166 in response to requests from the SBC 166 during call processing associated with test cases.

The GUI component 126, Dashboards component 127 and Reports component 128 of feature Pod 125 as discussed above provide visual interface(s), dashboards, and reports with respect to operations/activities occurring in the production portion of the system.

The GUI component 151, Dashboards component 152 and Reports component 153 of feature Pod 150 provide visual interface(s), dashboards, and reports of operations/activities and past tests in the lab portion of the system.

In some embodiments only the GUI component 151, Dashboards component 152, and Reports component 153 of feature Pod 150 and not the GUI component 126, Dashboards component 127 and Reports component 128 of feature Pod 125 are utilized or implemented. In such systems, the GUI component 151, Dashboards component 152, and Reports component 153 of feature Pod 150 are utilized and provide information for the entire system such as the information discussed above. This functionality is typically associated with the overall system features versus the features of an individual stage of the automated learning-based testing pipeline. The Reports component 153 generates and outputs test report records 154 via communication path 1003.

Figure 2:
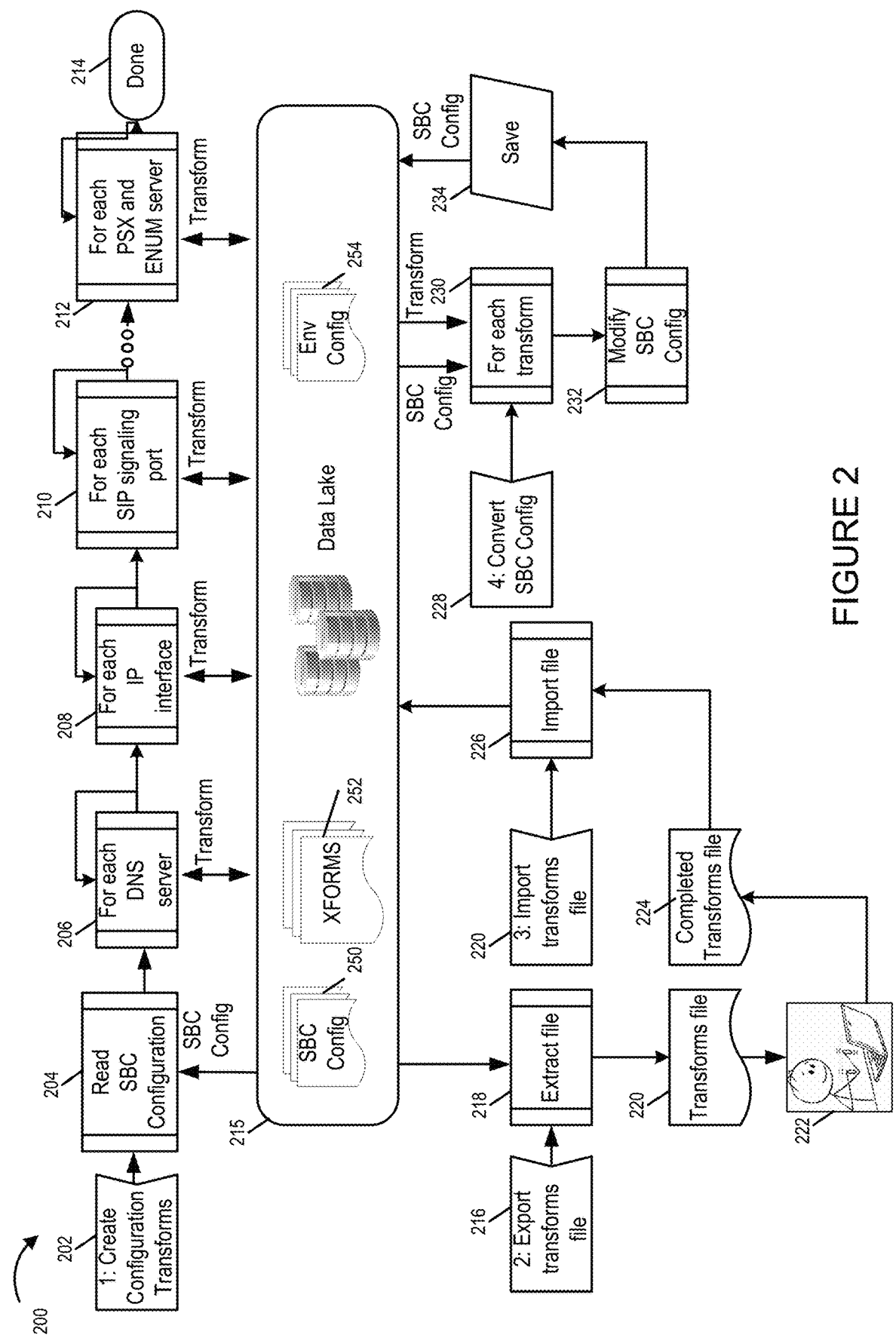
FIG. 2 illustrates an exemplary method for production twinning in which a lab SBC configuration is generated for a test or lab environment in accordance with an embodiment of the present invention.

FIG. 2 illustrates an exemplary method 200 for production twinning in which a lab network equipment device configuration is generated for a test or lab environment. In the exemplary embodiment the lab network equipment device is a Session Border Controller (SBC). The method 200 uses as its baseline the SBC configuration from the production SBC previously saved to the data lake by the backup assistant component 120. The method 200 may be, and in some embodiments is, implemented by the production twinning component 124 of system 100. The twinning method includes accepting via an Application Programming Interface (e.g., a representational state transfer architectural style (REST) API) a source SBC device name and a target device name, ingesting an production SBC configuration, generating baseline configuration transform entries and saving the baseline configuration transform entries. The production SBC configuration is then updated and modified using customer-specified transforms, typically Internet Protocol (IP) address and related transformations. The resulting SBC configuration is a lab SBC configuration which is then saved back to the data lake 215 for use during testing. In FIG. 2, the data lake 215 is a combined production data lake and lab data lake (e.g., combined production data lake 129 and lab data lake 139), or a lab data lake 139 into which the SBC configuration has been imported. While the exemplary lab network equipment device illustrated in method 200 is a SBC, the method is also applicable to, and in some embodiments is implemented on, other devices such as for example Policy and Routing (PSX) servers and call routing engine servers to configure these devices for use in testing in a lab environment. The high level flow of twinning these production devices' configuration is to utilize the production configuration as a base, then applying transforms to that configuration to modify it so that it operates in the lab environment where testing is to occur. The transforms include replacing IP addresses configured in the production configurations to those for the lab environment.

In step 202, the process of creating the lab configuration transforms begins with the generation of a transform template file with entries for each of the configuration parameters which need to be changed (i.e., transformed). Operation proceeds from step 202 to step 204. In step 204, the production twinning component reads a production SBC configuration file or record from the SBC Configuration records 250 which have been saved in the data lake 215 for example, by the backup assistant component 120.

The production SBC Configuration file will include various addresses, names and identification information for target devices (e.g., PSX servers, Domain Name System (DNS) servers, Electronic Number Mapping System (ENUM) servers) as well as IP interfaces and signaling ports which will need to be transformed to those which will be utilized in the lab or test environment. Once the SBC Configuration file has been read from the data lake, transforms are generated for DNS servers referenced in the production SBC configuration file in step 206; transforms are generated for IP interfaces referenced in the production SBC configuration in step 208; transforms are generated for SIP signaling ports referenced in the production SBC configuration in step 210; . . . ; and transforms are generated for PSX servers and ENUM servers referenced in the production SBC configuration in step 212. In some embodiments, separate steps are used for different types of transforms. In some such embodiments, a separate step is used for generating transforms for PSX server and for generating transforms for ENUM servers.

In step 206, a first DNS server transform entry is generated with information from a first DNS server included in the production SBC configuration file and populated with the information from the SBC configuration for the first DNS server. The production twinning component in step 206 also checks the transforms currently existing in the data lake to determine if there is a pre-existing transform for the first DNS server or information from which a transform for the first DNS server can be automatically generated and populated (i.e., post-transform values automatically determined and included based on existing transform(s). A transform entry for a DNS server includes full configuration path name for the DNS server (e.g., including DNS group name, DNS server number); current IP address for the DNS server, and post-transform IP address (e.g., value in the existing matching transforms if it exists; otherwise the IP address may be set to empty in the transform entry or template to be populated later, e.g., by an operator). The first DNS server transform entry once generated is then stored to the data lake 215 as one of the transform entries 252. Step 206 is repeated for each DNS server configured in the production SBC configuration. In some embodiments separate DNS server transform entries are created for each DNS server for which a transform is generated. In other embodiments, multiple DNS server transforms are include in a single DNS transform entry (e.g., all DNS transforms may be included in a single DNS transform entry corresponding to a particular production SBC configuration). Operation proceeds from step 206 to step 208.

In step 208, a first IP interface transform entry is generated with information from a first IP address included in the production SBC configuration file and populated with the information from the SBC configuration for the first IP interface. The production twinning component in step 208 also checks the transforms currently existing in the data lake to determine if there is a pre-existing transform for the first IP address or information from which a transform for the first IP address can be automatically generated. A transform entry for a IP address includes full configuration path name for the interface (e.g., including address context, IP interface group and interface name); current IP address or IP variable, IP prefix or variable, IPv6 address or variable, IPv6 prefix or variable; and post-transform IP address, IP prefix, IPv6 address, IPv6 prefix; (e.g., values in the existing matching transforms if it exists; otherwise these values are set to empty in the transform entry or template to be populated later, e.g., by an operator). The first IP interface transform entry once generated is then stored to the data lake 215 as one of the transform entries 252. Step 208 is repeated for each IP interface configured in the production SBC configuration. In some embodiments separate IP interface transform entries are created for each IP interface for which a transform is generated. In other embodiments, multiple IP interface transforms are included in a single IP interface transform entry (e.g., all IP interface transforms may be included in a single IP interface transform entry corresponding to a particular production SBC configuration).

In various embodiments, step 208 includes the generation of transforms for other IP or port interfaces such as for example SIP trunk groups. For example, in some embodiments in step 208 transforms are also generated for SIP trunk groups configured in the production SBC that have a media IP address or variable specified. In such embodiments, a first SIP trunk group transform entry is generated with information from a first SIP trunk group with media IP address included in the production SBC configuration file and populated with the information from the SBC configuration for the first SBC trunk group. The production twinning component in step 208 also checks the transforms currently existing in the data lake to determine if there is a pre-existing transform for the first SIP trunk group with media IP address or information from which a transform for the first SIP trunk group with media IP address can be automatically generated and populated (i.e., post-transform values automatically determined and included based on existing transform(s). A transform entry for a SIP trunk group with media IP address includes full configuration path name for the SIP trunk group (e.g., including address context, zone name, trunk group name); current media IP address or address variable; and post-transform media IP address (e.g., values in existing matching transforms if they exist; otherwise these values are set to empty in the transform entry or template to be populated later, e.g., by an operator). The first SIP trunk group transform entry once generated is then stored to the data lake 215 as one of the transform entries 252. Step 208 is repeated for each SIP trunk group with a media IP address configured in the production SBC configuration. In some embodiments separate SIP trunk group transform entries are created for each SIP trunk group with media IP address for which a transform is generated. In other embodiments, multiple SIP trunk group transforms are included in a single SIP trunk group transform entry (e.g., all SIP trunk group transforms may be included in a single SIP trunk group transform entry corresponding to a particular production SBC configuration).

Operation proceeds from step 208 to step 210. In step 210, a first SIP signaling port transform entry is generated with information from a first SIP signaling port included in the production SBC configuration file and populated with the information from the SBC configuration for the first SIP signaling port. The production twinning component in step 210 also checks the transforms currently existing in the data lake to determine if there is a pre-existing transform for the first SIP signaling port or information from which a transform for the first SIP signaling port can be automatically generated and populated (i.e., post-transform values automatically determined and included based on existing transform(s)). A transform entry for a SIP signaling port includes full configuration path name for the SIP signaling port (e.g., including address context, zone name, and signaling port number); current private IPv4 address or variable, public IPv4 address or variable, private IPv6 address or variable, public IPv6 address or variable; and post-transform private IPv4 address, public IPv4 address, private IPv6 address, public IPv6 address (e.g., values in the existing matching transforms if it exists; otherwise these values are set to empty in the transform entry or template to be populated later, e.g., by an operator). The first SIP signaling port transform entry once generated is then stored to the data lake 215 as one of the transform entry 252. Step 210 is repeated for each SIP signaling port configured in the production SBC configuration. In some embodiments separate SIP signaling port transform entries are created for each SIP signaling port for which a transform is generated. In other embodiments, multiple SIP signaling port transforms are included in a single SIP signaling port transform entry (e.g., all SIP signaling port transforms may be included in a single SIP signaling transform file corresponding to a particular production SBC configuration). The operation proceeds from step 210 to step 212. The . . . indicate other transforms for other target devices and/or interfaces may be, and in some embodiments are, implemented to change addressing (e.g., IP address and/or port) and contact information for the devices such as for example Network Address Translation Devices, Network Address and Port Translation Devices, Diameter Servers, Radius Servers, Security Servers, etc. which may be included in the production SBC configuration.

In step 212, a first ENUM transform entry is generated with information from a first ENUM server included in the production SBC configuration file and populated with the information from the SBC configuration for the first ENUM server. The production twinning component in step 212 also checks the transforms currently existing in the data lake to determine if there is a pre-existing transform for the first ENUM server or information from which a transform for the first ENUM server can be automatically generated and populated (i.e., post-transform values automatically determined and included based on existing transform(s). A transform entry for a ENUM server includes full configuration path name for the ENUM server; current ENUM server IP address or Fully Qualified Domain Name (FQDN); post-transform PSX server IP address or FQDN (e.g., value in the existing matching transform if it exists; otherwise the value in the transform is set to empty in the transform entry or template to be populated later, e.g., by an operator). The first ENUM server transform entry once generated is then stored to the data lake 215 as one of the transform entries 252. Step 212 is repeated for each ENUM server configured in the production SBC configuration. In some embodiments separate ENUM transform entries are created for each ENUM server for which a transform is generated. In other embodiments, multiple ENUM server transforms are included in a single ENUM server transform entry (e.g., all ENUM server transforms may be included in a single ENUM server transform entry corresponding to a particular production SBC configuration).

Once the ENUM server transforms have been generated, the PSX server transforms are generated. A first PSX server transform entry is generated with information from a first PSX server included in the production SBC configuration file and populated with the information from the SBC configuration for the first PSX server. The production twinning component in step 212 also checks the transforms currently existing in the data lake to determine if there is a pre-existing transform for the first PSX server or information from which a transform for the first PSX server can be automatically generated and populated (i.e., post-transform values automatically determined and included based on existing transforms). A transform entry for a PSX server includes full configuration path name for the PSX server; current PSX server IP address or Fully Qualified Domain Name (FQDN); post-transform PSX server IP address or FQDN (e.g., value in the existing matching transform if it exists; otherwise the value in the transform is set to empty in the transform entry or template to be populated later, e.g., by an operator). The first PSX server transform entry once generated is then stored to the data lake 215 as one of the transform entries 252. Step 212 is repeated for each PSX server configured in the production SBC configuration. In some embodiments separate PSX transform entries are created for each PSX server for which a transform is generated. In other embodiments, multiple PSX server transforms are included in a single PSX server transform entry (e.g., all PSX server transforms may be included in a single PSX server transform entry corresponding to a particular production SBC configuration).

Once the transforms have been generated, operation proceeds from step 212 to done step 214. While the operations of steps 206, 208, 210, . . . , 212 are shown as occurring in serial fashion, these steps may occur in parallel or concurrently.

In some embodiments a single transform entry is created during the create configuration transforms steps 202, 204, 206, 208, 210, . . . , 212 in which each transform has a separate record including a unique transform identifier (e.g., each DNS server transform, each IP interface transform, each Trunk Group transform, each SIP signaling port transform, each PSX server transform and each ENUM server transform is a separate record or entry in the transform entry with a separate unique identifier (e.g., a unique identifier)). In some embodiments, the record includes a field for the transform type (e.g., transform type: IP interface). In some embodiments, the transform type of the record can be determined from the unique identifier (e.g., IP_Interface_transform_ID_1).

The next step of the twinning process is for a human (e.g., operator such as a system verification tester) to set/modify the post-transform values for transform entries that were unable to be automatically populated from pre-existing transforms or information in the data lake 215 and where therefore set to a value of empty. In some embodiments, the value of empty set is a null or zero value. This export transforms file (or files) process starts in step 216, the transform file (or files) are exported from the data lake 215. Operation proceeds from step 216 to step 218. In step 218, one or more transform file or files 252 are extracted and/or retrieved and/or are outputted from the data lake 215. The operator 222 may designate the transform file (or files) or transform file information to be retrieved from the data lake 215 using for example, a GUI interface provided by GUI component 126 or the GUI component 151 of system 100. In some embodiments, where separate transform files are created for each transform or transform type only transform files including post-transform values set to empty are retrieved and/or obtained from the data lake 215. The transform file or files 220 or information contained therein are then modified, e.g., by user input from the human (e.g., operator) in step 222 to set the post-transform value for each transform having a post-transform value set to empty. In this way, the post-transform value for the lab or test environment is inputted into the transform entries/records. In some embodiments, the production twinning component (e.g., production twinning component 124 of system 100 receives the post-transform input value(s) for the transforms which have post-transform input value(s) set to empty and updates the transforms with the received post-transform input value(s). For example, the first IP interface transform record fields (e.g., transform Id field; transform type field; full configuration path name for the interface including address context, IP interface group, interface name fields; current IP address or IP variable, IP prefix or variable, IPv6 address or variable, IPv6 prefix or variable fields; and post-transform IP address, IP prefix, IPv6 address, IPv6 prefix fields) may be displayed to a human on a display via a GUI when one or more post-transform values are set to empty and the input received via the GUI from the human (e.g., operator) for each of the post-transform values received are used by the production twinning component to update the first IP interface transform record fields in particular the post-transform field value(s) (e.g., post-transform IP address, IP prefix, IPv6 address, IPv6 prefix values provided via the GUI) are used to update the corresponding fields of the first IP interface transform record by replacing the values in the record (e.g., values set to empty) with the received value(s), the received values being values compatible with or for the lab or test environment in which the test cases are to be executed.

In step 222 once the modifications to transforms entries in the transform file or files have been completed, they are outputted as completed transforms file(s) 224.

The completed transform file or files at this point need to be imported or stored back into the data lake 215. The import transform file or files process begins in step 220 and proceeds to step 226. In step 220, the production twinning component imports and/or stores the modified and/or updated completed transform file or files 224 and/or updated information for the transform file or files 224 into the data lake 215 and they are stored in the transform records/files 252. In some embodiments, each transform that has been modified or updated includes an indication that it has been modified or updated (e.g., by populating a field in the transform entry/record with an indication that it has been modified and is now complete). In some embodiments, the updated information for the completed transforms file 224 is imported into the data lake 215 via processing occurring at step 226 in which the referenced transform entries are identified and then updated in the transform entries included the data lake 215.

Once the completed transform file or files have been imported into the data lake 215 in step 226, the convert SBC configuration process commences in step 228. In convert SBC configuration process, the production twinning component ingests the production SBC configuration and transforms for the production SBC, converts the SBC configuration by applying the configuration transforms and outputs/stores the modified SBC configuration which is a lab SBC configuration in the data lake 215.

Operation proceeds from step 228 to step 230. In step 230, the production SBC configuration is once again downloaded and/or retrieved from data lake 215 SBC Configuration records/files 250. This is the same production SBC configuration read in step 204. Additionally, in step 230 transforms generated for the production SBC configuration as part of the create configuration transforms process discussed above are also downloaded or retrieved from the data lake 215 transform entries 252. In some embodiments, as discussed above a single transform entry with transform entries or records for each of the created transforms is utilized. In other embodiments, multiple transform records/entries are utilized which correspond to the production SBC configuration (e.g., a file with multiple records for each of transform or individual records for each transform) and are downloaded or retrieved from storage. In some embodiments, each transform record/entry includes an identifier which identifies one or more production SBC configurations to which it corresponds. In some embodiments, the production twinning component maintains a list of transform records/entries corresponding to each production SBC configuration and stores the list in the data lake 215. The downloaded or retrieved transform records/entries include the transforms which have been modified (e.g., the completed transforms 224). Operation proceeds from step 230 to step 232.

In step 232, the production twinning component modifies the configuration fields of the downloaded and/or retrieved production SBC configuration by applying the retrieved/downloaded transforms to the SBC configuration. This includes replacing the original configuration information/values with the post-transform values. For example, the original SBC configuration values (referred to as current values) for the first IP interface are replaced with the post-transform values for the first IP interface included in the first IP interface transform (e.g., post-transform IP address, IP prefix, IPv6 address, IPv6 prefix values). The information included in the first IP interface transform record/entry may be, and in some embodiments is, used to identify the first IP interface configuration (e.g., the first IP interface—IP address which includes the full configuration path name for the interface (e.g., including address context, IP interface group and interface name)) and the current IP address or IP variable, IP prefix or variable, IPv6 address or variable, IPv6 prefix or variable values stored in the first IP interface transform record/entry. In addition to applying the configuration transforms, the SBC configuration is also modified to enable trace records to be generated and output for every call/call flow as opposed to just the small portion of calls/call flows previously captured. This is done because each call flow will relate and/or correspond to a test case and the trace records will be needed for evaluating the results of the test case executed.

In some embodiments in which one or more SBC configurations can not be implemented in a lab environment which is to be used for the testing, the one or more SBC configurations may modified (e.g., to turn off or modify a SBC configuration feature) such as for example when external authentication is enabled, the modification step 232 may modify the setting to be local authentication if the external authentication server can not be emulated. Similarly, if the production SBC configuration has IPsec enabled and the lab environment does not support Ipsec, this SBC configuration will be modified to be disabled. In some embodiments, SBC configuration settings corresponding to features and/or functionality that cannot be tested in the automated environment are disabled.

In some such embodiments, these environment configuration setting are stored in the data lake 215 as environment configuration records/files 254. The lab environment configuration records/files 254 for the lab environment to be used for the testing is also downloaded and/or retrieved from the data lake 215 in step 230. The lab environment configuration setting in the lab environment configuration records/files downloaded/retrieved are then applied to modify the SBC Configuration in step 232. In some embodiments, the lab environment configuration modifications are implemented as configuration transforms during the create configuration transforms process. In some embodiments, a plurality of different lab environment configuration records/files are available with different lab environment configurations being available for selection based on the lab environment or test environment in which the test cases are to be performed.

Once all of the transforms and environment configuration modifications for the SBC configuration have been applied and generation of trace records enabled for all calls/call flows, operation proceeds from the modify SBC configuration step 232 to the save SBC Configuration step 234.

In the save SBC configuration step 232, the modified SBC configuration is saved and/or stored in the data lake 215 as a lab SBC configuration in SBC configuration records/files 250. In some embodiments, the lab SBC configuration record includes an indication that it is a lab SBC configuration to be used in a lab or test environment (e.g., it may specify a particular lab environment for which it is to be used) as well as an indication of the production SBC configuration from which it was generated. This allows for the identification of the call flows and test cases which will be applicable to this lab SBC configuration.

It should be noted that there is no transform entry for PKI certificates as these are generated and added by the test runner component prior to test execution. Additionally, in most embodiments there is no transform entry for calling or called numbers. The phone numbers and call routing for those numbers is left in place and what is changed is the target of those routes.

At its completion the production twinning method 200 has generated a lab SBC configuration based on the production SBC configuration but with an updated configuration including automatically mapped addressing and contact information where available for external devices (e.g., PSX servers, ENUM servers, DNS servers), IP interfaces, trunk groups, SIP signaling ports to addresses and contact information for the lab environment in which testing will occur, the method automatically re-using transforms and/or transform values from pre-existing transforms when possible. The lab SBC configuration is a twin or duplicate of the production SBC but has been modified to make it suitable for use in a lab SBC in a lab or test environment wherein the addressing, contact information and feature functionality has been modified for the lab environment in which the lab SBC is to be tested.

With respect to replicating behavior of devices which are remote to the device-under-test, in some embodiments additional functionality is included in the device under test to force the device under test to communicate with the remote target regardless of the configured target addressing. In some embodiments, the SBC configuration target addressing is updated and the remote clients are forced to assume the modified target addressing.

Traffic learning functionality, also sometimes referred to as call flow learning, includes the generation of call flows for calls. The traffic learning component 118 of function Pod 117 generates call flows based on information from actual calls during the production SBC usage in a production environment while the traffic learning component 163 of function Pod 162 generates call flows based on information from calls from test cases during lab SBC testing in the lab environment. Call flows are generated from Trace Records and Call Detail Records for calls (e.g., TRCs and CDRs generated by production device (e.g., production SBC 102 or a device under test (e.g., lab SBC 166) of system 100)). The learned call flows are stored as call flow records or entries.

Figure 10:
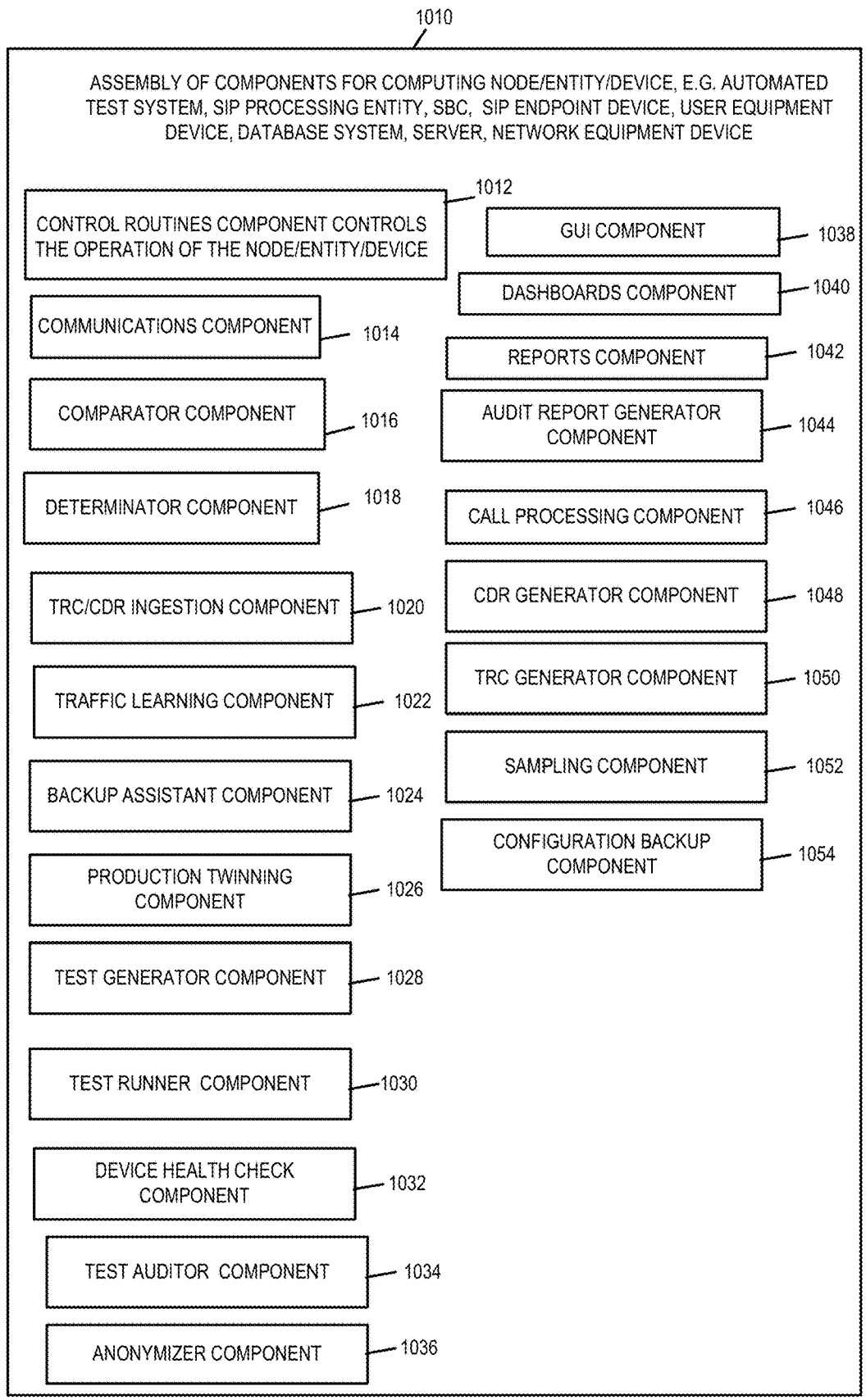
FIG. 10 illustrates an exemplary assembly of components in accordance with an embodiment of the present invention.
Figure 11:
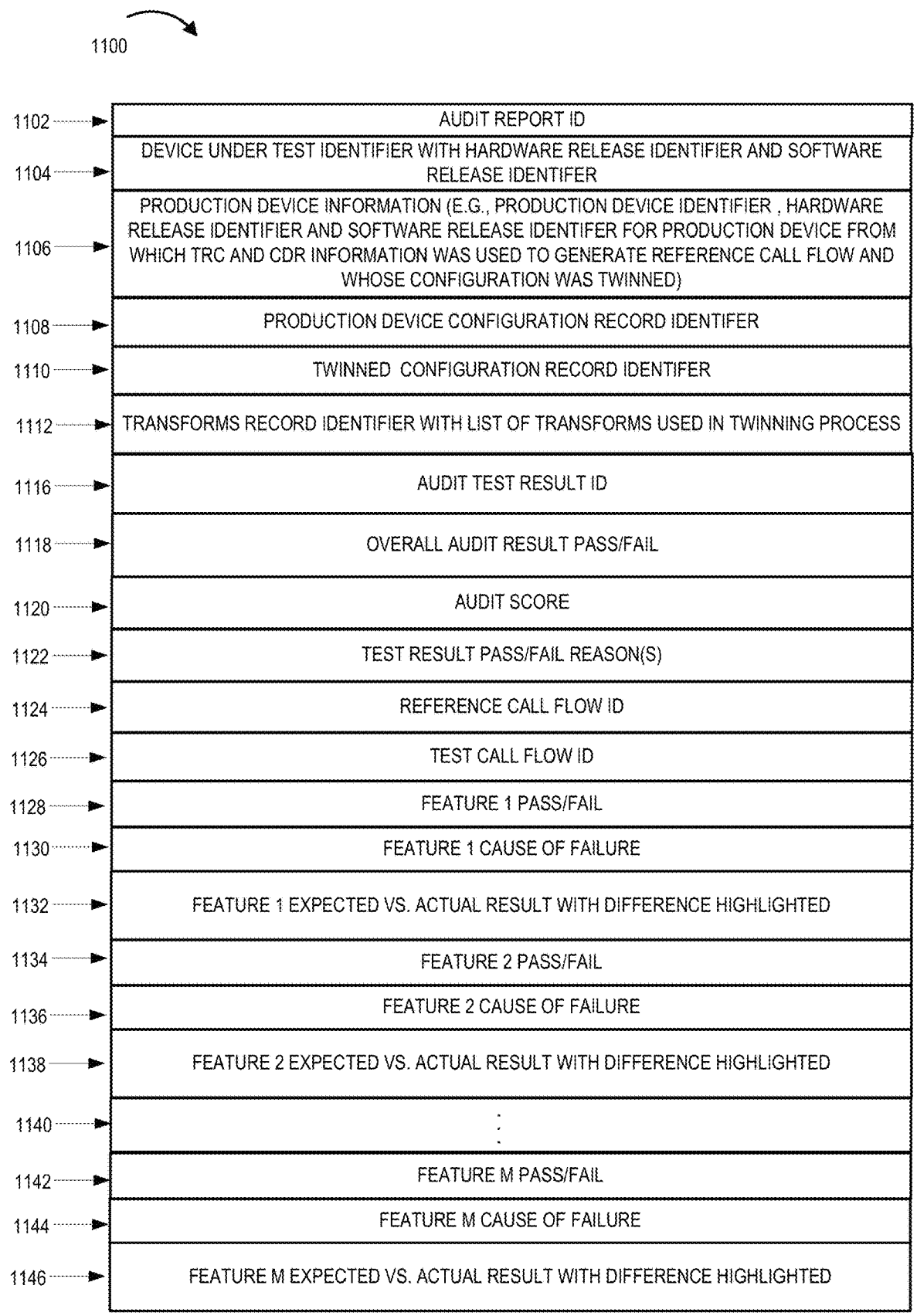
FIG. 11 illustrates an exemplary audit report in accordance with an embodiment of the present invention.

Various features of a call flow are extracted from the CDR and TRC records for the SIP call as will be discussed in detail below. FIGS. 10 and 11 provide some general information on SIP and SDP messages.

Figure 17:
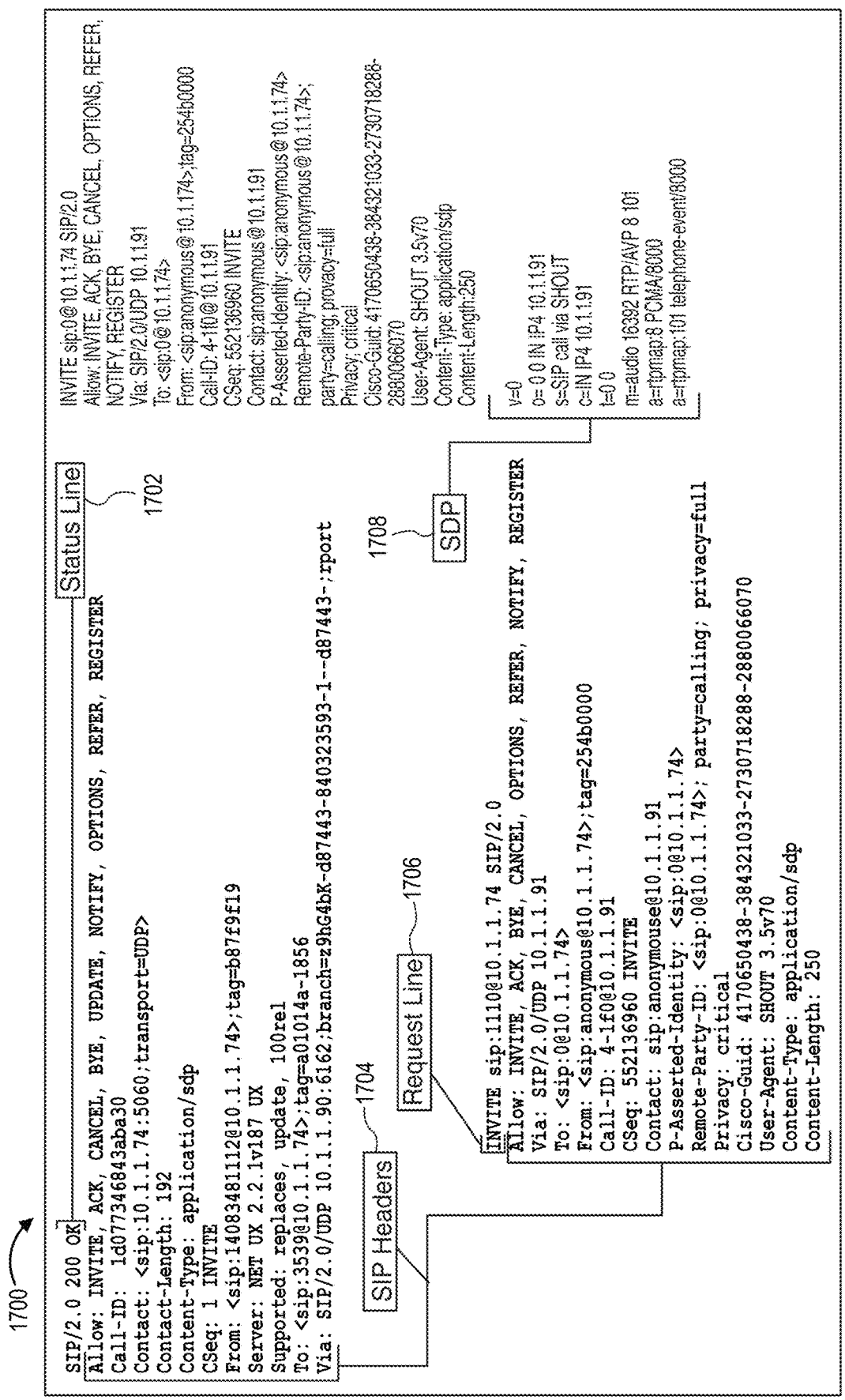
FIG. 17 illustrates the anatomy of an exemplary SIP message packet.

Diagram 1700 of FIG. 17 shows the anatomy of an exemplary SIP response message packet and an exemplary SIP INVITE request message packet including the location of the SIP headers 1704 in the exemplary SIP response and request messages, the location of the status line 1702 in the exemplary SIP response message and the location of the request line 1706 in the exemplary SIP request. The exemplary SIP response message is a SIP 200 OK response message and includes a Status line 1702, SIP Headers 1704. The exemplary SIP request message is a SIP INVITE request including a Request line 1706, SIP headers 1704, and a Session Description Protocol message 1708.

Diagram 1800 of FIG. 18 illustrates and identifies exemplary SIP packet parameters and their locations in an exemplary SIP response message including the SIP URI parameter 1802, Header parameter 1804, User URI parameter 1806. The location of the SIP packet parameters is similar for request messages.

A more in-depth description of Session Initiation Protocol (SIP) messages is provided in the "SIP: Session Initiation Protocol" Request for Comment 3261 published June 2002 by the Internet Engineering Taskforce (IETF) and last revised Jan. 21, 2020. A more in-depth description of Session Description Protocol messages is described in the "SDP: Session Description Protocol" Request for Comment 8866 published January 2021 by the Internet Engineering Taskforce (IETF).

A call flow entry includes signaling (e.g., all signaling for the call flow), features, and the CDRs for the call. The call flow entries are created and/or generated based on content of Packet Data Units (e.g., SIP PDUs) from a trace record corresponding to a call flow and the CDR content corresponding to the call flow. The call flow entry for a call flow includes important characteristics of the flow as features of the call flow. Features of a call flow include information about messages in the call flow (e.g., every message in the call flow in some embodiments), information about headers in the messages of the call flow (e.g., information about every header in every message of the call flow in some embodiments), and information about parameters included in headers of messages in the call flow (e.g., information about every parameter in every header of every message of the call flow). In some embodiments, the messages are SIP messages, the headers are SIP headers, and the parameters are SIP parameters. In some such embodiments, the features of a call flow include information about every SIP message in the call flow, information about every SIP header in every SIP message of the call, and information about every SIP parameters in every SIP header in every SIP message of the call flow. The features of a call flow also include parameters from the From and To header for every message (e.g., SIP message) and the Request Uniform Resource Identifier (RURI) of the contact header for every request message (e.g., SIP Request message). Features include information about the Session Description Protocol (SDP) message within every message (e.g., every SIP message), and attributes within the SDP message (e.g., codec lists). Features include the ingress and egress trunk group associated with or used by the call, and the route that was used for the call of the call flow. Call flows are typically only generated for completed calls (both answered and abandoned). Call flow entries are typically not generated for calls that failed due to an overload condition or an internal error of the production call processing devices (e.g., production SBC). In such cases, call flow entries are only generated for completed calls while calls that failed due to overload or an internal error are excluded from having call flows generated. A call flow entry is unique if and only if the feature values do not match any existing call flow entry. Typically, non-unique call flow entries generated from CDRs and Trace records for the purpose of generating test cases are pruned (and, hence, do not result in a test case being generated). In this way, each test case is unique. When call flow entries are generated from CDRs and TRCs resulting from the execution of test cases, no pruning is applied to the call flows generated.

Figure 3:
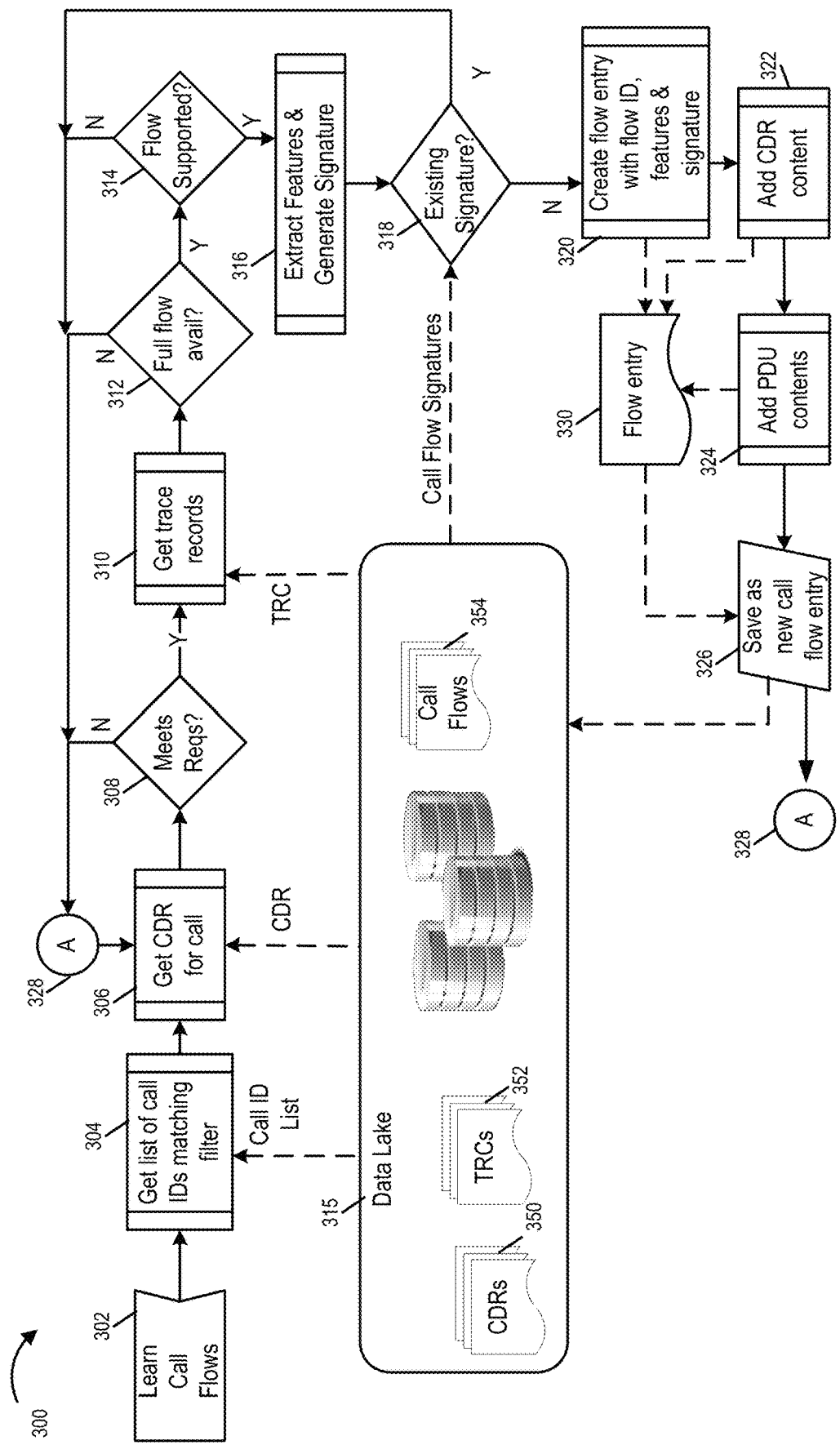
FIG. 3 illustrates steps for an exemplary method for traffic learning also sometimes referred to as traffic flow learning during which call flows are learned and/or generated in accordance with an embodiment of the present invention.

FIG. 3 illustrates steps for an exemplary method 300 for traffic learning, also sometimes referred to as traffic flow learning during, which call flows are learned and/or generated. In various embodiments, the steps of method 300 are implemented by a traffic learning component such as for example the traffic learning component 118 or traffic learning component 163 of system 100. The traffic learning component includes an Application Programming Interface (e.g., a REST API) that ingests SBC CDRs and TRC records matching a filter from a data lake (e.g., data lake 315), generates a call flow entry for all test cases to be generated and saves call flow entries to the data lake (e.g., data lake 315). In FIG. 3, the data lake 315 is a combined production data lake and lab data lake (e.g., combined production data lake 129 and lab data lake 139), or a lab data lake 139 into which production SBC CDRs and TRC records have been imported.

The traffic learning method 300 starts in learn call flows step 302. Operation proceeds from step 302 to step 304. A call flow entry includes the following information: a learning run identifier which uniquely identifies the traffic learning invocation (in some embodiments no learning run identifier is implemented and the Global Call ID value corresponding to the initial ingress leg of a call which is also included in the call flow entry is used instead to uniquely identify the traffic learning invocation), a call flow identifier that is set to a unique value (e.g., the Global Caller ID (GCID) value corresponding to the initial ingress leg of a call), CDR content of a call (e.g., the FULL ATTEMPT or STOP record CDR content as taken from the CDR file for the call), signaling and timing of every PDU on every leg of the call corresponding to the call flow, transport information for each leg (UDP, TCP, TLS information), and features associated with the call. A call flow entry is a logical construct and the information of a call flow entry may be stored in the data lake in a single call flow record of a table or across multiple tables within the data lake 315.

In step 304, the traffic learning component retrieves or gets a list of call IDs matching a filter from the data lake 315. The filter includes a device name, starting date (e.g., starting Coordinated Universal Time (UTC), and an ending date (e.g., ending UTC). The list of call IDs are for calls that meet the filter criteria and for which both a CDR and Trace Record have been generated. Operation proceeds from step 304 to step 306.

In step 306, the traffic learning component retrieves or gets a first CDR for a first call having a first call ID from the data lake 315 CDR records 350, the first call ID being one of the call IDs on the call ID list retrieved in step 304. Operation proceeds from step 306 to decision step 308.

In decision step 308, the traffic learning component makes a decision as to whether the retrieved first CDR meets one or more requirements (e.g., a set of criteria). When the first CDR for the first call does not meet the one or more requirements (e.g., the set of criteria) operation proceeds from decision step 308 via connection node A 328 to step 306 wherein the process continues with the traffic learning component retrieving or getting another CDR from the data lake 315 CDRs 350 for example using another call ID from the call ID list. When the first CDR meets the one or more requirements (e.g., the set of criteria) operation proceeds from decision step 308 to step 310. The one or more requirements are requirement(s) determining whether the CDR is for a call that has completed (e.g., requirements that a call has completed may include: (i) CDR contains information that the SIP-SIP call connected with a SIP 200 INVITE, (ii) CDR contains information that the call messaging includes a SIP INIVITE with 3xx, 4xx, 5xx, or 6xx final response call). In some embodiments, the one or more requirements further includes requirements that the TRC must have information for a complete call flow and when the TRC does not include the complete call flow, the call is excluded (for example, calls without an initial SIP INVITE message and uncleared calls (i.e., calls without a BYE message) are calls with an incomplete call flow and therefore do not meet the requirements). Similarly, CDRs that contain information that the SIP call ended with a 503 final response with Retry-after header do not meet the requirements to proceed as a 503 with retry-after indicates an overload response rather than a normal call flow. CDRs that contain information that the call includes a Disconnect Initiator value of 0 (INTERNAL) do not meet the requirements to proceed as the Disconnect Initiator value of 0 indicates that the call corresponding to the CDR was cleared due to an internal problem in call processing. In some embodiments, in step 308 the one or more requirements are a set of criteria defining characteristics of a call including for example what type of call the CDR corresponds to, whether the call terminated in a particular manner (e.g., did the call successfully complete as opposed to being terminated for an overload or internal error condition), and/or whether the TRC contains information for the complete call flow as opposed to incomplete call flow information (e.g., missing initial INVITE or without a BYE).

In step 310, the traffic learning component retrieves or gets from the data lake 315 trace records 352 a first trace record for the first call (e.g., using the first call ID). Operation proceeds from step 310 to decision step 312.

In decision step 312, the traffic learning component makes a determination based on the information in the retrieved first trace record and/or the first CDR record whether the full call flow information is available for the first call. When the traffic learning component determines that the full call flow information is not available for the first call, the traffic learning component determines that a call flow entry is not to be made for the first call and operation proceeds from decision step 312 to step 306 via connection node A 328 where the method continues with the traffic learning component retrieving or getting another CDR from the data lake 315 CDR records 350. When the traffic learning component determines that the full call flow information is available for the first call, operation proceeds from decision step 312 to decision step 314.

In decision step 314, the traffic learning component makes a determination based on the information in the retrieved first trace record and/or the first CDR record whether the call flow for the first call is a flow type that is supported or is not supported by the call flow generation software. When the traffic learning component determines that the call flow for the first call is not a call flow type which is supported, the traffic learning component determines that a call flow entry is not to be made for the first call and operation proceeds from decision step 314 to step 306 via connection node A 328 where the method continues with the traffic learning component retrieving or getting another CDR from the data lake 315 CDR records 350. When the traffic learning component determines that the call flow for the first call is of a type that is supported, operation proceeds from decision step 314 to step 316. For example in some embodiments the following are exemplary call flow types which are supported: (i) SIP-SIP call without forwarding type; (ii) SIP-SIP calls with a SIPREC call recording leg type, (iii) SIP-SIP calls with attended and unattended REFER transfer type, while the following are exemplary call flow types which are not supported: (i) SIP-SIP forked call type (i.e., SBC forked the call), and (ii) SIP-SIP call with a call recording leg type, SIP calls with Disconnect Initiator value of 0 type, SIP calls with a 503 response with Retry-after header type. In some embodiments, decision step 314 is optional. In some embodiments, which call flows are supported is a function of the lab environment in which the test cases are to be executed. Some of the exemplary not supported call flow types discussed above overlap with the exemplary examples of SIP calls where the requirements discussed in connection with decision step 308 are not met. In some embodiments, a single meets requirements decision step is used which replaces the meets requirements decision 308, full flow available decision 312 and flow supported decision 314, with its input being the retrieved CDR record and TRC record and the requirements to be met being a set of criteria including whether full flow information is available, whether the flow type is supported, and whether call requirements discussed in connection with decision step 308 have been met (e.g., the call terminated in a normal manner as opposed to an abnormal manner (e.g., as a result of an overload condition or an internal error)).

In step 315, the traffic learning component extracts features from the CDR and/or TRC record for the first call and generates or computes a signature for the first call. In some embodiments, the signature is the set of extracted features for the call. In some embodiments, the signature represents a sub-set of the extracted features. In some embodiments, the signature represents a set of characteristics of the call flow that can be compared to another call flow signature to make a determination that the two call flows are the same without doing a feature by feature comparison.

If there is an ingress SIP message manipulation (SMM) performed by the SBC or device-under-test, the SIP PDU content used for the call flow entry must be the content before the SMM is applied but unencrypted (i.e., the data as received by the SBC or device-under-test but unencrypted). If there is an egress SMM, the SIP PDU content used for the call flow entry must be the content after the SMM is applied but unencrypted (i.e., that the data or content transmitted or communicated by the SBC or device-under-test but unencrypted).

In various embodiments, the extracted features include one or more of the following:

1. The egress trunk group name.
2. For a call with a second egress trunk group, the second egress trunk group name.
3. The RURI parameters (i.e., not including the userpart or IP address or FQDN).
4. The To calling-party URL parameters (i.e., not including the userpart or IP address address or FQDN).
5. The From called-party URL parameters (i.e., not including userpart or IP address or FQDN).
6. An encoding of the sequence of SIP requests and response codes on the ingress leg, the encoding including the SIP request method type and SIP response codes.
7. An encoding of the sequence of SIP requests and response codes on egress leg.
8. For calls with a second egress leg, an encoding of the sequence of SIP requests and response codes on the second egress leg, the encoding including the SIP request method type and SIP response codes.
9. An encoding of the sequence of SIP requests and response codes on each egress leg of a call with multiple egress legs, the encoding including the SIP request method type and SIP response codes.
10. An encoding of the headers and parameter names in the messages on the ingress leg.
11. An encoding of the headers and parameter names in the messages on the egress leg or on each of the egress legs when there are multiple egress legs such as for example in call forwarding and call recording cases.
12. An encoding of the SDP field names in the messages on the ingress leg.
13. An encoding of the SDP attribute names in the messages on the ingress leg.
14. An encoding of the SDP attribute names in the messages on the egress leg or on each of the egress legs when there are multiple egress legs. The SDP codec list for each m line of each leg (ingress and egress legs) and the order in which the codecs are included on the codec list. The routing label used for the call.
15. A boolean value indicating whether more than a first quantity of audio packets (e.g., 100 audio packets) were received on the ingress leg.
16. A boolean value for each ingress leg of a call when the call has multiple ingress legs, each boolean value indicating whether more than a first quantity of audio packets (e.g., 100 audio packets) were received on the ingress leg corresponding to the boolean value.
17. A boolean value indicating whether more than a first quantity of audio packets (e.g., 100 audio packets) were sent on the ingress leg.
18. A boolean value for each ingress leg of a call when the call has multiple ingress legs, each boolean value indicating whether more than a first quantity of audio packets (e.g., 100 audio packets) were sent on the ingress leg corresponding to the boolean value.
19. A boolean value indicating whether more than a first quantity of audio packets (e.g., 100 audio packets) were received on the egress leg.
20. A boolean value for each egress leg of a call when the call has multiple egress legs, each boolean value indicating whether more than a first quantity of audio packets (e.g., 100 audio packets) were received on the egress leg corresponding to the boolean value.
21. A boolean value indicating whether more than a first quantity of audio packets (e.g., 100 audio packets) were sent on the egress leg.
22. A boolean value for each egress leg of a call when the call has multiple egress legs, each boolean value indicating whether more than a first quantity of audio packets (e.g., 100 audio packets) were sent on the egress leg corresponding to the boolean value.
23. A boolean value indicating whether call recording was activated.
24. A boolean value indicating whether transcoding was activated.

In various embodiments, the features 17 through 27 above are extracted from the CDR record for the call. In various embodiments, all of the features 1 through 27 are included and must match when determining whether two calls are the same or equivalent including when performing such matching for audit purposes discussed below.

Operation proceeds from step 316 to step 318.

In step 318, the traffic learning component determines whether the generated or computed signature matches an existing call flow signature. When the decision is that the generated or computed signature matches an existing call flow signature, the traffic learning component determines that a call flow entry is not be made for the first call and operation proceeds from decision step 318 to step 306 via connection node A 328 where the method continues with the traffic learning component retrieving or getting another CDR from the data lake 315 CDR records 350. When the traffic learning component determines that the generated or computed signature does not match an existing call flow signature, operation proceeds from step 318 to step 320. In some embodiments, step 318 includes one or more sub-steps in which the traffic learning component retrieves stored call flow signatures from the data lake 315 and compares the retrieved call flow signatures to the generated or computed call flow signature for the first call generated in step 316. When there is a match the traffic learning component determines that the first call flow is not unique and that a call flow entry is not to be generated or created for the first call flow with operation proceeding from step 318 to step 306 via connection node A 328. When the comparison of the generated or computed call flow signature for the first call does not result in a match, the traffic learning component determines that a first call flow entry is to be generated or created and operation proceeds from step 318 to step 320. When the method 300 is being implemented for calls generated from the execution of test cases, e.g., by traffic learning component 163 in implementing the method 300, step 318 is skipped or bypassed.

In step 320, the traffic learning component generates a call flow entry or record 330 for the first call which includes a unique call flow ID (e.g., GCID of first leg of call), the extracted features and generated or computed signature. Operation proceeds from step 320 to step 322. In step 322, CDR content from the CDR for the first call retrieved in step 306 is added to the call flow entry or record 330. The CDR content is typically the FULL ATTEMPT or STOP record CDR content included in the CDR file for the call. FIG. 25 illustrates an exemplary decoded STOP CDR for a call. A START CDR is generated when a call first connects. An ATTEMPT CDR is written for a call that does not complete (e.g.: called party doesn't answer and the calling party hangs up). A STOP CDR is written when a connected call ends. The START CDR content is not utilized but as discussed above the ATTEMT or STOP record CDR content is utilized. The ATTEMPT CDR content is utilized for calls which are never passed to an egress leg in the reference call flow while STOP record CDR content is utilized for calls that are passed to an egress leg in the reference call flow. In some embodiments selected CDRs fields and the corresponding field content is included in the call flow record as opposed to all CDR content, the selected CDR fields and content including one or more of the following: (i) Call Disconnect Reason, (ii) Call Direction, (iii) Calling Number, (iv) Called Number, (v) Number of Called Num Translations Done by This Node, (vi) Billing Number, (vii) Route Label, (viii) Route Selected, (ix) Ingress Trunk Group Name, (x) Originating Line Information, (xi) Jurisdiction Information Parameter, (xii) Carrier Code, (xiii) Calling party Nature of Address, (xiv) Called party Nature of Address, (xv) Ingress Signaling Type, (xvi) Egress Signaling Type, (xvii) Disconnect Initiator, (xviii) Calling Party Number Presentation Restriction, (xix) Dialed Number NOA, (xx) Ingress Codec Type, (xxi) Egress Codec Type, (xxii) Ingress RTP Packetization Time, (xxiii) Policy Response Call Type, (xxiv) Calling Name, (xxv) Call Disconnect Reason Transmitted to Ingress, (xxvi) Call Disconnect Reason Transmitted to Egress, (xxvii) Script Name, (xxviii) Generic Number Number, (xxix) Generic Number Presentation Restriction Indicator; (xxx) Generic Number Numbering Plan, (xxxi) Generic Number Type, (xxxii) Ingress SRTP (STOP only), (xxxiii) Egress SRTP (STOP only); (xxxiv) Call Recorded Indicator, (xxxv) Transcode Indicator, (xxxvi) Emergency Indicator, (xxxvii) Ingress Zone Name, (xxxviii) Egress Zone Name, (xxxiv) Ingress Zone Id, (xxxv) Egress Zone Id, (xxxvi) Video Cac, (xxxvii) Ingress IP Prefix Found TG Name, and (xxxviii) Ingress Trunk Group for PSX routing.

Operation proceeds from step 322 to step 324. In step 324, PDUs from the trace record for the first call is added to the call flow entry or record 330. In some embodiments, a generate call flow entry or record replaces the steps 320, 322, and 324 of method 300 with one or more steps 320, 322, and 324 being sub-steps of the generate call flow entry or record step. Once the call flow entry or record has been generated and populated with extracted features, signature, CDR content and PDU contents, operation proceeds to step 326.

In step 326, the traffic learning component stores or saves the new call flow entry 330 to the data lake 315 as part of the call flow records 354. Operation proceeds from step 326 to step 306 via connection node A 328 where the method continues with the traffic learning component retrieving or getting another CDR from the data lake 315 CDR records 350.

In some embodiments, each call flow entry includes the following information: a learning run identifier, a call flow identifier to identify the call flow, signaling of every PDU on every leg of the call (e.g., the content and network characteristics of every PDU on every leg of the call), transport information for each leg of the call (UDP, TCP, TLS, etc.), extracted features of the call, and call flow signature.

With respect to generating test cases, the test generator component 155 generates a test case entry based on a call flow entry. In some embodiments, a test case entry is generated for every call flow entry (e.g., generated by the method 300). Each test entry includes SIPp script(s) for simulating the remote endpoints (e.g., remote devices) and meta-data required to properly configure the remote endpoints. For example, a SIPp script and wrapper script is generated for every leg of a call flow. Furthermore, each test entry uses the addressing (e.g., for the endpoints) as translated by the twinning function. Additionally, the test generator 155 saves or stores the canned test cases 141 to the lab data lake 139. In some embodiments, the test generator component 155 in addition to generating the SIPp scripts also generates a wrapper script for each SIPp script for each call flow leg of a call flow. The remote endpoints may be for example a SIP device placing a call, a SIP device receiving a call, a PSX server, ENUM server, DNS server, etc.

In various embodiments, the test generator component 155 performs the following functions: receives a learning run identifier, ingests the matching call flow entries from the data lake (e.g., lab data lake 139) in which the call flows (e.g., call flows 144) are stored, generates SIPp scripts and meta data (e.g., remote endpoint configuration information) for simulating the test case in a lab environment, stores the scripts and meta data into the data lake (e.g., as part of the test cases 142), generates a test entry for every call flow, stores the test entry into the data lake (e.g., as part of the test cases 142). In some embodiments, the meta data is stored separately from the SIPp scripts. In some embodiments, the meta data is included or incorporated in the SIPp scripts. In various embodiments, the test generator component 155 includes a REST API that accepts a learning run identifier, ingests the matching call flow entries from the data lake in which the call flows are stored, generates SIPp scripts and meta data for simulating the test case in a lab environment, stores the scripts and meta data into the data lake, generates a test case entry for every call flow entry, stores the test entry into the data lake (e.g., lab data lake 139).

Figure 4:
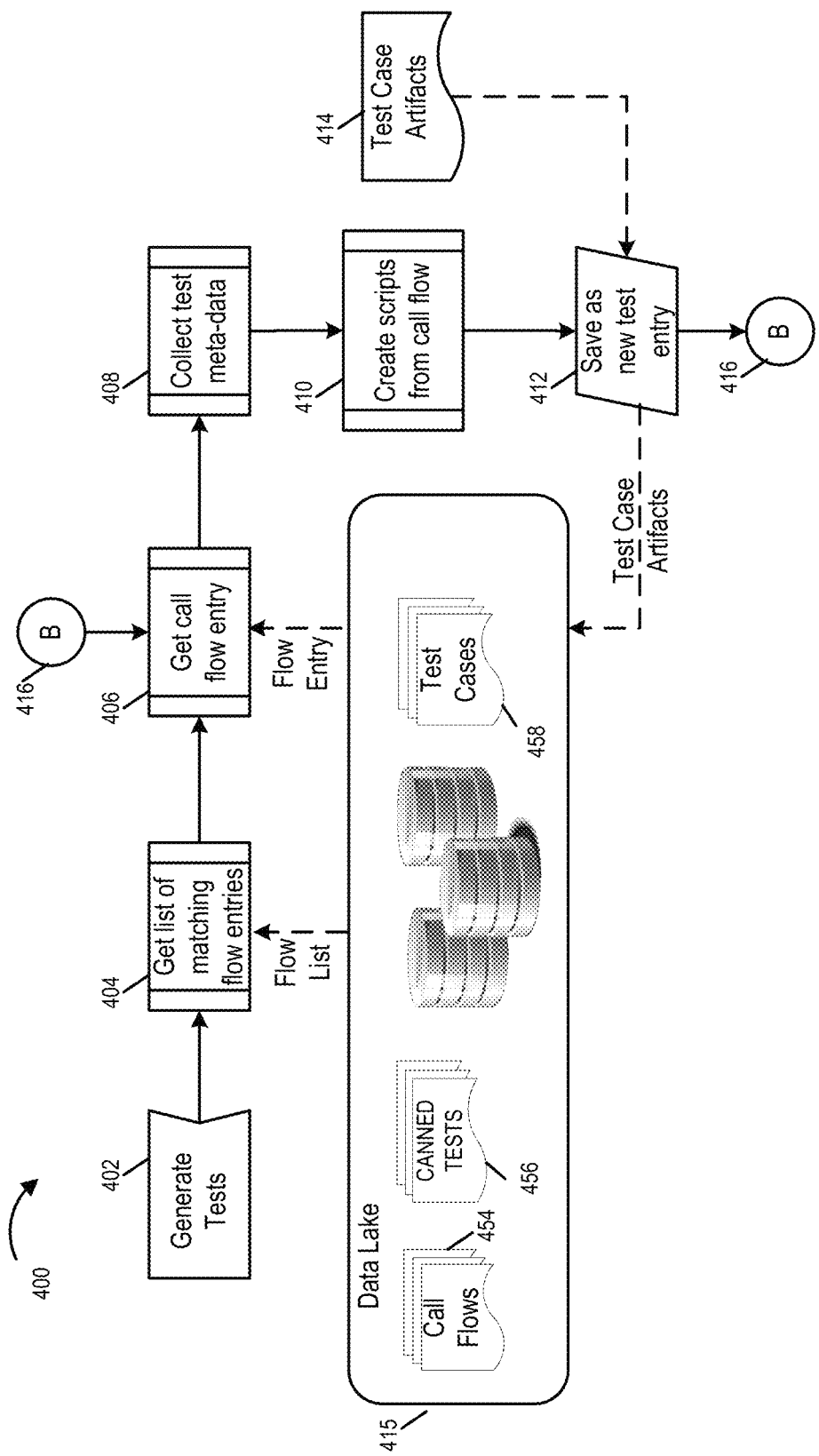
FIG. 4 illustrates an exemplary method 400 for generating call flow test cases in accordance with an embodiment of the present invention.

FIG. 4 illustrates an exemplary method 400 for generating call flow test cases in accordance with an embodiment of the present invention. The method 400 may be, and in some embodiments is, implemented by the test generator component 155 of the learning-based test system 114 of system 100. The method 400 begins in step 402 and proceeds from step 402 to step 404. In step 404, the test generator component gets a list of matching flow entries from the data lake 415. In FIG. 4, the data lake 415 is a combined production data lake and lab data lake (e.g., combined production data lake 129 and lab data lake 139), or the lab data lake 139.

The list of matching flow entries may be obtained by querying the data lake 415 for a list of flow entries which match one or more criteria (e.g., a criteria may be, and in some embodiments is, calls processed by a particular production SBC, or calls received from a particular peer, or calls routed to a particular egress trunk group. The query may be of the information included in the call flow entry record(s) 454 in the data lake 415. In some embodiments, the call flow entry record(s) 454 are the call flow records 354 of FIG. 3 and/or the call flow records 144 of FIG. 1. The list of matching flow entries includes a list of call flow identifiers (e.g., a list of group call flow identifiers). Operation proceeds from step 404 to step 406. In step 406, the test generator component gets a call flow entry from the data lake 415 call flow records 454 using the information in the list of call flow entries obtained in step 404 (e.g., using a call flow entry identifier included on the list of call flows retrieved from the data lake 415). Operation proceeds from step 406 to step 408. In step 408, the test generator component collects call flow meta-data for the call flow entry. The call flow meta-data includes routing and address information (e.g., the post-transform addresses and/or contact information) for the remote endpoint devices with which the device-under-test (e.g., lab SBC) is to interact/communicate with). Operation proceeds from step 408 to step 410. In step 410, the test generator component generates or creates a new test entry (e.g., a first test entry for a first call flow). The generation or creation of the new test entry includes automatically generating or creating a SIPp script for each call leg of the call flow based on the call flow entry retrieved in step 410. In various embodiments, the test generator component also generates or creates a wrapper script for the SIPp script during step 410. In some embodiments, the SIPp script is automatically generated using a set of rules which are applied to the call flow entry. By way of example, a call flow will include entries which are a send or receive of a SIP packet. The test generator starts with a templatized SIPp send or a SIPp receive and then replaces the headers/parameters with those from the call flow record. Operation proceeds from step 410 to step 412. In step 412, the test generator component adds test case artifacts 414 to the test entry created or generated in step 410 and saves or stores the new test entry with the test case artifacts in the data lake 415 test case records 458 (e.g., test case records 142 of FIG. 1), the test case artifacts being, for example, the meta-data used to create/generate the test entry and/or learning run identifier and call flow identifier which will allow for backtracing from the test case to the call flow from which it was generated. Operation proceeds from step 412 via connection node B 416 to step 406. In step 406, the test generator component gets or obtains the next call flow on the list of call flow entries obtained in step 404. The method 400 proceeds as previously described until a test entry has been created for each call flow entry on the call flow list obtained in step 404.

The test runner component of the system 100 is responsible for executing test cases. At a high level for each test case, the test runner component loads the test artifacts, sets up the lab or test environment, executes the test (e.g., test script(s) such as SIPp script(s) and wrapper script(s)), and then creates and saves the test results to the lab data lake. Prior to the test runner component executing or running tests, the lab environment or test environment is set-up for the testing to be performed. For a virtualized device-under-test (e.g., a virtual SBC), the virtualized device-under-test is instantiated by an external orchestration environment or orchestrator for the lab environment or test environment. For a hardware device-under-test (e.g., a hardware SBC), the physical device-under-test (e.g., hardware SBC) is physically installed and connected to various communications connections of the lab environment or test environment. The device-under-test software and/or firmware version/release to be tested is installed. In various embodiments, an ASAN-enabled software build is utilized. The basic device-under-test configuration (e.g., lab SBC configuration) required for bringing up the device-under-test is then applied. This includes for example the: (i) logical management interfaces being configured with IP address, network prefix, etc., (ii) default route for management interfaces being configured, and the Network Time Protocol (NTP) address being configured. All necessary licenses are configured in the device-under-test (e.g., lab SBC) or are loaded into the device-under-test. The learning-based test system (e.g., TRC/CDR ingestion component 161 of function Pod 160 of learning-based system 114) is also configured to ingest CDR and TRC records from the device-under-test (e.g., lab SBC 166) and store them in the data lake (e.g., lab data lake 139).

In some embodiments, the test runner component provides an Application Programming Interface (e.g., a REST API) that: (i) accepts testing parameters (e.g., parameters which define a filter criteria for identifying test cases or entries to be executed), (ii) loads all the test case execution entries from the data lake which include the matching parameters (e.g., test case entries from test case records 142 in the lab data lake 139 which match the filter criteria defined by the accepted testing parameters), (iii) loads the configuration for the test cases onto the device-under-test (e.g., lab SBC 166) if specified, (iv) executes the associated tests, and (v) generates and stores a test execution result into the data lake (e.g., test result records 145 in lab data lake 139). In some embodiments, the testing parameters include one or more of the following: (i) a test group identifier, (ii) a device-under-test device name (e.g., SBC device name), (iii) device-under-test management IP address; and (iv) an optional device-under-test initial configuration identifier for a device-under-test initial configuration stored in the data lake.

The operations performed by the test runner component in some embodiments include: (i) loading the Device-Under-Test (e.g., Lab SBC) with an initial configuration that was created by the twinning function component, (ii) optionally creating and installing TLS keypairs into the Device-Under-Test (e.g., Lab SBC) for use in TLS connections, (iii) performing any pre-test case configuration changes before running a test, (iv) run tests (e.g., tests generated by the Test Generation component) and monitor for test outcome, (v) determine whether the call flow of the test succeeded, (vi) determine whether any anomalous events (such as for example a coredump) occurred on the Device-Under-Test (e.g., Lab SBC) during the test, (vii) collect telemetry associated with the test and generate a test result record in which the result of the test are saved, (viii) saves the test result record to the lab data lake, (ix) cleans up any pre-test modification after a test is complete (successful or not) or a test is skipped or aborted.

Figure 5:
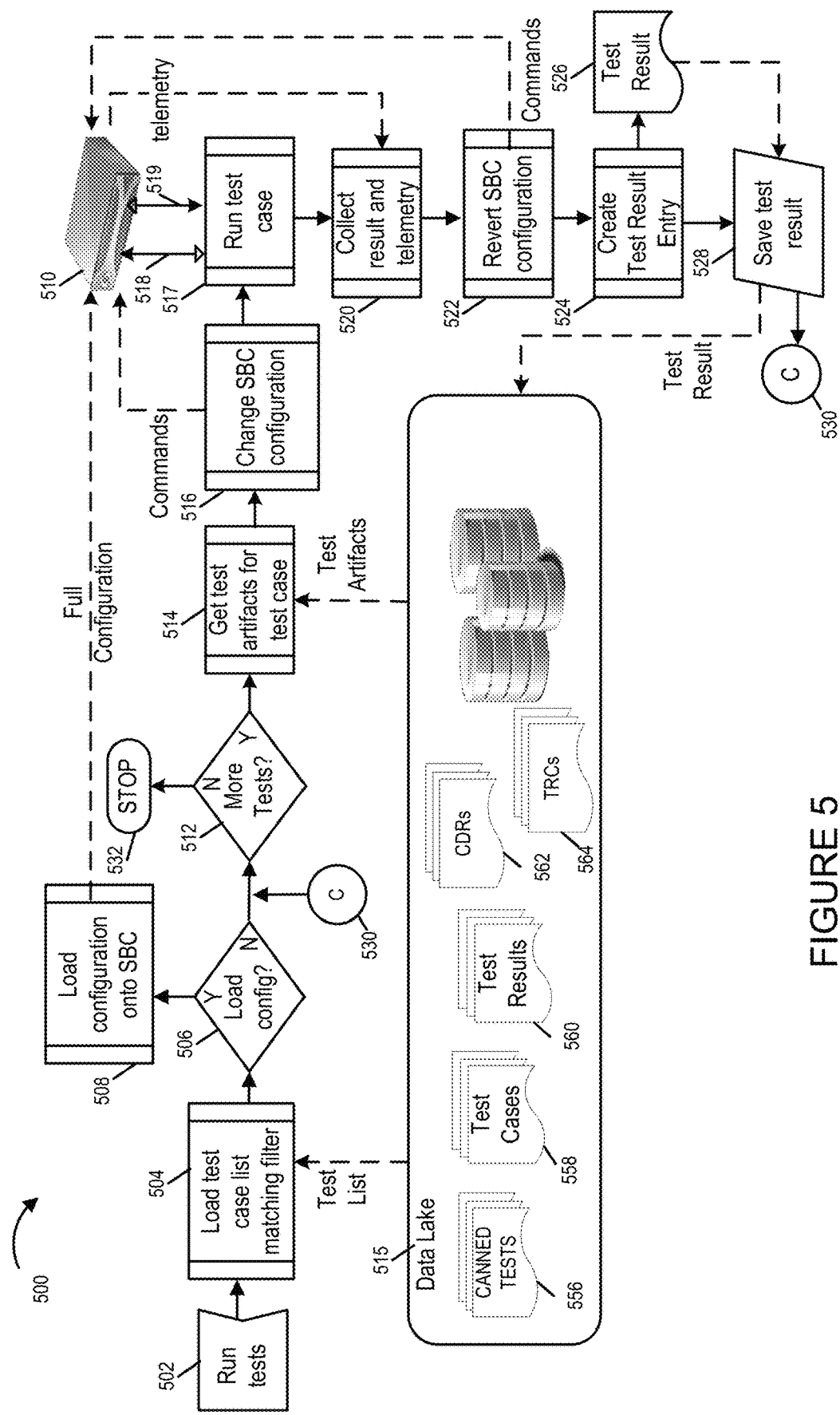
FIG. 5 illustrates an example method 500 for running or executing tests in accordance with an embodiment of the present invention.

FIG. 5 illustrates an example method 500 for running or executing tests in accordance with an embodiment of the present invention. In FIG. 5, the data lake 515 is a combined production data lake and lab data lake (e.g., combined production data lake 129 and lab data lake 139) or a lab data lake 139.

The method 500 may be, and in some embodiments is, implemented by the test runner component 158 of the learning-based testing system 114 of system 100. The method 500 commences in step 502. Operation proceeds from step 502 to step 504. In step 504, the test runner component uses a filter to query the canned test records 556 and/or test case records 548 in the data lake 515 to identify a list of test cases from the data lake 515 which match the filter requirements and/or criteria. The canned test records 556 may be, and in some embodiments are or include, the canned test case records 456 from FIG. 4 and/or the canned tests records 141 from FIG. 1. The test case records 558 may be, and in some embodiments are or include, the test case records 458 from FIG. 4 and/or the test case records 142 from FIG. 1. The list of test cases may be obtained by querying the data lake 515 for a list of test case records which match one or more criteria specified by the filter (e.g., criteria may be, and in some embodiments is, a SIP call of particular call flow type (e.g., SIP to SIP calls between two SIP remote endpoints with varying IP addresses for each remote endpoint device, SIP calls arriving on a particular SIP trunk group, or SIP calls egressed to a particular peer network). Operation proceeds from step 504 to decision step 506. In decision step 506, the test runner component determines whether or not the Device-Under-Test which in this example is a Lab SBC (e.g., Lab SBC 166 of system 100) needs to have its configuration loaded. Operation proceeds from step 506 to step 508 when the determination is that yes the Lab SBC needs to have its configuration loaded onto the Lab SBC to configure the Lab SBC for the test or tests to be run or executed on the Lab SBC. When the determination is that the Lab SBC does not have to have its configuration loaded onto the Lab SBC because it is already configured for the test or tests to be performed, operation proceeds from step 506 to decision step 512. In step 508, the test runner component loads configuration information for the first test case to be run onto the Lab SBC 510 (e.g., Lab SBC 166 from system 100). The SBC configuration is the configuration generated by the production twinning component for the call flow from which the test case to be executed was generated. Once the lab SBC has been loaded with the SBC configuration operation proceeds from step 508 to step 512.

In the decision step 512, the test runner component determines whether or not there any additional tests to be run and when the answer is no, then operation proceeds from step 512 to step 532. In step 532, the method stops or comes to an end as all tests on the list of test cases retrieved in step 504 have been executed. When the test runner determines in decision step 512 that there are more test cases to be run or executed, operation proceeds from step 512 to step 514. In step 514, the test runner component retrieves test artifacts for the test case to be executed from the test entry for the test case included in the test case record (e.g., one of the test case entry/records 556 or 558). In some embodiments, the test artifacts include the transform entries generated during the production twinning process. In various embodiments, the test case artifacts includes for example the meta-data used to create/generate the test entry and/or learning run identifier and call flow identifier which will allow for back tracing from the test case to the call flow which it was generated, the meta-data including, for example, post-transform addressing and/or contact information for the lab SBC and endpoint devices with which the lab SBC will communicate during the test. The meta-data may, and in some embodiment does, include Transport Layer Security (TLS) keypairs for use in TLS connections. Operation proceeds from step 514 to step 516. In step 516, the test runner changes the lab SBC configuration based on the retrieved test artifacts for the test case to be executed. Step 516 includes sending commands to the lab SBC 510 to change the configuration of the lab SBC 510 to match test artifacts retrieved from the data lake test case entry record (e.g., changing IP addresses and contact information for endpoint devices (e.g., the DNS server, ENUM server, etc.) with which the lab SBC 510 will communicate during the test. In some embodiments there are no modifications which are required. Once the lab SBC 510's configuration has been modified for the specific test case to be executed, operation proceeds from step 516 to step 517.

In step 517, the test runner component runs or executes the test case (e.g., the first test case on the list of test cases). Step 517 includes obtaining the test case record for the first test case on the list of test cases from either the canned test records 556 or the test case records 558 depending on whether the first test case on the list of test cases is a canned test case or not. Running the test case includes executing the test scripts of the test case wherein SIP messages are sent to and received from the SBC 510 as shown in steps 518 and 519. The test runner component emulates or mimics endpoint devices or client devices with which the lab SBC interacts by sending the SIP messages included in the test script or scripts and in some embodiments media once a call connection has been established between two endpoint or client devices (e.g., a first SIP endpoint device such as for example a phone and a second SIP endpoint device such as for example a phone via the lab SBC). In some embodiments, the test runner component executes instructions of the test script for mimicking one or more of the following: one or more calling test clients, one or more called test clients, one or more calling media test clients, one or more called media test clients, one or more call recording test clients. Operation proceeds from step 517 to step 520. In step 520, the test runner component collects telemetry and test result information from the lab SBC 510. The test runner component checks the SBC device-under-test for any anomalous post-test conditions for example coredumps and ASAN logs indicating issues. The test runner component also monitors the test clients for failure codes indicating retry-required and/or codes indicating an outright failure. Based on the collected telemetry the test generator makes a determination as to whether or not the test was a success or failure. When post-test anomalous conditions are detected at the device-under-test (e.g., lab SBC), the test runner component determines that the test has been a failure. When the monitored telemetry of the test clients indicate there has been a failure (e.g., based on a failure code), the test generator component determines that the test has failed. When the test has completed without failure codes or anomalous post-test conditions being detected, the test runner component determines that the test was a success. During the execution of the test, the device-under-test, e.g., lab SBC, will generate CDRs/TRCs records for the test call (e.g., CDR/TRC 169 of Lab SBC 166 of system 100) which will be ingested into the data lake 515 as CDRs 562 and TRCs 564 previously described in connection with system 100 and/or method 200. Operation proceeds from step 520 to step 522. In step 522, the test runner sends commands to the lab SBC 510 to revert the lab SBC 510's configuration back to SBC configuration loaded in step 508 reversing the changes made to the lab SBC 510's configuration in step 516. Operation proceeds from step 522 to step 524. In step

524, the test runner component creates and/or generates a test result entry or record 526 including the test result information and telemetry collected in step 520. In some embodiments, the telemetry includes information such as for example, maximum device under test CPU utilization during the test execution and amount of free memory available after test execution. In some embodiments, the telemetry includes the CDR and TRC records created and/or generated by the device-under-test SBC 510 for the call corresponding to the test case. In some embodiments, the test result entry includes information to identify the test case executed and whether the test case passed or failed in addition to the telemetry data collected during the test case's execution. In some embodiments, the test result entry or record includes: a run identifier, a test identifier, an indication of whether each test script executed passed or failed, a test execution start timestamp (which can be used to identify the corresponding CDR and TRC if saved separated from the test result entry or record for the test), a test execution duration, and a SIP callID of the initiating call leg. Operation proceeds from step 524 to step 528. In step 528, the test result entry or record generated in step 524 is saved or stored in the data lake 515 test results entry records 560. Operation proceeds from step 528 via connection node C 530 to step 512 where the test runner component determines whether or not there are additional test cases to be run or executed on the list of test cases obtained in step 504 as previously described. When the determination is that there are not additional test cases to be run or executed operation proceeds from step 512 to stop step 532 where the method 500 terminates or ends. When there are additional test cases to be executed or run operation proceeds to step 514 and the method 500 continues as previously described with respect to the next test case on the list of test cases.

In various embodiments of the invention, a test auditor component is used to analyze or audit the test results for a test case. The test auditor analyzes and/or compares the signaling features in a reference call flow record or entry to the signaling features of a call flow generated for the test case and determines relevant discrepancies which indicate a problem or issue with the call of the test case. The reference call flow record or entry is the call flow utilized to generate the test case. The test auditor component also compares the CDR content between the reference call flow used to generate the test case and the CDR generated by the device-under-test (e.g., lab SBC) for the test case. The test auditor component generates audit results for test cases and stores them as test audit result entries or records in the data lake (e.g., audit results records 146 of lab data lake 139). The information in the audit results entries/records can, and typically are, then accessed to generate audit testing reports and for visualizing the audit test results for example via the GUI component 151, Dashboards component 152, and reports components 153 of feature Pod 150 of system learning-based test system 114.

The test auditor component 165 of the learning-based test system 114 is responsible for auditing the test results of executed test cases. In various embodiments, the test auditor component determines whether a test call flow has an equivalent flow to the reference call flow from which the test case was generated. It should be understood that in environments where call routing is non-deterministic, not all reference call flows will end up being replicated by a test case, hence the need to determine whether the test call flow is equivalent to the reference call flow. The test auditor component in various embodiments generates or creates an audit entry/record for each test case result being audited that confirms or rejects the notion that the test call flow is the same as or equivalent to the reference call flow. For example, the test auditor component may include in an audit result entry/record an indication of whether the test call flow passed or failed the audit based on whether the audit of the test result resulted in the confirmation that the test call flow was the same as or equivalent to the reference call flow. In some embodiments, when the call routing is non-deterministic (for example, because the route selection is probabilistic) and the test call flow does not match the reference call flow, the test auditor component schedules the test case to be re-executed up to a maximum number of times. The test auditor compares the results of each re-executed test case (i.e., the test case call flow generated from the re-executed test case call records) to the reference call flow to determine if there is a match. If one of the test call flows from the re-executed test cases matches, then the auditor determines that the test case has passed; otherwise, it is determined to have failed for inability to match the non-deterministic routing feature(s). An example of this occurs when a PSX server is configured to utilize a randomized selection or ordering of routes for a call to a first telephone number and the SBC is relying on the PSX server for routing selection for SIP calls. When the production SBC receives a SIP call with the destination being the first telephone number, the PSX server will be consulted by the production SBC. The production SBC will receive a listing of routes in the order route A, B, C from the PSX server. The production SBC tries route A first and it succeeds. The reference call will now include the feature of the selection of route A. Now on the test setup in the lab environment when the corresponding test case is executed, when the lab SBC receives the SIP test call with the destination being the first telephone number, the lab PSX server with the same configuration as the production SBC will be consulted by the lab SBC. The lab SBC will receive a listing of routes with a randomized ordering. For example, it can receive route listing with an order of B, A, C. The lab SBC will send or route the SIP test call to B. Since the test runner receives this call as it is emulating the destination, the call will actually succeed. But the call flow is not an exact replication of the reference call flow as the reference call flow used route A and the test call used route B. As a result, the auditor component when it compares the test call flow record to the reference call flow record will determine that route A was used in the reference call flow and route B was used in the test call flow. Upon making this determination, the auditor component will schedule the test for a retry. With sufficient retries, the lab PSX will return a route list with A at the head of the list and then the test call flow record will exactly match the reference call flow. However, to limit the number of re-tries and prevent a perpetual loop should the lab SBC have an actual processing error causing the failure of the test with respect to this routing feature, a maximum number of re-tries is configured after which the test case is determined to have failed.

In various embodiments, the test auditor component 165 makes the determination of whether or not the test call flow is the same as or equivalent to the reference call flow based on a set of rules. The set of rules include one or more of the following.

If the specific messages, e.g., SIP messages, in the test call flow do not match the specific messages in the reference call flow then the test call flow and reference call flow are determined to not be the same or equivalent.

If the specific messages in the test call flow and the messages in the reference call flow match but the ordering of the messages in the test call flow does not match the ordering of the corresponding messages in the reference call flow then the test call flow and the reference call flow are determined to not be the same or equivalent. For example, if a test call flow succeeded (e.g., completed), but the reference call flow indicated a SIP 180 ringing message while the test call flow produced a SIP 183 message, this is considered a mismatch that is not the same or equivalent.

If the headers in a message, e.g., a SIP message, in a test call flow do not match the headers in the corresponding message in the reference call flow then the test call flow and the reference call flow are determined to not be the same or equivalent. Headers in the messages in a flow should be deterministic based on the configuration and the input messages. As a result of this fact, headers in the test call flow message should match the headers in the corresponding message in the reference call. When the test call message has added or omitted headers when compared to the reference call flow there is a mismatch which is a cause for further investigation.

If the parameters of a header in a message (e.g., SIP message) in a test call flow do not match the corresponding parameters of the corresponding header in corresponding reference call flow then the test call flow and the reference call flow are determined to not be the same or equivalent. Parameters in a header can sometimes be important, and these should be deterministic for a given configuration and input messaging.

If the Session Description Protocol (SDP) content of a message in a test call flow does not match the SDP content of a corresponding message in the reference call flow then the test call flow and the reference call flow are determined to not be the same or equivalent. The SDP content of a message is critical. Differences in the SDP content can indicate likely issues in the media negotiation or the future quality of the audio for the call.

If the parameters of the From header of a message in a test call flow do not match corresponding parameters of the corresponding From header of the reference call flow then the test call flow and the reference call flow are determined to not be the same or equivalent. The test call flow From header user and host portion may be different than the reference call flow, but the parameters should not be if the test call flow and the reference call flow are equivalent.

If the parameters of the To header of a message in a test call flow do not match corresponding parameters of the corresponding To header of the reference call flow then the test call flow and the reference call flow are determined to not be the same or equivalent. The test call flow To header user and host portion may be different than the reference call flow, but the parameters should not be if the test call flow and the reference call flow are equivalent.

If the parameters of the Request-Uniform Resource Identifier (RURI) of the contact header of a message in a test call flow do not match the corresponding parameters of the RURI of the contact header of the corresponding message in the reference call flow then the test call flow and the reference call flow are determined to not be the same or equivalent. The test call flow contact header RURI user info part and host part may be different than the reference call flow, but similar to the From header and the To header the parameters should not be different if the test call flow and the reference call flow are equivalent.

If the invariant fields of the CDR in a test call flow do not match those of the reference call flow, then the test call flow and the reference call flow are determined to not be the same or equivalent. In adverent changes in the invariant fields of a CDR are difficult to manually check and can affect customers' backend billing systems. This aspect of the present invention overcomes and are a technical solution to these difficulties/problems.

Figure 6:
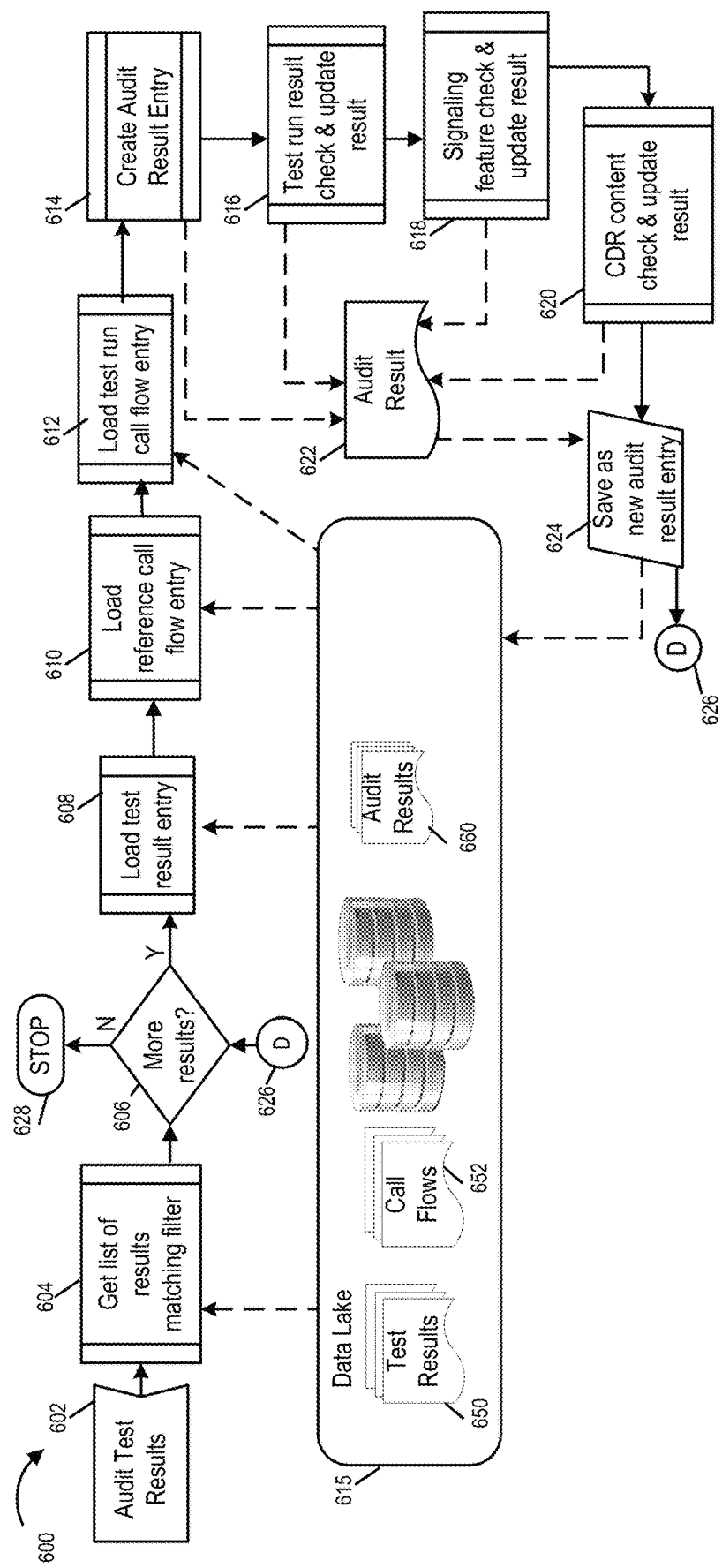
FIG. 6 illustrates an exemplary method of auditing test results in accordance with an embodiment of the present invention.

FIG. 6 illustrates an exemplary method 600 in accordance with an embodiment of the present invention. The method 600 illustrates steps for performing audits of test results. In some embodiments, the method 600 is performed by the test auditor component 165 of function Pod 164 of the learning-based test system 114 of system 100. In FIG. 6, the data lake 615 is a combined production data lake and lab data lake (e.g., combined production data lake 129 and lab data lake 139) or a lab data lake 139.

The method 600 commences in step 602. Operation proceeds from step 602 to step 604. In step 604, the test auditor component uses a filter to query the test results entries/records 650 in the data lake 615 to identify a list of test result entries/records from the data lake 615 which match the filter requirements and/or criteria. The test result entries/records 650 may be, and in some embodiments are or include, the test result entries/records 560 from FIG. 5 and/or the test results entries/records 145 from FIG. 1. The list of test result entries/records may be obtained by querying the data lake 615 for a list of test result entries/records which match one or more criteria specified by the filter (e.g., criteria may be, and in some embodiments is, a test result identifier or a non-empty set of test result identifiers). In some embodiments, the filter is list of parameters including for example one or more of the following: a reference call flow group ID, a learning run ID, target device, and test execution run Id. Once the list of test result entries/records matching the filter criteria are obtained from the data lake 615, operation proceeds from step 604 to decision step 606. In decision step 606, the test auditor component determines whether or not there are test result entries/records on the list of test result entries/records list retrieved in step 604 that need to be audited. When the determination is yes that there are test result entries/records on the list of test result entries/records retrieved in step 604 which need to be audited operation proceeds from step 606 to step 608. When the determination is that there are no more test result entries/records on the list of test result entries/records retrieved in step 604 that need to be audited operation proceeds from step 606 to stop step 628 wherein the auditing of test results ceases.

In step 608, the first test result entry/record on the list of test result entries/records retrieved in step 604 is loaded or retrieved from the data lake 615 test result entries/records 650 by the test auditor component. Operation proceeds from step 608 to step 610. In step 610, the reference call flow entry/record for the first test result entry/record is loaded or retrieved from the data lake 615 call flow entries/records 652 by the test auditor component. The reference call flow entry/record is the call flow entry/record from which the test case which corresponds to the first test result entry/record was generated. For example, if the first test result entry/record was generated from the test results of the first test case and the first test case was generated from or based on a first call flow entry/record, the first call flow entry/record is the reference call flow entry/record for the first test result entry/record. Operation proceeds from step 610 to step 612. In step 612, the test auditor component loads and/or retrieves the test run call flow entry/record for or corresponding to the first test result entry/record from the data lake 615 call flow entries/records 652. The test run call flow entry/record for or corresponding to the first test result entry/record is the call flow entry/record created and/or generated from the CDR and TRC for the test case call flow for the first test case to which the first test result entry/record corresponds. Operation proceeds from step 612 to step 614. In step 614, the test auditor component generates and/or creates an audit result entry/record 622 for the test result entry/record retrieved in step 608 which in this example is the first test result entry/record on the list of test result entries/results retrieved in step 604. The audit result entry/record 620 is generated based on the test result entry/record retrieved in step 608. Operation proceeds from step 614 to step 616. In step 616, the test auditor component performs a check of the test result entry/record information for the first test result and updates the audit result entry/record 622. Operation proceeds from step 616 to step 618. In step 618, the test auditor component performs a signaling feature check and updates the audit result 622 based on the results of the signaling feature check. Operation proceeds from step 618 to step 620. In step 620, the test auditor component performs a CDR content check and updates the audit result 622 based on the results of the CDR content check. Operation proceeds from step 620 to step 624. In step 624, the audit result 622 is saved and/or stored in the data lake 615 with the audit result entries/records 660. Operation proceeds from step 624 to step 606 via connection node D 626. In decision step 606, as previously described the test auditor makes a determination of whether or not there are test result entries/records from the list of test result entries/records retrieved in step 604 which need to be audited. When there are no additional test result entries/records which need to be audited operation proceeds from step 606 to step 628 wherein the auditing of test result entries/records stops or ceases. When there are additional test result entries/records which need to be audited, operation proceeds from step 606 to step 608 where the next test result entry/record on the list of test result entries/records retrieved in step 604 is retrieved for auditing and the method 600 continues as previously described.

In some embodiments, the method 600 returns to step 604 instead of stopping in step 628 when there are no additional test result entries/records which need to be audited on the list of test result entries/records retrieved in step 604. In such embodiments, anew set of filter criteria or parameters can be entered in step 604 and a new list of test result entries/records can be retrieved from the data lake 615 test result entries/records based on the new set of filter criteria or parameters and the method 600 then continues as previously described.

Figure 8:
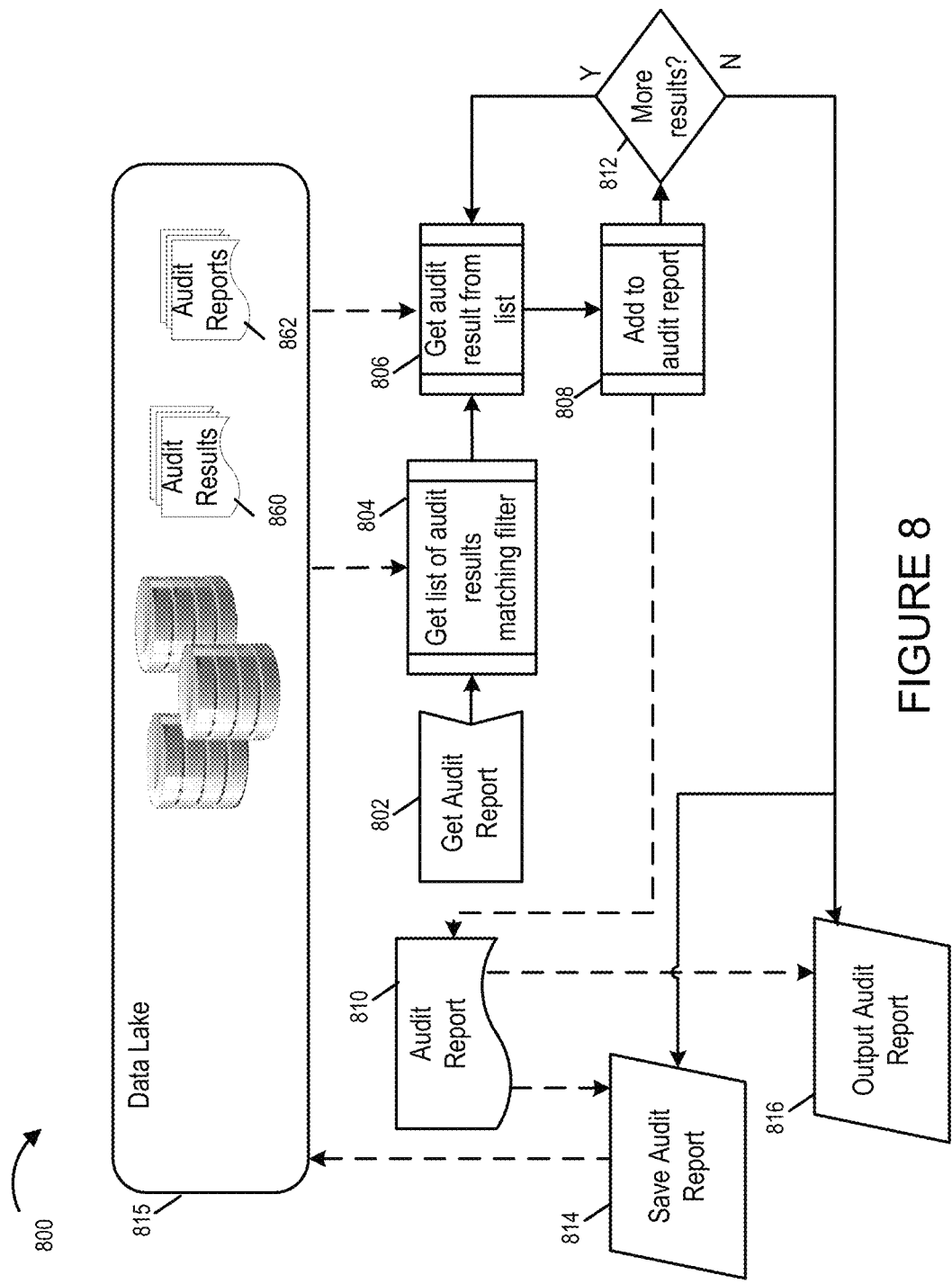
FIG. 8 illustrates an exemplary method for generating, saving, and outputting an audit report based on audit result entries/records in accordance with an embodiment of the present invention.

FIG. 8 illustrates an exemplary method 800 for generating, saving, and outputting an audit report based on audit result entries/records in accordance with an embodiment of the present invention. In some embodiments, the reports component 153 of feature Pod 150 of learning-based test system 114 of system 100 implements the steps of method 800. In some embodiments, the step of outputting the audit report is implemented by the GUI 151 component and/or the Dashboards component 152 of Feature Pod 150. In FIG. 8, the data lake 815 is a combined production data lake and lab data lake (e.g., combined production data lake 129 and lab data lake 139) or a lab data lake 139.

The method 800 commences in step 802. Operation proceeds from step 802 to step 804. In step 804, the reports component uses a filter to query the audit results entries/records 860 in the data lake 815 to identify a list of audit result entries/records from the data lake 815 which match the filter requirements and/or criteria. The audit result entries/records 860 may be, and in some embodiments are or include, the audit result entries/records 660 from FIG. 6 and/or the audit result entries/records 146 from FIG. 1. The list of audit result entries/records may be obtained by querying the data lake 815 for a list of audit result entries/records which match one or more criteria specified by the filter (e.g., criteria may be, and in some embodiments is, an audit result identifier or a non-empty set of audit result identifiers). In some embodiments, the filter is list of parameters including for example one or more of the following: call flow type, test execution start time, device-under-test name, feature test name or names. Once the list of audit entries/records matching the filter criteria are obtained from the data lake 815, operation proceeds from step 804 to 806.

In step 806, the first audit result entry/record on the list of audit result entries/records retrieved in step 804, is retrieved from the data lake 815 audit result entries/records 860 by the reports component. Operation proceeds from step 806 to step 808. In step 808, the reports component generates the audit report 810 and includes and/or adds the audit result entry/record retrieved in step 806 to the audit report 810. Operation proceeds from step 808 back to decision step 812. In decision step 812, the reports component determines whether or not there are additional audit results entries/records on the list of audit result entries/records generated in step 804 which have not been added to the audit report. When the determination is that yes there are additional audit result entries/records on the list of audit result entries/records generated in step 804 which have not been added to the list operation proceeds from step 812 to step 806 where the next audit result entry/record on the list of audit result entries/records is retrieved from the data lake 815 audit result entries/records 860. The method 800 then continues as previously described with operation proceeding from step 806 to step 808. When the determination is that there are not additional audit result entries/reports on the list of audit result entries/records generated in step 804 which have not been added to the audit report 810, operation proceeds from decision step 812 to steps 814 and 816. In step 814, the audit report 810 is saved and/or stored to the data lake 815 in the audit report records 862 by the reports component. In step 816, the audit report 810 is outputted for example by being displayed on a screen and/or printed on a printer. When the audit report is outputted by being displayed on a screen the GUI component of dashboards component may, and in some embodiments do, receive the audit report from reports component and output it onto the display (e.g., as a graphical report which may be, and in some embodiments is, in the form of a dashboard). The reports component in some embodiments outputs the report to a printer on which a hardcopy (e.g., paper copy of the audit report 810) is printed. In various embodiments, the format of the report may be inputted via the GUI component.

An example of a procedure for verifying or auditing the results of a test run with respect to the extracted feature set of a reference call flow and a test call flow will now be described in connection with the exemplary STOP CDR 2500 for a call which is shown in FIG. 25 and the trace record 2400 for that same call which is shown in FIG. 24. Some example call features that would be extracted for this reference call and included in the signature for the call flow would include:

FEATURE=LEG0_TRUNKGROUP
VALUE=CTS_TG_INTERNAL
FEATURE=LEG0_MESSAGES
VALUE={INVITE,100INVITE,183INVITE,180IN-
   VITE,200INVITE,ACK,BYE, 200BYE}
FEATURE=LEG0_MSG0_HEADERS
VALUE=[Via,From,To,Call-ID,CSeq,Contact,Max-For-
   wards,Subject,Content-Type,Content-Length]
FEATURE=LEG0_MSG0_SDP VALUE=[v,o,s,c,t,m,a]
FEATURE=LEG0_MSG0_SDP_CODEC
VALUE={PCMU/8000}

While there would be additional features for each message in the call leg, and again for each leg of the reference call for the sake of simplicity in explaining the process being implemented only a few features have been shown.

On the execution of a test case corresponding to the above reference call, the first message generated is the following:

INVITE sip:7325551212@0.10.10.16:5060 SIP/2.0
Via: SIP/2.0/UDP 10.52.155.12:7033;branch=z9hG4bK-xxx-1-0
From: sipp sip:9785551212@10.10.10.12: 7033; tag=1966xxxTag001
To: sut sip:7325551212@0.10.10.16:5060
Call-ID: 100x@10.10.10.12
Contact: sip:sipp@10.10.110.12: 7033
Max-Forwards: 70
CSeq: 1 INVITE
Subject: Performance Test
Content-Type: application/sdp
Content-Length: 135
v=0
o=*user1 5366676 2392687637 IN IP4 10.10.10.12*
s=-
t=0 0
c=IN IP4 10.10.10.12
m=audio 9899 RTP/AVP 0
a=rtpmap:0 PCMA/8000

Changed content from the first message of the first call leg of the reference call is shown in italics. Changed content in different ordering from the first message of the first call leg of the reference call is shown in underlining.

Suppose that the test run also has the order of 180INVITE and the 183INVITE messages reversed with respect to the order of the 180INVITE and 183INVITE messages in the trace record of the reference call.

The equivalent features from this test run would include:
FEATURE=LEG0_MESSAGES
VALUE={INVITE,100INVITE,180INVITE,183INVITE,200INVITE,ACK,BYE, 200BYE}
FEATURE=LEG0_MSG0_HEADERS
VALUE=[Via,From,To,Call-ID, Contact,Max-Forwards, CSeq,Subject,Content-Type,Content-Length]
FEATURE=LEG0_MSG0_SDP
VALUE=[v,o,s,t,c,m,a]
FEATURE=LEG0_MSG0_SDP_CODEC
VALUE={PCMA/8000}

With the changed content from the reference call flow features of the first call leg shown in italics. With the changed content in different ordering from the reference call flow being shown in underlining.

An exemplary process used by the Test Auditor component to determine whether the reference call flow and the test call flow were the same or equivalent based on the extracted features would include the following:

Changes in phone #s would be ignored because these values are not features.
Changes in IP addresses would be ignored because these values are not features.
Changes in SIP URL (such as contact address) would be ignored because these values are not features.
Changes in branch or tag values would be ignored because these parameter values are not features.
Reordered 183INVITE would be considered a mismatch because these messages are part of a sequence (indicated by { }). Contents of a sequence must be present and in the same order.
Change in ordering for the CSeq header would be ignored because this is part of a set (indicated by [ ]). A set allows the values in any order.
Change in ordering of the "t" SDP attribute would be ignored because this is part of a set, not a sequence.
Change in the codec to PCMA would be considered a mismatch because the codec values are a feature (sequence).

Figure 9:
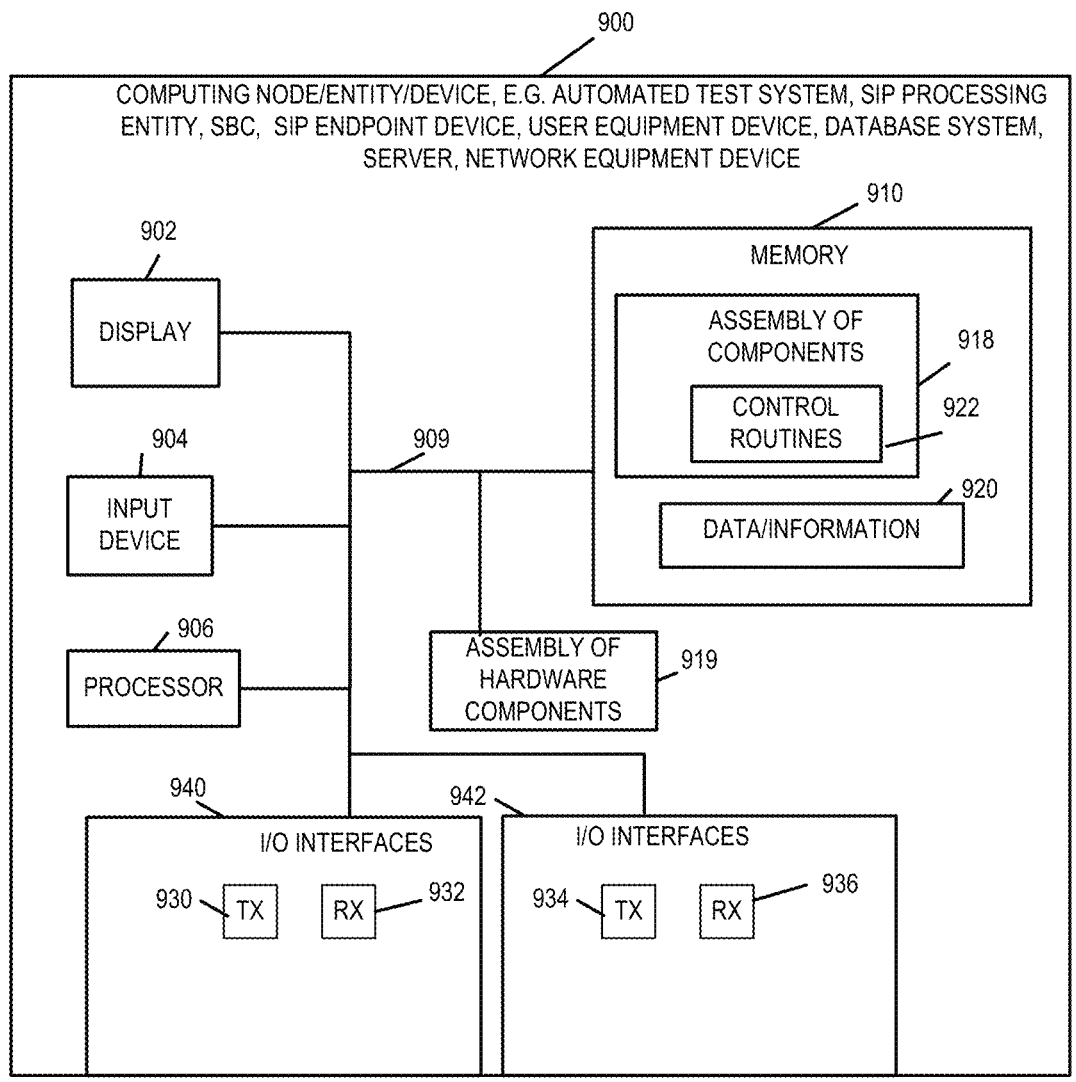
FIG. 9 illustrates an exemplary computing node/device/entity in accordance with an embodiment of the present invention.

FIG. 9 illustrates an exemplary embodiment of a computing node/device/entity that may be, and in some embodiments is, used to implement nodes/devices/entities/systems of various systems described in the Figures including nodes/devices/entities/systems in FIGS. 1-8, e.g., an automated test system or device, nodes of a Kubernetes system, SIP call processing entity, Session Border Controller, device-under-test, SIP endpoint device, SIP client device, SIP peer device, user equipment device, database system, server, e.g., PSX server, DNS server, ENUM server, Radius Server, Diameter server, security server, communications device or user equipment device in accordance with embodiments of the present invention. Exemplary computing node/device/entity 900 includes a display 902, an input device 904, a processor 906, e.g., a CPU, input/output (I/O) interfaces 940 and 942, which couple the computing device to a network, e.g., production network, lab network or various other networks or devices, and an assembly of components 919, e.g., circuits corresponding to different components, coupled together via a bus 909 over which the various elements may interchange data and information. Memory 910 includes an assembly of components 918, e.g., an assembly of software components, and data/information 920. The assembly of software components 918 includes a control routines component 922 which when processed and executed by the processor 906 controls the operation of the computing device 900 to perform various functions and/or one or more steps of the various method embodiments of the invention. The I/O interface 940 includes transmitters 930 and receivers 932. The I/O interface 942 includes transmitters 934 and receivers 936. The I/O Interfaces include hardware transmitters and receivers. The computing device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments the I/O interfaces include IP address/port pairs. The I/O Interfaces are hardware interfaces. The I/O interfaces in some embodiments are configured to communicate in accordance with the Internet Protocol, Transport Control Protocol (TCP), User Datagram Protocol (UDP), Session Initiation Protocol (SIP), Session Description Protocol (SDP), TLS protocol, H.323 protocol, Hypertext Transfer Protocol (HTTP), Hypertext Transfer Protocol Secure (HTTPS), REpresentational State Transfer (REST) protocol, and/or other communications protocols. In some embodiments, the computing device 900 includes a communication component configured to operate using SDN, IP, TCP, UDP, SDP, SIP, HTTP, HTTPS, REST and TLS protocol signaling methods. In some embodiments, the communication component is a hardware component, a software component or a component including hardware and software components. In some embodiments, the components, data lakes, SBC, device-under-test, servers, network equipment devices, SIP devices, SIP call processing devices, nodes on which Pods are located in FIGS. 1-8 or discussed in connection with FIGS. 1-8 are implemented in accordance with computing device 900 of FIG. 9.

An exemplary assembly of components 1010 for a computing node/entity/device, e.g., automated test system, SIP call processing entity, SBC, SIP endpoint device, user equipment device, database system, server, network equipment device in accordance with an embodiment of the present invention is illustrated in FIG. 10. In some embodiments, the assembly of components 1010 is for a computing node/device 900. One or more of the assembly of components 1010 may be implemented as hardware components in the assembly of hardware components 919 or as software components in the assembly of software components 918 stored in memory 910 of the exemplary computing device/node 400. The assembly of components 1010 will now be discussed in further detail below.

FIG. 10 as discussed above is a drawing illustrating an assembly of components 1010 which may be included in an exemplary computing node/entity/device 900 of FIG. 9 implemented in accordance with exemplary embodiment computing node/entity/device 900. Assembly of components 1010 may be, and in some embodiments is, used in computing node/entity/device 900. The components in the assembly of components 1010 can, and in some embodiments are, implemented fully in hardware within the processor 906, e.g., as individual circuits. The components in the assembly of components 1010 can, and in some embodiments are, implemented fully in hardware within the assembly of components 919, e.g., as individual circuits corresponding to the different components. In other embodiments some of the components are implemented, e.g., as circuits, within the processor 906 with other components being implemented, e.g., as circuits within assembly of components 919, external to and coupled to the processor 906. As should be appreciated, the level of integration of components on the processor and/or with some components being external to the processor may be one of design choice. Alternatively, rather than being implemented as circuits, all or some of the components may be implemented in software and stored in the memory 910 of the computing node/entity/device 900, with the components controlling operation of computing node/entity/device 900 to implement the functions corresponding to the components when the components are executed by a processor, e.g., processor 906. In some such embodiments, the assembly of components 1010 is included in the memory 910 as assembly of components 918. In still other embodiments, various components in assembly of components 1010 are implemented as a combination of hardware and software, e.g., with another circuit external to the processor providing input to the processor 906 which then under software control operates to perform a portion of a component's function. While shown in the FIG. 9 embodiment as a single processor, e.g., computer, it should be appreciated that the processor 906 may be implemented as one or more processors, e.g., computers.

When implemented in software the components include code which, when executed by the processor 906, configure the processor 906 to implement the function corresponding to the component. In embodiments where the assembly of components 1010 is stored in the memory 910, the memory 910 is a computer program product comprising a computer readable medium comprising code, e.g., individual code for each component, for causing at least one computer, e.g., processor 906, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the computing node/entity/device 900 or elements therein, such as the processor 906, to perform the functions of corresponding steps illustrated and/or described in the methods shown in diagrams of FIGS. 1, 2, 3, 4, 5, 6, 7, 8, and/or 22 described with respect to any of the Figures. Thus the assembly of components 1010 includes various components that perform functions of corresponding steps of FIGS. 1, 2, 3, 4, 5, 6, 7, 8, and 22.

Assembly of components 1010 includes control routines component 1012, communications component 1014, comparator component 1016, determinator component 1018, Trace record/Call Detail Record (TRC/CDR) ingestion component 1020, traffic learning component 1022, backup assistant component 1024, production twinning component 1026, test generator component 1028, test runner component 1030, device health check component 1032, test auditor component 1034, anonymizer component 1036, Graphic User Interface (GUI) component 1038, dashboards component 1040, reports component 1042, audit report generator component 1044, call processing component 1046, call detail report generator component 1048, trace record generator component 1050, sampling component 1052, and configuration backup component 1054.

The control routines component 1012 controls the operation of the node/entity/device. The communications component 1014 provides communications functionality including communications signaling and support for various communications protocols and interfaces including the generation, modification, updating, transmission, and reception of signaling and messages, e.g., SIP messages, etc. The comparator component 1016 compares items and values, e.g., call flow features, CDR field contents, call flow signatures, filter inputs, inputted criteria to determine if the items/values/criteria match and/or are equivalent.

The determinator component 1018 makes determinations for the computing node/device/entity such as for example determining whether or not a SIP call processing entity (e.g., lab SBC) passed or failed a test case based on a comparison of a test case call flow features contained in test case call flow record and the features of a reference call flow contained in a reference call flow record, determining a call flow signature for a call flow based on the features of the call, determining whether two call flow signatures are the same or equivalent, determining whether a feature of a call flow is deterministic based on or with respect to a SIP call processing entity's configuration and input messages received the SIP call processing entity, determining whether a feature of a call flow is non-deterministic with respect to a SIP call processing entity's configuration and input messages received by the SIP call processing entity, determining whether records and/or entries of records match an inputted filter criteria, determining features of a call flow; determining the ordering or sequence of received SIP messages, determining transforms for production configured SIP call processing entity (e.g., production SBC) external devices (e.g., PSX server, ENUM server, etc.), IP interfaces, and SIP signaling ports to transform configured addressing information (e.g., IP addresses) from a production environment address to a lab or test environment address.

The TRC/CDR ingestion component 1020 ingests trace records and call detail records for a call into a data lake or database. In various embodiments, the TRC/CDR ingestion component performs the operations described in connection with the TRC/CDR ingestion components 116 and 161 of system 1000, 1300 and 1400 and TRC/CDR scanner 1412 of system 1400.

The traffic learning component 1022 generates call flow records for calls based on trace records and/or call detail records. The traffic learning component 1022 sometimes includes a sampling sub-component (e.g., sampling component 1052). In some embodiments, the traffic learning component 1022 determines a stochastic model of the SIP call traffic processed by a SIP call processing device (e.g., SBC) operated in a production network. In various embodiments, the traffic learning component 1022 performs the operations described in connection with the traffic learning component 118, 163 of system 1000 and traffic learning component 1415 of system 1400. In some embodiments, the traffic learning component includes a test generator sub-component (e.g., test generator component 1028). In various embodiments, the traffic learning component 1022 performs one or more of the steps of the method 300.

The backup assistant component 1024 downloads configuration information from a SIP call processing device (e.g., production SBC 102 configuration information) and stores it (e.g., in a PC memory, a database or a data lake), the configuration information in most embodiments being sufficient to restore the SIP call processing device or another SIP call processing device to the downloaded configuration (e.g., the production operating configuration). In some embodiments, the backup assistant component 1024 performs the operations described in connection with the backup assistant component 120 of system 100, or the SBC configuration downloading by PC 1302 of system 1300.

The production twinning component 1026 generates configuration information for a SIP call processing entity (e.g., a SBC) by transforming or modifying production SIP call processing entity configuration information into a lab SIP call processing entity configuration for use in a lab environment (e.g., by generating and applying transform to a production's SBC configuration information to modify addressing information (e.g., IP addresses) to match a lab's addressing information (e.g., lab environment IP addresses)). In some embodiments, the production twinning component 1026 performs the operations described in connection with production twinning component 124 of system 100 and system 1400. In various embodiments, production twinning component 1026 performs one or more of the steps of method 200.

The test generator component 1028 generates tests and stores them in test case records. The tests include one or more test scripts for simulating, emulating and/or controlling devices (e.g., SIP endpoint devices and/or network equipment) for exchanging messages (e.g., SIP messages) and information with a SIP call processing entity such as for example a SBC (e.g., lab SBC 166) in connection with a call. The test generator component 1028 in some embodiments generates a test based on information from one or more of the following: reference call flow record, trace record and call detail record. In some embodiments, the test generator component 1028 performs the operations discussed in connection with the test generator component 156 of system 100 and 1416 of system 1400. In some embodiments, the test generator component 1028 performs one or more steps of method 400. In some embodiments, the test generator component 1028 is a sub-component of the traffic learning component 1022.

The test runner component 1030 executes SIP call tests (e.g., by executing test scripts) which simulate, emulate and/or control devices for exchanging messages (e.g., SIP messages) and information with a SIP call processing entity such as for example a SBC (e.g., lab SBC 166). In some embodiments, the test runner component 1030 includes a device health check component (e.g., device health check component 1032) which checks on the health of a device during and after the completion of a test case. The test runner component 1030 also generates a test result report record which includes information on whether or not the executed test passed or failed as determined by conditions defined in the test script and result of health checks on the device-under-test. In some embodiments, the test runner component 1030 also receives transform information (e.g., addressing information for the lab environment in which the test will executed) and replaces production addresses (e.g., IP addresses) for equipment, IP interfaces, and/or SIP signaling ports in the test scripts with the lab addresses (e.g., lab IP addresses). In some embodiments, the test runner component 1030 performs the operations discussed in connection with the test runner component 158 of system 100 and system 1400. In some embodiments, the test runner component 1030 performs one or more steps of the method 500.

The device health check component 1032 checks the health of the device under test, e.g., lab SBC 166, during and after a test is executed for issues and/or problems such as a coredump. In some embodiments, the device health check component 1032 is a sub-component of the test runner component 1030. In some embodiments, the health check component 1032 performs the operations discussed in connection with the health check component 159 of system 100 and system 1400.

The test auditor component 1034 audits the test results of executed tests included in test reports and generates test result audit records, test result reports and/or summary test result audit reports. The test auditor component 1034 performs audits of test results by comparing features included in test case call flow records to reference call flow records and determining from the comparison whether the device under test passed or failed the test corresponding to the test case call flow. In some embodiments, the test auditor component 1034 generates scores for the test based on which features did not match in comparison of the test case call flow to the reference call flow. The scores reflect the severity of the issues/discrepancies identified by the audit. In some embodiments, the test auditor component 1034 performs the operations discussed in connection with the test auditor component 165 of system 100 and system 1400. In some embodiments, the test auditor component 1034 performs one or more steps of the method 600 and/or method 800.

The anonymizer component 1036 changes information which can be used to identify an individual or company in a call detail records and trace records such as for example calling party ID, calling party name, called party name, called party ID, calling telephone number, and called telephone number so the information can no longer be used to identify the individual or company. The anonymizer component 1036 makes the information associated with a call anonymous. In some embodiments, the anonymizer component 1036 performs the operations of the anonymizer component 122 in system 100.

The Graphic User Interface (GUI) component 1038 generates graphics (e.g., menus, icon, etc.) on a display for interfacing with users. In some embodiments, the GUI component 1038 performs the operations discussed in connection with GUI component 126 of system 100 and GUI component 151 of system 100 and system 1400.

The dashboards component 1040 generates dashboards on displays. In some embodiments, the dashboards component 1040 performs the operations discussed in connection with dashboards component 127 of system 100 and dashboards component 152 of system 100 and system 1400.

The reports component 1042 generates reports such as test result reports, audit test result reports, and summary audit test result reports. In some embodiments, the reports component 1042 performs the operations discussed in connection with reports component 128 of system 100 and reports component 152 of system 100 and system 1400. In some embodiments, the reports component 1042 performs one or more steps of method 800.

The audit report generator component 1044 generates audit reports of test results and summary test result audit reports. In some embodiments, the audit report generator component 1044 is a sub-component of the test auditor component 1034. In some embodiments, the audit report generator component 1044 is a subcomponent of the reports component 1042. In some embodiments, the audit report generator component 1044 performs one or more steps of the method 800.

The call processing component 1046 processes calls (e.g., SIP calls). In some embodiments, the call processing component 1046 performs operations discussed in connection with call processing component 104 and 168 of system 100, 1300 and 1400.

The call detail record generator component 1048 generates call detail records. In some embodiments, the call detail record generator is a sub-component of the call processing component 1046.

The trace record generator component 1050 generates trace records. In some embodiments, the trace record generator is a sub-component of the call processing component 1046.

The sampling component 1052 samples calls and/or CDR/TRC records for use in traffic learning. In some embodiments, the sampling component 1052 performs one or more steps of method 700. In some embodiments, the sampling component 1052 performs operations discussed in connection with sampling component 103 of production SBC 171 of system 100 and 1300. In some embodiments, the sampling component 1052 performs the operations discussed in connection with the TRC/CDR sampler component 1310 of system 1300.

The configuration backup component 1054 generates a backup of configuration of a production device such as a production SBC, PSX server, ENUM server, routing engine, etc. The backup is typically saved as a configuration file or record. The configuration backup component 1054 is typically a component of the device for which the configuration is to be saved.

Figure 13:
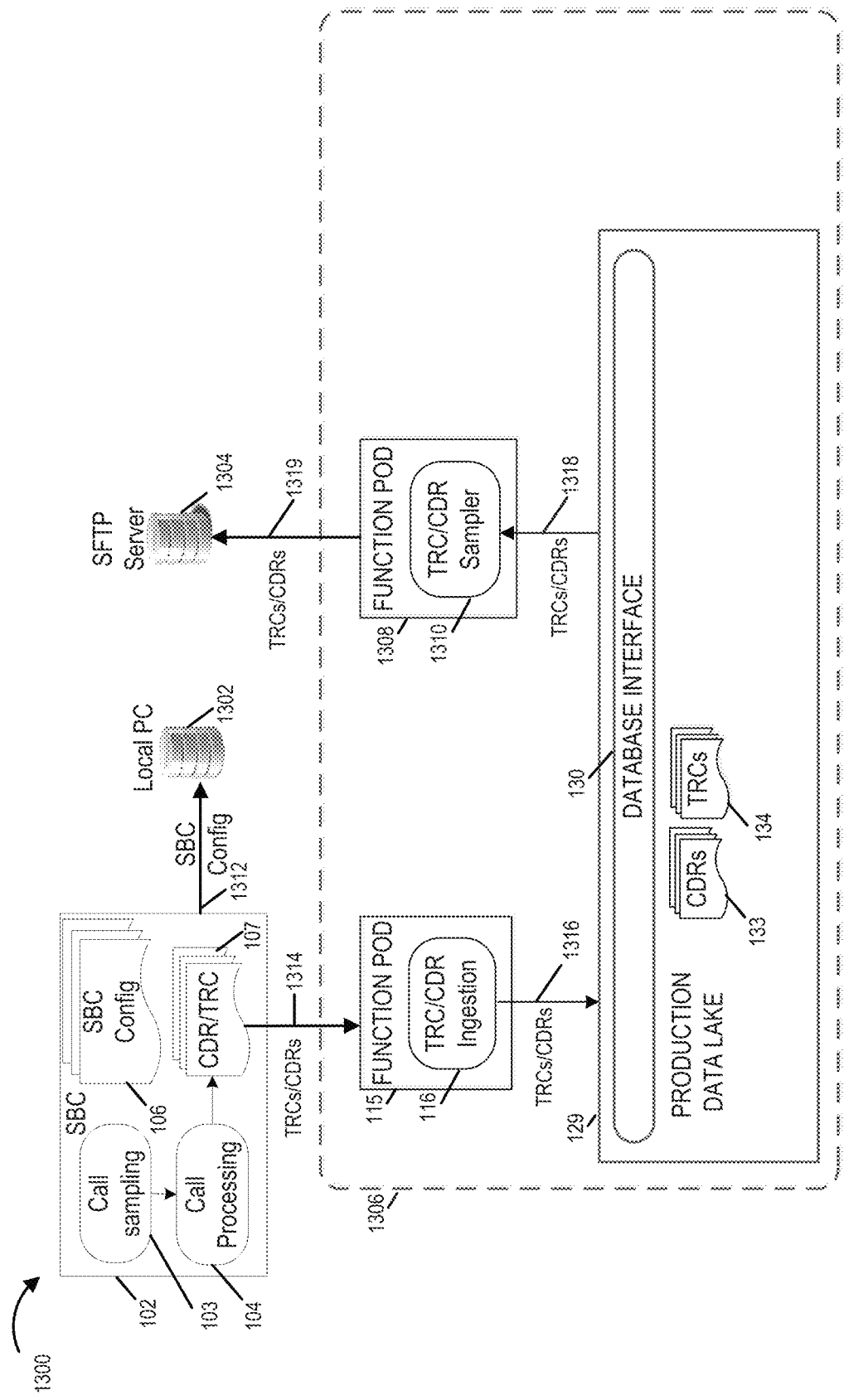
FIG. 13 illustrates another exemplary system and pipeline in accordance with an embodiment of the present invention.

FIG. 13 illustrates another exemplary system and pipeline 1300 in accordance with an embodiment of the present invention. Exemplary system and pipeline 1300 includes a production SBC 102, a local personal computer 1302, an SFTP server 1304 and an exemplary automated call information storage and sampling system 1306. The SBC 102 includes a sampling component 103, a call processing component 104, SBC Configuration information 106 and call detail records and trace records 107. The exemplary automated call information storage and sampling system 1306 is a Kubernetes system including Kubernetes nodes and storage. The Kubernetes system is implemented in a cloud. The automated call information sampling system 1306 includes:

a trace record and call detail record (TRC/CDR) ingestion component 116 implemented on a function pod 115, a trace record and call detail record sampler component 1310 implemented on function Pod 1308 and production data lake 129. In some embodiments, the TRC/CDR Ingestion component 116 and trace record and call detail record sampler component 1310 are implemented as containers. Elements or steps with the same reference numbers used in different figures are the same or similar and those elements or steps will not be described in detail again.

The production SBC 102 of system 1300 is part of a production network in which actual SIP calls are received and processed by the production SBC 102. SBC Configuration information 106 typically in the form of a file or record is communicated via communications path 1312 to the local PC 1302 where it is stored. The local PC 1302 may, and in some embodiments does, include a software application for interfacing with and backing up or extracting the SBC configuration information from the production SBC 102. In some embodiments, the local PC 1302 is an administrative PC computer that is used to configure the production SBC 102 and as part of the configuration can set up backup to the local PC 1302 after the completion of modifications to the production SBC's configuration. As SIP calls are processed by the call processing component 104, trace records (TRCs) and call detail records (CDRs) 107 are generated. The TRC records are generated by the production SBC either due to a customer enabling trace record generation (e.g., for all calls) or by sampling effected through the call sampling component 103 functionality within the production SBC 102. The generated trace records and call detail records 107 are continuously communicated from the production SBC 104 via communications path 1314 to the automated call information storage and sampling system 1306 where trace and call detail records are continuously ingested into the production data lake 129 by the TRC/CDR ingestion component 116 of function Pod 115 and stored via communication path 1316 in the production data lake 129 as call detail records 133 and trace records 134. This data collection and TRC/CDR ingestion occurs in the production network and continuously operates.

The TRC/CDR sampler 1310 periodically samples all or a sample of TRC records and matching CDR records from the production data lake 129 via communications path 1318 and communicates them to SFTP Server 1304 via communications path 1319. In some embodiments a very small portion (e.g., X % of total calls being processed and/or of the TRCs/CDRs being ingested in the production data lake 129 are sampled, wherein X for example is less than 0.5% of the calls). In some embodiments, the TRC/CDR sampler only initiates sampling of the TRC/CDR records in response to an instruction initiating a testing cycle received for example from the automated testing system 1406. In some embodiments, the automated call information sampling system 1306 is part of the automated test system 1406 but is located in the production network while the remainder of the automated test system 1406 is located in the lab environment system. In some embodiments, the local PC 1302 and/or the SFTP Server 1304 are part of the automated test system 1406 but are located in the production network.

Figure 14:
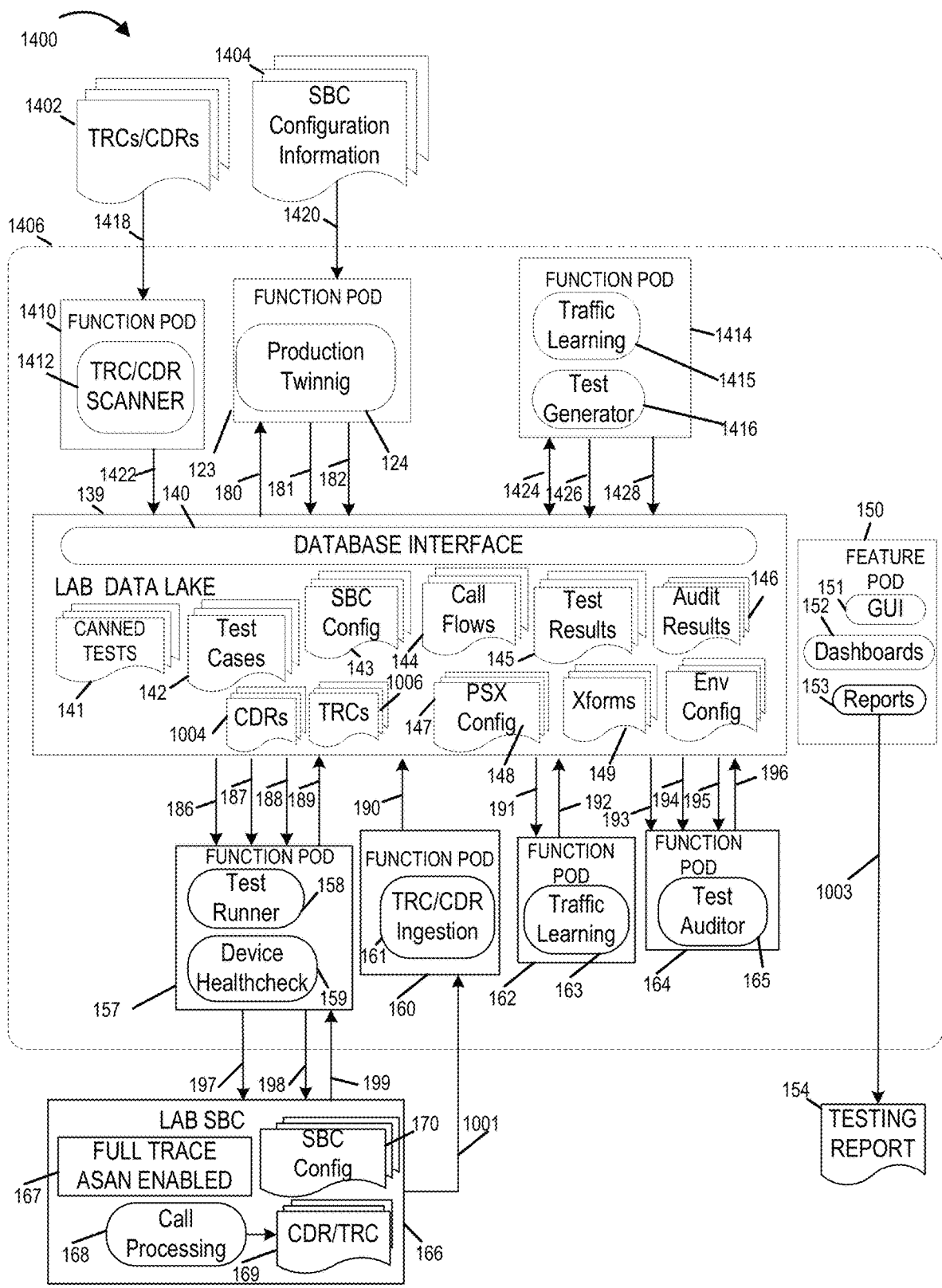
FIG. 14 illustrates another exemplary system and pipeline in accordance with an embodiment of the present invention.

FIG. 14 illustrates another exemplary system and pipeline 1400 in accordance with an embodiment of the present invention. The system and pipeline 1400 is a lab environment system for testing lab (i.e., non-production) entities/devices in a manner that simulates an actual production network. The system and pipeline 1400 include an automated test system 1406 and a lab SBC 166. The lab SBC 166 includes a full trace and ASAN enabled component 167, a call processing component 168, SBC Configuration information 170, and CDR/TRC records 169. The automated test system 1406 includes a TRC/CDR scanner component 1412 included in a function Pod 1410, a production twinning component 124 included in a function Pod 123, a traffic learning component 1415 included in a function Pod 1414, a test generator component 1416 included in function Pod 1414, a GUI component 151 included in a feature Pod 150, a dashboards component 152 included in the feature Pod 150, and a reports component 153 included in feature Pod 150, a test runner component 158 included in function Pod 157, a device healthcheck component 159 included in the function component 157, a TRC/CDR ingestion component 161 included in function Pod 160, a traffic learning component 163 included in function Pod 162, a test auditor component 165 included in a function Pod 164, and a lab data lake 139 including a database interface 140. In some embodiments, the traffic learning component includes the test generator component 1416 as a sub-component of the traffic learning component. In some embodiments, the traffic learning component includes the functionality of traffic learning as well as test generation. In some such embodiments, the component is sometimes referred to as a traffic learning with test generation component. Elements or steps with the same reference numbers used in different figures are the same or similar and those elements or steps will not be described in detail again.

The TRC/CDR Scanner component 1412 ingests the TRC and CDR records 1402 it receives via communication path 1418 into the lab data lake 139. The TRC/CDR records 1402 may be, and in some embodiments are, extracted from a production data lake or database or received from a production SBC. In some embodiments, the TRC/CDR records are obtained from the SFTP server 1304 of system 1300. When the TRC/CDR records are extracted from a production data lake or database where they have already been ingested as opposed to directly from the production SBC, the records will be in a different format. Such records will be exported from the production data lake or database in a different schema requiring a different ingestion process than is used when the records are received directly from a SBC. The TRC/CDR scanner component 1412 performs the ingestion of the TRC/CDR records 1402 and converts formats and/or schema as required for the ingestion of the TRC/CDR records into the lab data lake 139 as CDRs 1004 and TRCs 1006 via communications path 1442.

The production twinning component 124 receives SBC configuration information 1404 from a production SBC via communication path 1420 and processes the production SBC configuration information to generate a lab SBC configuration and transforms which are stored in the lab data lake as SBC Configuration Information records 143 and transforms 148. The received SBC Configuration Information is also typically stored in the lab data lake 139 with the SBC Configuration records 143. In some embodiments, the SBC configuration information 1404 is received directly from a production SBC (e.g., production SBC 102 of system 1300). In some other embodiments, the production SBC configuration information 1404 is received from the computer 1302 of system 1300. The production twinning component 124 performs the operations and functions described in connection function component 124 of system 1000 and/or the method 2000 of FIG. 2.

In some embodiments, the traffic learning component 1415 is the same as or similar to the traffic learning component 118 of system 100. In some embodiments, the traffic learning component 1415 implements the method 300. In some embodiments, the test generator component 1416 is the same as or similar to the test generator component 156 of system 100. In some embodiments, the test generator component 1416 implements the method 400. The traffic learning component 1415 receives CDR records 1004 and TRC records 1006 from the lab data lake 139 via communication path 1426 and generates call flow records which are stored via communications path 1426 into the data lake 139 as call flow records 144. The test generator component 1416 utilizes the generated calls generated by the traffic learning component 1415 to generate the test cases 142 which are stored in the lab data lake 139 via communications path 1428. The test cases 142 are the same as described in connection with system 100 and the method 400. The description of the following components of system 1400: test runner component 158, device healthcheck component 159, TRC/CDR Ingestion component 161, traffic learning component 163, test auditor component 165, GUI component 151, dashboards component 152, and the reports component 153 of the automated test system 1406 is the same as previously described in connection with the same components in system 100. Generally speaking, these components collectively are responsible for loading the lab SBC 166 with the proper lab SBC configuration to simulate a production environment, executing tests on the lab SBC 166, and generating and outputting audited test results and reports such as test report 154.

In some embodiments, the test generator component 1416 generates one or more test scripts based on the contents of a trace record or a call flow record. For example, the test generator component 1416 will parse the trace record to: (i) determine devices which are sending SIP messages to the SBC in connection with the call to which the trace record corresponds (e.g., user agent client (UAC) devices which send request(s) to the SBC and user agent server (UAS) devices which send response(s) to the SBC), (ii) generate a SIP test script for each determined UAC device, and (iii) generate a SIP test script for each determined UAS device. The SIP test script for a UAC will include action commands to send one or more SIP messages to the lab SBC. The one or more SIP messages being generated based on the SIP messages (e.g., PDU information) included in the trace record. The SIP test script for the UAC will also include information on the SIP response messages received by the UAC as determined by the test generator which will be used for comparison purposes on determining if the call correctly completed. The SIP test script for a UAS will include action commands to respond to one or more SIP messages received from the SBC. The one or more SIP messages received will be based on the SIP messages sent by the SBC to a UAS in the trace record and the SIP response messages being generated based on SIP response messages included in the trace record which are received from the UAS. A comparison of the contents of the SIP messages received by the UAS will be used in determining if the test script completed. When the test generator component 1416 utilizes a call flow record to generate the test scripts, it utilizes the signaling of every PDU on every leg of the call as well as the transport information for each leg (UDP, TCP, TLS) to determine the UAC and UAS devices for each leg of the call and the SIP messages that will need to be generated to simulate the UAC and UAS devices communicating with the lab SBC. Separate test scripts are generated for each UAC and UAS device. In some embodiments, the test generator component as part of generating a test script modifies IP addresses in the original received SIP messages and replaces them with IP addresses corresponding to the lab environment.

Figure 15:
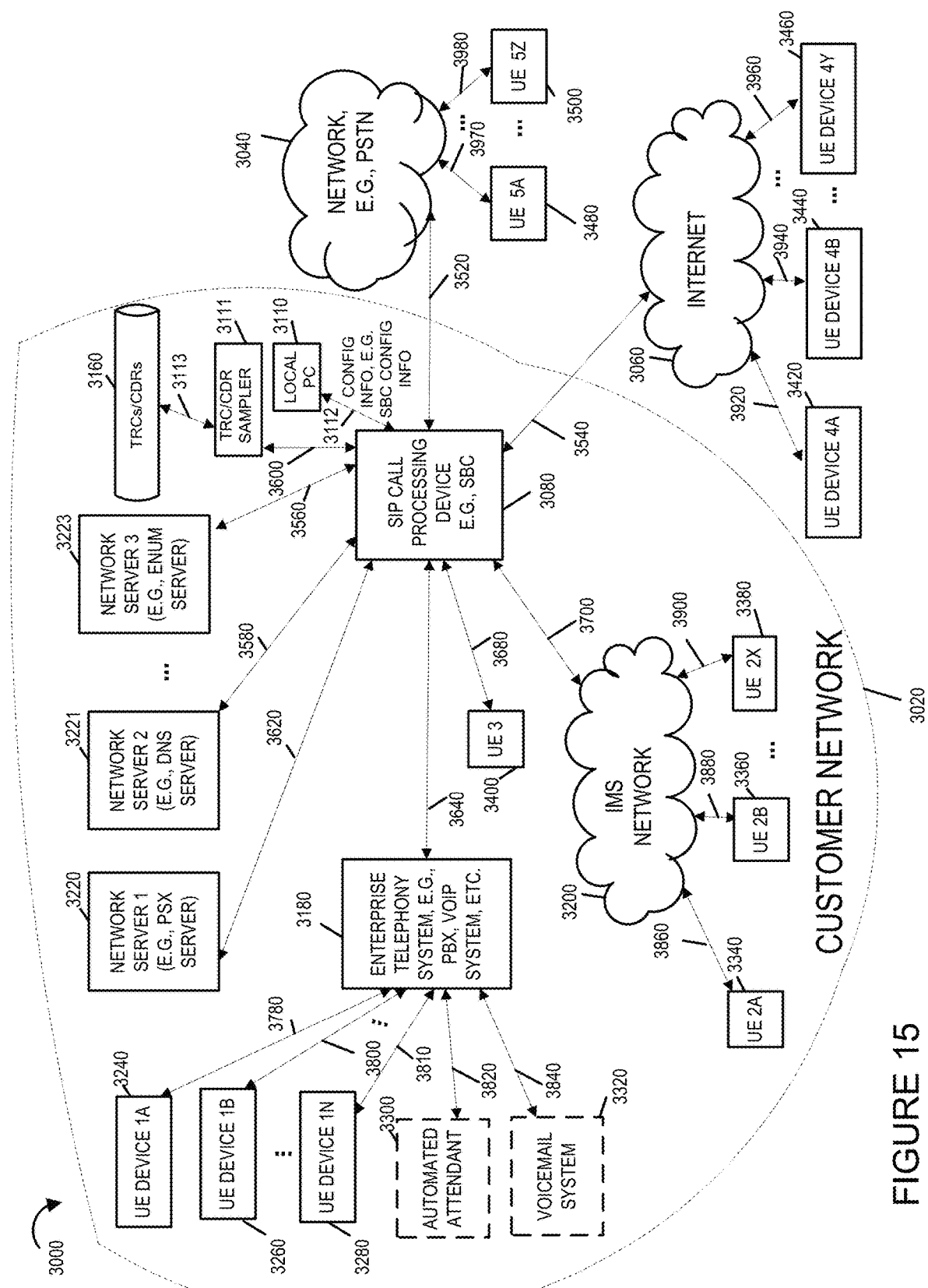
FIG. 15 illustrates an exemplary production network in accordance with an embodiment of the present invention.

System 3000 of FIG. 15 illustrates an exemplary production network system in accordance with an embodiment of the present invention. The production network includes commercially available equipment and handles real network call traffic as opposed to simulated or test traffic. The system 3000 includes a customer network 3020, an external network 3040, e.g., Public Switched Telephone Network (PSTN) 3040, and an external Internet Protocol network, e.g., the Internet, 3060. In the exemplary embodiment, the customer network 3020 is a private network owned for example by a customer such as business and the communications equipment is located on the customer's premises. The Internet 3060 has coupled to it a plurality of communications devices UE device 4A 3420, UE device 4B 3440, . . . , UE device 4Y 3460 where Y is a positive integer number. The communications devices UE device 4A 342, UE device 4B 344, . . . , UE device 4Y are coupled to the Internet 3060 via communications links 3920, 3940, . . . , 3960 respectively. Exemplary types of communications devices include phones, computers, mobile phones, internet phones, Voice Over Internet (VOIP) phones, IP phones, SIP based communications devices, laptops, tablets, and smartphones. These devices may, and in some embodiments do, communicate with the SIP call processing device 3080, utilizing the SIP protocol (e.g., via applications installed on the devices or via intermediate application servers on the Internet which receive communications from the devices and convert the communications to SIP protocol messages).

The network 3040, e.g., PSTN, is a telephony network including communications devices UE 5A 3480, . . . , UE 5Z 3500, where Z is a positive integer number. The communications devices UE 5A 3480, . . . , UE 5Z 3980 are coupled to the network 3040 via communications links 3970, . . . , 3980 respectively.

Exemplary customer network 3020 may be, and in some embodiments is, an Enterprise network. In some embodiments, the customer network 3020 is a carrier network such as AT&T or Verizon which itself provides services to customers. Customer network 3020 includes a Session Initiation Protocol call processing device 3080, e.g., a Session Border Controller, a local computer (e.g., personal computer) 3110, a database system 3160 (e.g., a production data lake) used to store trace records and call detail records, enterprise telephony system 3180, e.g., PBX, VOIP system, etc., an IMS network 3200, an optional automated attendant device 3330, an optional voicemail system 3320, a plurality of communications devices and communications links which couple the devices, systems and networks included in the enterprise together. For the sake of simplicity, the SIP call processing device 3080 in the exemplary system 3000 is explained using an exemplary embodiment where the SIP call processing device 3080 is a Session Border Controller (SBC). However, it should be understood that the invention is not limited to the SIP call processing device 3080 being an SBC. For example, the SIP call processing device 3080 can be, and in some embodiments is, one of the following: an application server, call routing engine or other border controller device or entity which is an intermediary entity which receives and processes SIP signals for establishing call sessions (e.g., media sessions, audio sessions, video sessions) between two endpoint devices or entities. Communications devices UE device 1A 3240, UE device 1B 3260, . . . , UE device 1N 3280, where N is a positive integer number are coupled to the enterprise telephony system 3180 via communications links 3780, 3800, . . . , 3810 respectively. The optional automated attendant device 3300 is coupled to enterprise telephony system 3180 via communications link 3820. In some embodiments, automated attendant features are included in the enterprise telephony system. In some embodiments, the automated attendant system is coupled to the Session Border Controller 3080 instead of or in addition to the enterprise telephony system 3180. The voicemail system 3320 is coupled to enterprise telephony system 3180 via communications link 3840. In some embodiments, the voicemail system features are incorporated into the enterprise telephony system. In some embodiments, the voicemail system 3320 is coupled to the SBC 3080 instead of or in addition to the enterprise telephony system 3180. The SBC 3080 is also coupled and/or connected to a plurality of network equipment devices (network server 1 3220 (e.g., a PSX server), network server 2 3221 (e.g., a DNS server), network server 3 3222 (e.g., ENUM server)) via communications links 3620, 3580, 3560 respectively. While the network equipment devices 3220, 3221, . . . , 3222 are illustrated as being within the customer network 3020, in some embodiments one or more of these network equipment devices are located outside of the customer network 3020 in one of the other networks to which the customer network 3020 is attached for example network 3040 or 3060. Exemplary network equipment devices 3220, 3221, . . . , 3222 include, for example, PSX servers, DNS servers, ENUM servers, security servers, DirectMedia NATs, syslogRemoteHosts, Diameter Rx servers, application servers, Radius Servers, SIP registrar server, etc. The SBC 3080 is configured to communicate with the plurality of network equipment devices 3220, 3221, . . . , 3222 for example via path names, IP interfaces, and/or signaling interfaces (e.g., SIP signaling interfaces).

The enterprise telephony system 3180 is coupled to the SBC 3080 via communications link 3640, communications device UE 3 3400 is coupled to the SBC 3080 via communications link 3680.

Communications devices UE 2A 3340, UE2B 3360, . . . , UE 2X 3380 are coupled to IP Multimedia Subsystem (IMS) network 3200 via communications links 3860, 3880, . . . , 3900 respectively.

SBC 3080 is coupled to external network 3040, Internet 3060, IMS network 3200, UE 3 3400, enterprise telephony system 3180 via communications links 3520, 3540, 3700, 3680, 3640 respectively.

Exemplary types of communications devices include phones, computers, mobile phones, internet phones, Voice Over Internet (VOIP) phones, IP phones, SIP based communications devices, laptops, tablets, smartphones. It is to be understood that different types of communications devices are coupled to the different networks depending on the interfaces included in the communications devices, the type of protocols supported and the type of network to which the communications device is coupled.

While in the exemplary embodiment, the SBC 3080 is located on the customer premise and is part of the customer network, the SBC 3080 may be, and in some embodiments is, located outside of the customer premise and part of one of the external networks. Whether the SBC 3080 is located on the customer premise as part of the customer network 3020 or located externally to the customer premise and is part of an external network, the SIP processing device 3080 (e.g., SBC 3080) is an network edge device that provides ingress and egress call establishment and call termination services for the customer network 3020. Incoming calls are established via the SBC 3080 with incoming calls or at least the signaling related to their establishment and termination passing through the SBC 3080. The SBC 3080 is sometimes implemented in accordance with computing entity 900 illustrated in FIG. 9. In some such embodiments, the hardware and/or software assembly of in the computing entity 900 include components from the exemplary of components 1010 including for example control routines component 1012, communications component 1014, comparator component 1016, determinator component 1018, call processing component 1046, Call Detail Record (CDR) generator component 1048, trace (TRC) record generator component 1050, sampling component 1052, and configuration backup component 1054. In some embodiments, the SBC 3080 includes a policy and routing server that communicates policies and routing decisions to other devices in the customer network such as for example the enterprise telephony system and network devices responsible for routing calls in the IMS network 3200.

The customer network 3020 also includes a local computer, e.g., a personal computer 3110 coupled and/or connected to the SBC 3080 via communications link 3112. The computer 3110 receives a backup of the SBC 3080 system configuration from the SBC 3080 (e.g., prior to the SBC 3080 beginning processing SIP calls and each time the system configuration is modified). The system configuration information includes product identification information as well as hardware and/or software versions being executed by the SBC 3080 and a timestamp. The system configuration includes configuration information for how the SBC 3080 is configured to operate in the customer network including for example configuration information for each of the IP interfaces, SIP signaling interfaces, trunk group interfaces, configuration information for communicating with network equipment devices (e.g., network equipment devices 3220, 3221, . . . , 3222, configuration information for communicating with Signaling System No. 7 switches in the network 3040, etc.

In some embodiments, the computer 3110 is also coupled and/or connected to one or more of the network equipment devices 3220, 3221, . . . , 3222 and downloads the configuration information from one or more of these devices. For example, if one of these devices is a PSX server from which the SBC 3080 requests routing information for calls, the computer 3110 downloads the configuration information, policy and routing information so that information can be transformed for the lab environment and installed in a lab network equipment device implemented as a PSX server in the lab environment in which tests are to be performed. The transformation includes re-mapping of interface information (IP addressing) for communicating with the lab device under test (e.g., lab SBC).

The customer network 3020 also includes Trace Record (TRC) and Call Detail Record Sampler 3111 which receives TRC/CDR records from the SBC 3080 which generates them for SIP calls and transfers them to the TRC/CDR sampler 3111 which samples a percentage of the received records and transfers or ingests them and stores them in database 3160. The TRCs and CDRs which are sampled are sampled such that the trace record information and call detail record information are sampled together. The TRC/CDR sampler 3110 is coupled/connected to the SBC 3080 via communications link 3112. The TRC/CDR sampler 3111 is coupled/connected to the database system 3160 via communications link 3113. In some embodiments, the SBC 3080 may be configured to output TRC and CDR records for all calls during a time period or for all calls of a typical type. In some other embodiments, the SBC 3080 is configured to output to the TRC/CDR sampler 3111 only a very small percentage of the calls processed by the SBC 3080 such as in the example of method 700. In some such embodiments, the TRC/CDR sampler 3111 may interface with the SBC 3080 to configure the SBC 3080 for the percentage of TRC/CDRs to output. When the SBC outputs TRCs/CDRs for every call or a large number of calls, the TRC/CDR sampler 3111 samples a very small percentage of the TRC/CDRs (e.g., 0.5 percent of the TRC/CDR records received from the SBC 3080. The local computer 3110, the TRC/CDR sampler 3111 and the database 3160 may be, and sometimes are, part of an automated test system with the sampled TRC and CDR records along with the SBC 3080 configuration information being used to develop call flows and test cases as previously described in connection with system 100 and systems 1300 and 1400. The sampling of only a very small percentage of calls over a long period of time allows for the creation of statistical modeling of call flows representative of the call flows being processed by the SBC 3080 while also making the size of the data captured (TRC, CDR and configuration information) manageable. The timestamp in the system configuration data and the TRC and CDR records are used by an automated test system (e.g., automated test system 114 of system 100, automated test system 1406 of FIG. 14, or automated test system 5000 of system 1600) to generate tests based on the TRC and CDR records and execute the tests on a lab SBC configured based on the SBC configuration information which was in use when the TRC and CDR records were captured by the SBC 3080.

In some embodiments, the SIP Processing device 3080 of system 3000 is the SBC 102 of system 1000 or 3000. In some embodiments, the local computer 3110 is the local PC 1302 of system 1300. In some embodiments, the database 3160 is implemented as the production data lake 1306. In some embodiments, the TRC/CDR sampler 3111 includes a sampler application such as for example LEAP sampler application 1310 from the system 1300. In some embodiments, the TRC/CDR sampler 3111 is implemented as an application executing on a node (e.g., Kubernetes node) in a cloud system (e.g., Kubernetes system implemented in the cloud). In some embodiments, the SBC 3080 is a hardware device. In some embodiments, the SBC 3080 is an entity implemented as an application on a node in a cloud system.

Figure 16:
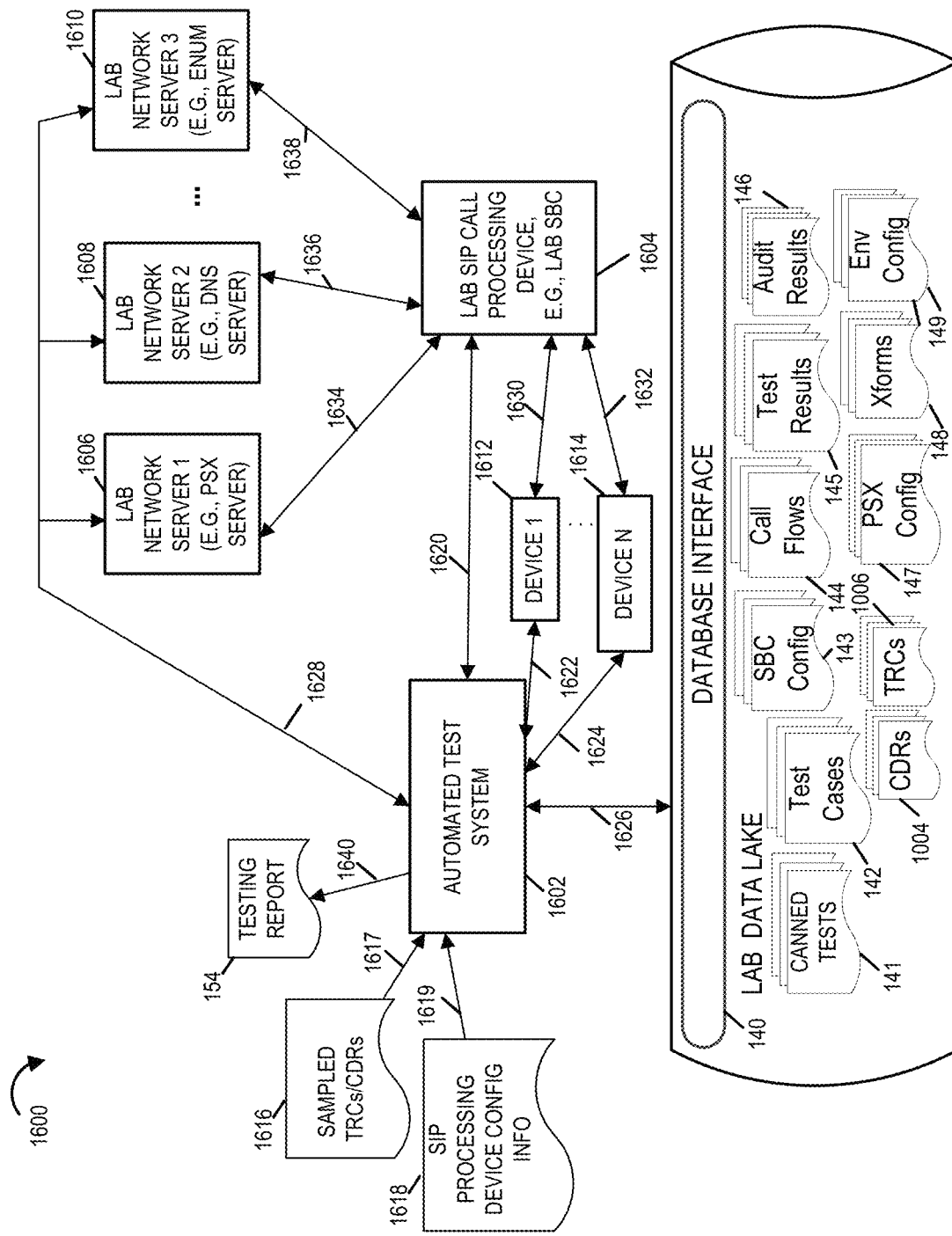
FIG. 16 illustrates an exemplary lab environment in accordance with an embodiment of the present invention.

System 3000 of FIG. 15 illustrates a production network as previously discussed. The system 1600 of FIG. 16 illustrates a lab environment in which an automated test system 1602 generates and executes test calls on a lab SIP processing entity (e.g., lab SBC) 1604. The system 1600 includes an automated test system 1602, a lab SIP processing device 1604 (e.g., a lab SBC), a plurality of lab network equipment devices (i.e., lab network server 1 1606 (e.g., a PSX server), lab network server 2 1608 (e.g., a DNS server), . . . , lab network server 1610 (e.g., ENUM server)), device 1 1612, . . . , device N 1614 (where N is an integer number greater than 1), a lab data lake 139 and a plurality of communications links which couple and/or connect the entities and/or devices of the system 1600 so that they can exchange messages and/or information. The plurality of communications links include communication links 1620, 1622, 1624, 1626, 1628, 1630, 1632, 1634, 1636, 1638. Communications link 1620 couples and/or connects the automated test system 1602 to the lab SIP call processing device 1604. Communications link 1622 couples and/or connects the automated test system 1602 to the device 1 1612. Communications link 1624 couples and/or connects the automated test system 1602 to the device N 1614. Communications link 1626 couples and/or connects the automated test system 1602 to the lab data lake 139. Communications link 1628 couples and/or connects the automated test system 1602 to the plurality of network equipment devices 1606, 1608, . . . , 1610. Communications links 1630, . . . , 1632 couple and/or connect device 1 1612, . . ., device N 1614 to the lab SIP processing entity 1604 respectively. Communications links 1634, 1636, . . . , 1638 couples and/or connects lab network server 1 1606, lab network server 2 1608, . . ., lab network server 1610 to the lab SIP processing entity 1604 respectively. The communications links are only exemplary and other arrangements of network connections may be implemented. Elements or steps with the same reference numbers used in different figures are the same or similar and those elements or steps will not be described in detail again.

The SIP processing entity 1604 in some embodiments is the lab SBC 166 of system 100 or system 1400. In some embodiments, the automated test system 1602 is implemented as automated test system 1406 of system 1400. The automated test system in some embodiments is implemented in computing node/entity/device 900. In some such embodiments, the assembly of components 1010 may be included in the computing node/entity/device 900 as hardware and/or software components. In various embodiments, the system 1600 lab network equipment devices 1606, 1608, . . . , 1610 are devices which represent the production network equipment device 3220, 3221, . . . , 3222 and are configured or controlled by the automated test system 1602 to respond to requests and/or messages from the lab SBC in a manner the same as or similar to the production network equipment devices. In some embodiments, these network equipment devices are not included and requests and/or messages sent to these network equipment devices from the lab SIP processing device 1604 are directed to the automated test system which emulates or simulates these network equipment devices and provides the appropriate response to lab SIP processing device 1604 based on entries in test scripts generated based on learned call flows.

The devices 1 1612, . . ., device N 1614 are communications devices which are SIP enabled and SDP enabled which are controlled by the automated test system 1602 during test execution. These devices send and receive SIP messages from the lab SIP call processing device during the execution of tests. The devices are sometimes referred to herein as target devices. These devices under the control of the automated test system simulate the various SIP peer and end-point entities with which a production SIP processing device communicate with in a production network when establishing SIP calls (e.g., enterprise telephony system 3180, UE 3 3400, UE 2A 3340, UE device 4A 3420 and peer devices in the networks 3040, 3060, 3200 with which the SBC 3080 communicates with using the SIP and SDP protocols to establish calls). In some embodiments, the automated test system 1602 emulates or simulates these devices itself instead of controlling the devices. In such instances, the automated test system 1602 sends and receives SIP messages from the lab SIP call processing device 1604 during execution of test calls.

At a high level, the automated test system 1602 receives sampled TRCs/CDRs 1616 and SIP processing configuration information and uses this information to twin the configuration for the lab SIP processing device to be tested in the lab environment, generate call flow records, generate test cases including test scripts, execute or run the test cases, generate test case call flows from the TRCs/CDRs generated by the lab SIP processing device during the tests, and generate and output testing reports for the test cases executed.

The automated test system receives SIP processing device configuration information 1618 (e.g., from the computer 1610 in production system 3000 or from the production SIP processing device in the production system (e.g., SBC 3080)). The automated test system 1602 receives sampled trace records and call detail records 1616 for example from the TRC/CDR sampler 3600 in production system 3000, from the database 3160 (e.g., in response to database requests) or from the production SIP processing device 3080 as described in connection with automated test system 114 of system 100 where the database 3160 is the production data lake. The TRC/CDR records may be, and in some embodiments are, received directly from a production SIP processing device (e.g., production SBC when sampling is enabled in the production SBC e.g., as described in method 700). In some embodiments, the automated test system 1606 includes one or more of the components of the automated test system 114 of system 100.

In some embodiments, the automated test system 1602 includes a TRC/CDR ingestion component 116, a traffic learning component 117, a production twinning component 124, a test generator component 156, a test runner component 158, a device healthcheck component 159, a test auditor component 164, a GUI component 151, dashboards component 127 and reports component 153 and implements the steps and flow described in connection with system 100 and/or the methods described in FIGS. 2, 3, 4, 5, 6, 7, and 8.

In some embodiments, the automated test system 1602 includes one or more of the components of the automated test system 1406 of system 1400. In some embodiments, the automated test system 1602 includes a TRC/CDR scanner component 1412, a production twinning component 124, a traffic learning component 1415, a test generator component 1416, a test runner component 158, a device healthcheck component 159, a TRC/CDR ingestion component 161, a traffic learning component 163, a test auditor component 165, a GUI component 151, dashboards component 127 and reports component 153. Elements or steps with the same reference numbers used in different figures are the same or similar and those elements or steps will not be described in detail again.

Figure 22A:
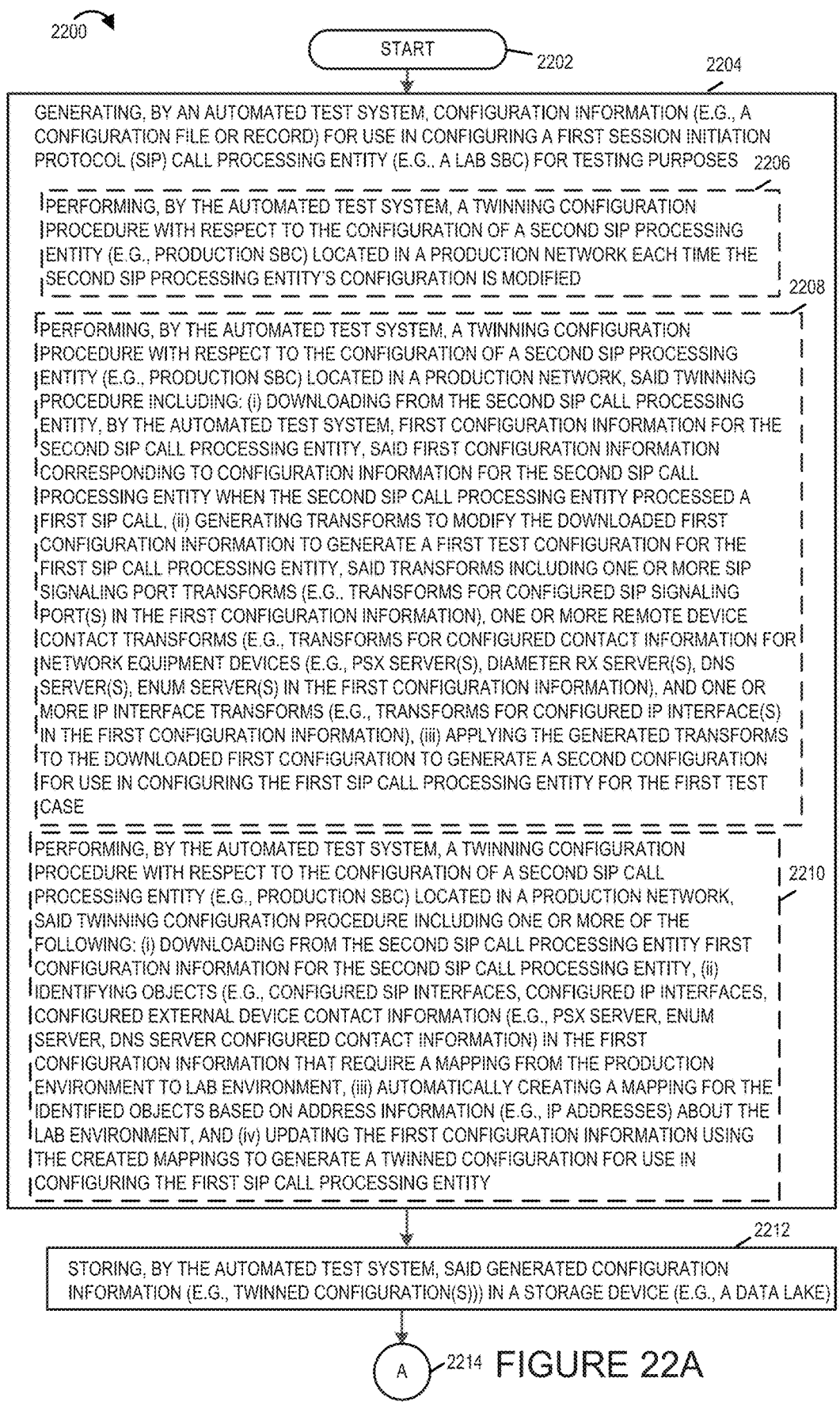
FIG. 22A illustrates a first part of a flowchart of a method in accordance with an embodiment of the present invention.
Figure 22B:
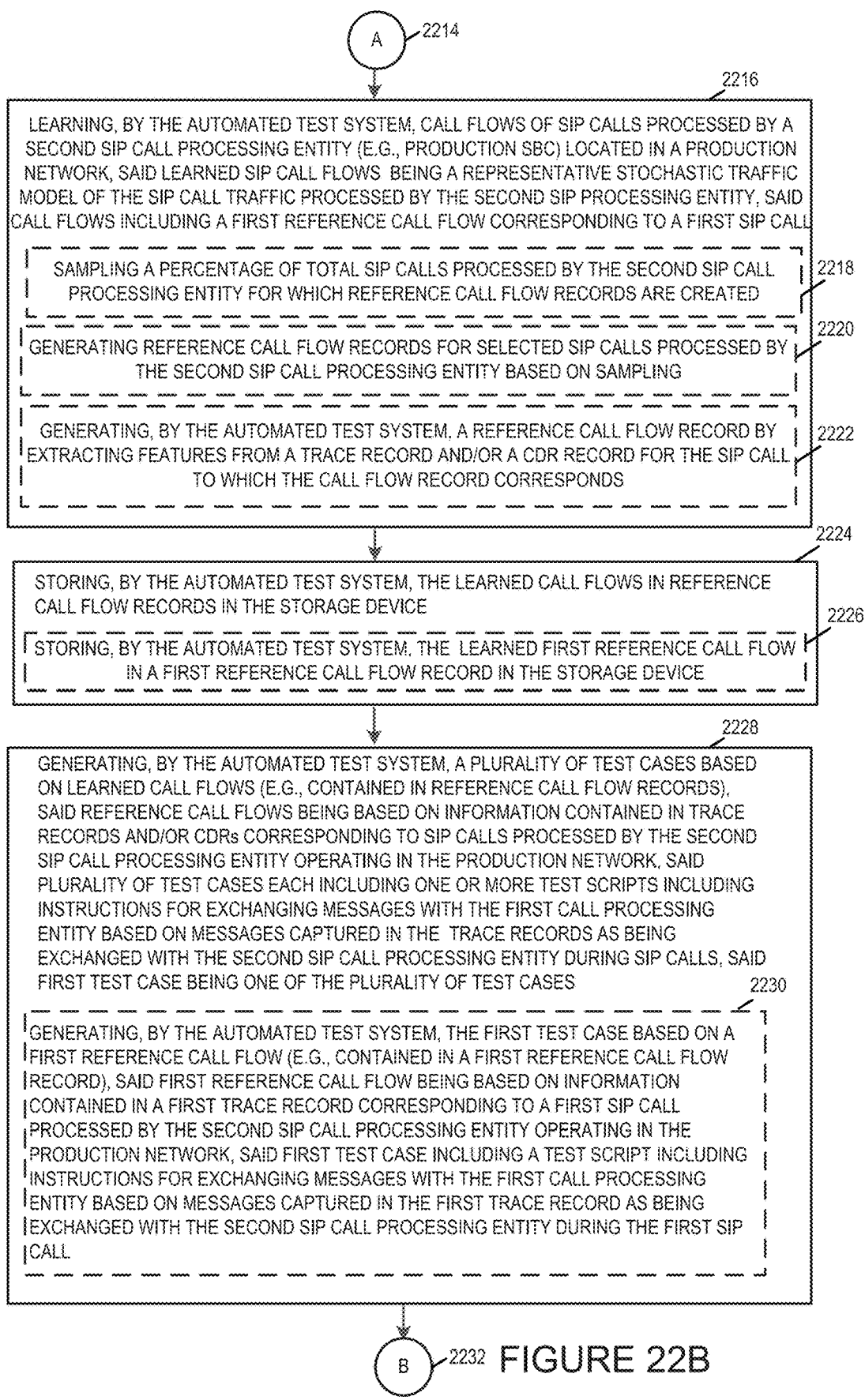
FIG. 22B illustrates a second part of a flowchart of a method in accordance with an embodiment of the present invention.
Figures 22, 22C:
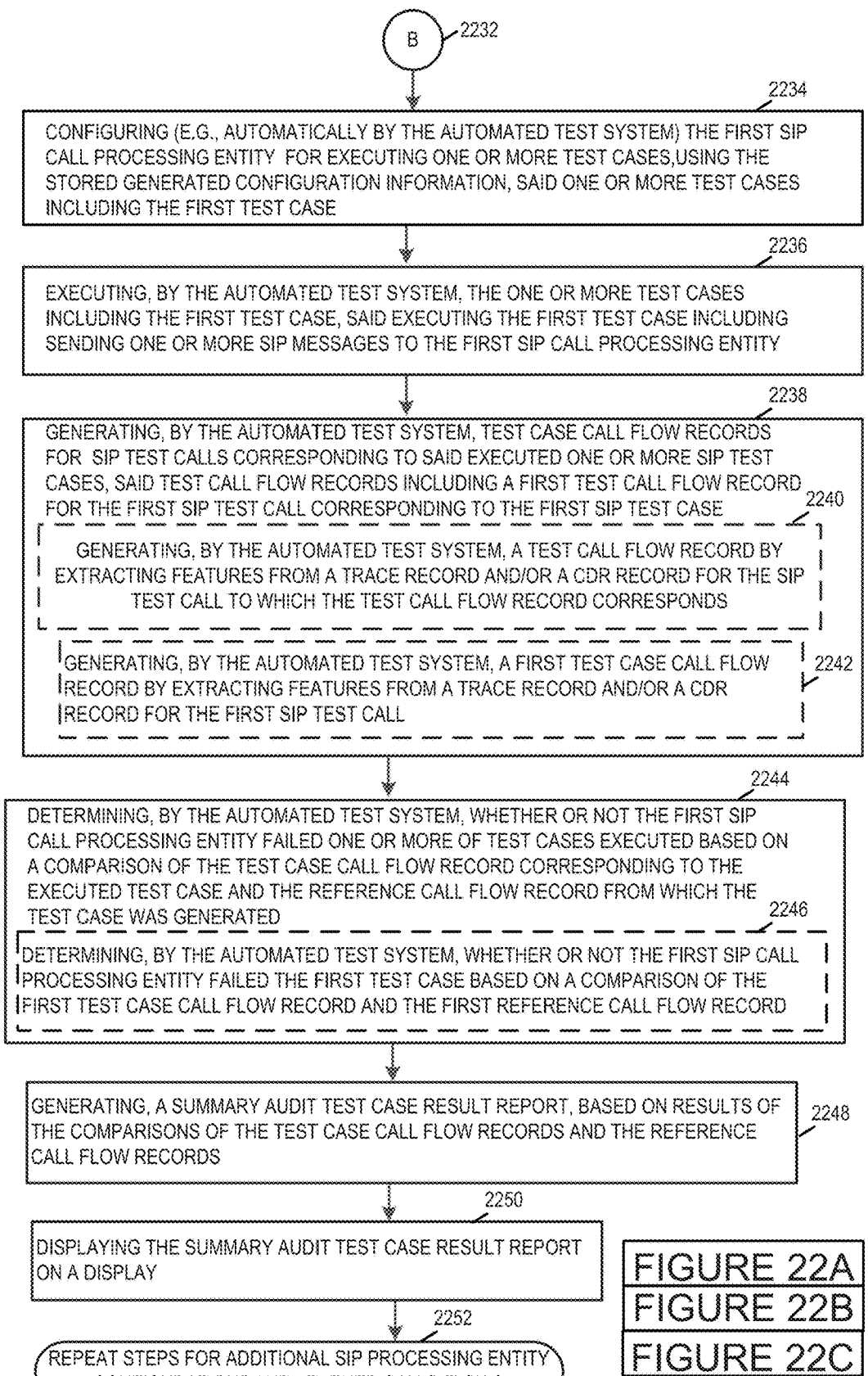
FIG. 22 illustrates the combination of FIGS. 22A, 22B, and 22C.
FIG. 22C illustrates a third part of a flowchart of a method in accordance with an embodiment of the present invention.

FIG. 22 illustrates the combination of FIGS. 22A, 22B, and 22C. FIG. 22A illustrates a first part of a flowchart of a method 2200 in accordance with an embodiment of the present invention. FIG. 22B illustrates a second part of a flowchart of the method 2200 in accordance with an embodiment of the present invention. FIG. 22C illustrates a third part of a flowchart of the method 2200 in accordance with an embodiment of the present invention. The method 2200 may be implemented on the exemplary system 100 disclosed in FIG. 1. It is to be understand that the method 2200 may be, and in some embodiments is, implemented on other systems with other architectures for example, the method 2200 may also be implemented on the combination of the exemplary systems 1300 and 1400 illustrated in FIGS. 13 and 14 or the combination of the exemplary systems 1500 and 1600 illustrated in FIGS. 15 and 16. While it will be readily understood that additional steps and signaling are performed in connection with communicating information, messages, and packets between devices, the method 2200 focuses on and discusses the steps and signaling for understanding the invention.

The method 2200 commences in start step 2202 shown on FIG. 22A. Operation proceeds from start step 2202 to step 2204.

In step 2204, an automated test system (e.g., learning-based testing system 114 of system 100) generates configuration information (e.g., SBC configuration information in the form of a configuration file or record) for use in configuring a first session initiation protocol (SIP) call processing entity (e.g., a lab SBC 166 of system 100) for test purposes. Step 2204 includes one or more sub-steps 2206, 2208, 2210.

In sub-step 2206, the automated test system performs a twinning configuration procedure with respect to the configuration of a second SIP processing entity (e.g., a production SBC such as production SBC 102 of system 100) located in a production network each time the second SIP processing entity's configuration is modified.

In sub-step 2208, the automated test system performs a twinning configuration procedure with respect to the configuration of a second SIP processing entity (e.g., a production SBC such as production SBC 102 of system 100) located in a production network. The twinning procedure including: (i) downloading from the second SIP call processing entity, by the automated test system, first configuration information for the second SIP call processing entity, the first configuration information corresponding to configuration information for the second SIP call processing entity when the second SIP call processing entity processed a first SIP call, (ii) generating transforms to modify the downloaded first configuration information to generate a first test configuration for the first SIP call processing entity, said transforms including one or more SIP signaling port transforms (e.g., transforms for configured SIP signaling port(s) in the first configuration information), one or more remote device contact transforms (e.g., transforms for configured contact information for network equipment devices (e.g., PSX server(s), Diameter Rx server(s), DNS server(s), ENUM server(s)) in the first configuration information), and one or more IP interface transforms (e.g., transforms for configured IP interface(s) in the first configuration information), and (iii) applying the generated transforms to the downloaded first configuration information to generate a first test configuration for use in configuring the first SIP call processing entity for the first test case, the first test configuration being part of the generated configuration information for use in configuring the first SIP call processing entity for testing purposes.

In sub-step 2210, the automated test system performs a twinning configuration procedure with respect to the configuration of a second SIP call processing entity (e.g., production SBC 102 of system 100) located in a production network including: (i) downloading from a second SIP call processing entity first configuration information for the second SIP call processing entity, (ii) identifying objects (e.g., configured SIP interfaces, configured IP interfaces, configured external device contact information (e.g., PSX server(s), ENUM server(s), DNS server(s) configured contact information) in the first configuration that requires a mapping from the production network environment in which the second SIP call processing entity is located to a lab environment/system, (iii) automatically creating a mapping for the identified objects based on address information (e.g., IP addresses) about the lab environment system, and (iv) updating the first configuration using the created mappings to generated a twinned configuration for use in configuring the first SIP call processing entity. Operation proceeds from step 2204 to step 2212.

In step 2212, the automated test system stores the generated configuration information (e.g., twinned configuration(s)) in a storage device (e.g., a data lake or database such as a combined data lake 129 and 139 of system 100). Operation proceeds from step 2212 to step 2216 shown on FIG. 22B via connection node A 2214.

In step 2216, the automated test system learns call flows of SIP calls processed by the second SIP call processing entity (e.g., production SBC 102) located in the production network, the learned SIP call flows being a representative stochastic traffic model of the SIP call traffic processed by the second SIP processing entity. The learned call flows include a first reference call flow corresponding to a first SIP call processed by the second SIP call processing device. The generated configuration information in step 2204 is based on the second SIP call processing entity's configuration during the processing of the calls corresponding to the learned call flows. The second SIP processing entity generates call detail records and trace records for the processed calls corresponding to the learned call flows. The learned call flows are sometimes referred to as referenced call flows as they are used as references in auditing and/or determining the results of executed test cases generated from reference call flows and/or information (e.g., CDRs and Trace records) used to generate the reference call flows. In some embodiments, step 2216 includes one or more sub-steps 2218, 2220, and 2222. In sub-step 2218, the automated test system samples a percentage of total SIP calls processed by the second SIP call processing entity for which reference call flow records are created. In sub-step 2220, the automated test system generates reference call flow records for selected SIP calls processed by the second SIP call processing entity based on sampling criteria (e.g., sample less than X % of SIP processed calls, where X % is a very small number of the total SIP processed calls). In sub-step 2222, the automated test system generates a reference call flow record by extracting features from a trace record and/or a call detail record for the SIP call to which the reference call flow record corresponds. The automated test system generates reference call flow records in this manner for each of learned call flows. Operation proceeds from step 2216 to step 2224.

In step 2224, the automated test system stores the generated learned call flows in reference call flow records in the storage device (e.g., a data lake or database system). In some embodiments, the step 2224 includes sub-step 2226. In sub-step 2226, the automated test system stores the learned first reference call flow in a first reference call flow record in the storage device. Operation proceeds from step 2224 to step 2228.

In step 2228, the automated test system generates a plurality of test cases based on the learned call flows (e.g., contained in the reference call flow records), the reference call flows being based on information contained in trace records and/or call detail records corresponding to SIP calls processed by the second SIP call processing entity operating in the production network. The plurality of test cases each including one or more test scripts including instructions for exchanging messages with the first call processing entity based on messages captured in the trace records as being exchanged with the second SIP call processing entity during SIP calls, said first test case being one of the plurality of test cases. In some embodiments, the step 2228 includes sub-step 2230. In sub-step 2230, the automated test system generates the first test case based on the first reference call flow (e.g., contained in the first reference call flow record), the first reference call flow being based on information contained in a first trace record and/or a first call detail record corresponding to a first SIP call process by the second SIP call processing entity operating in the production network, the first test case including a test script including instructions for exchanging messages with the first call processing entity based on messages captured in the first trace record as being exchanged with the second SIP call processing entity during the first SIP call. Operation proceeds from step 2228 via connection node B 2232 to step 2234 shown in FIG. 22C.

In step 2234, the first SIP call processing entity is configured (e.g., automatically by the automated test system) for executing one or more test cases using the stored generated configuration information from step 2212 (e.g., twinned configuration). The one more test cases includes the first test case. Operation proceeds from step 2234 to step 2236.

In step 2236, the automated test system executes the one or more test cases including the first test case, the executing of the first test case including sending one or more SIP messages to the first SIP call processing entity. Operation proceeds from step 2236 to step 2238.

In step 2238, the automated test system generates test case call flow records for SIP test calls corresponding to the executed one or more SIP test cases. The test case call flow records include a first test call flow record for the first SIP test call corresponding to the first SIP test case. In some embodiments step 2238 includes one or more of the sub-steps 2240 and 2242. In step 2240, the automated test system generates a test call flow record by extracting features from a trace record and/or a call detail record for the SIP test call to which the test call flow record corresponds. In sub-step 2242, the automated test system generates a first test case call flow record by extracting features from a trace record and/or a call detail record for the first SIP test call. Operation proceeds from step 2238 to step 2244.

In step 2244, the automated test system determines whether or not the first SIP call processing entity failed one or more test cases executed based on a comparison of the test case call flow record corresponding to the executed test case and the reference call flow record from which the test case was generated. In some embodiments, step 2244 includes sub-step 2246. In sub-step 2246, the automated test system determines whether or not the first SIP call processing entity failed the first test case based on a comparison of the first test case call flow record and the first reference call flow record. In some embodiments, the step of determining by the automated test system whether or not the first call processing entity failed the first test case based on a comparison of the first test case call flow record and the first reference call flow record includes: determining that the first SIP call processing entity failed the first test case when the comparison of the first test case call flow record and the first reference call flow record indicates that extracted features included in the first test case call flow record do not match extracted features included in the first reference call flow record. In some embodiments, the features extracted from the first call detail record and the first trace record as part of generating the first reference call flow record include for each call leg of the first SIP call: (i) a call leg identifier, (ii) a listing of SIP messages received by the second SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier. In some embodiments, the features extracted from the first test call detail record and the first test call trace record as part of generating the first test case call flow record include for each call leg of the first SIP call: (i) a call leg identifier, (ii) a listing of SIP messages received by the second SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

In some embodiments, the step of determining, by the automated test system, whether or not the first SIP call processing entity failed the first test case based on a comparison of the first test case call flow record and the first reference call flow record includes: comparing features from the first test case call flow record to corresponding features of the first reference call flow record; assigning a penalty value to each compared feature which does not match; determining a test score for the first test case based on combined sum of the penalty values for each of the features which did not match; determining whether the test score is above a first threshold value; when the test score is determined to be above a first threshold value, determining that the first test case failed; and when the test score is not above the first threshold value, determining that the first test case passed. In some such embodiments, the penalty value assigned is a function of the severity of the mismatch. In some embodiments, the method further includes that prior to assigning a penalty value to each compared feature which does not match, learning, by the automated test system, what penalty value to assign to a feature mismatch based on prior penalty value assignments received from an operator of the automated test system for the same feature mismatch with respect to the evaluation of different test cases than the first test case.

In some embodiments, the step of determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates one or more of the following: (i) that the number of SIP messages included in the first test case call flow record and the number of SIP messages included in the first reference call record are different, (ii) that a list of SIP header fields included in each of the SIP messages included in the first test case call flow record and a list of SIP header fields included in each of the SIP messages included in the first reference call flow record are different, and (iii) that a list of parameters included in each of the SIP header fields included in each of the SIP messages included in the first test case call flow record and a list of parameters included in each of the SIP header fields included in each of the SIP messages included in the first reference call flow record are different.

In some embodiments, determining whether or not the first SIP call processing entity failed a test case is further based on whether or not the test case did not complete successfully. In some such embodiments, the test case is determined to not have completely successfully when one or more of the following occur: (i) the execution of the test case does not complete (e.g., the test case is aborted during execution because of a failure experienced by a client device or a failure by the first SIP call processing entity), and (ii) an anomalous condition is detected after the completion of the execution of the test case (e.g., a coredump of the first SIP call processing entity is detected or ASAN logs indicate issues occurred during the execution of the test case). Operation proceeds from step 2244 to step 2248.

In step 2248, the automated test system generates a summary audit test case result report based on results of the comparisons of the test case call flow records and the reference call flow records. Operations proceeds from step 2248 to step 2250.

In step 2250, the automated test system displays the summary audit test case result report to a display. Operation proceeds from step 2250 to step 2252.

In step 2252, the method steps of method 2200 are repeated for additional SIP processing entity configurations and learned call flows.

FIG. 11 illustrates an exemplary audit test report 1100 for a single test case. The audit test report 1100 includes an audit report ID 1102 which identifies the audit test report, device under test identifier with hardware release identifier and software release identifier 1104, production device information 1106 (the production information including for example, production device identifier, hardware release identifier and software release identifier for the production device from which TRC and CDR information was used to generate reference call flow and whose configuration was twinned); production device configuration record identifier 1108; twinned configuration record identifier 1110; transforms record identifier with list of transforms 1112 (e.g., transform entry identifiers used in twinning process); audit test result ID 1116 which identifies the test result record for the test case result being audited; overall audit result—pass/fail 1118, audit score 1120, test result pass/fail with reason(s) for failure 1122 (e.g., obtained from test result record (e.g., coredump) for test case generated by the test runner component); reference call flow identifier 1124 which identifies reference call flow record used for comparison (e.g., GCID for ingress leg of call); test call flow identifier 1126 which identifies test call flow record used for comparison); feature 1 pass/fail 1128, feature 1 cause of failure 1130 (blank when no failure); feature 1 expected vs actual result with difference highlighted 1132; feature 2 pass/fail 1134, feature 2 cause of failure 1136 (blank when no failure); feature 2 expected vs actual result with difference highlighted 1138; . . . (results of features compared in the audit from 2 to M), feature M pass/fail 1140 (M being the last of the features compared in the audit), feature M cause of failure 1142 (blank when no failure); feature M expected vs actual result with difference highlighted 1144. The audit report can be outputted to a file, a device, or a display. In some embodiments, when the report is displayed on a display the entries in the report are actionable links which allow additional information about the audit to be displayed. For example, the reference call flow ID entry may be, and in some embodiments is, an actionable link that selects the reference call flow record used in the comparison to be displayed. In some embodiments, in addition to the feature pass/fail information, a score or penalty value for the feature is also included (e.g., indicating a severity associated with the mismatch).

Figure 12:
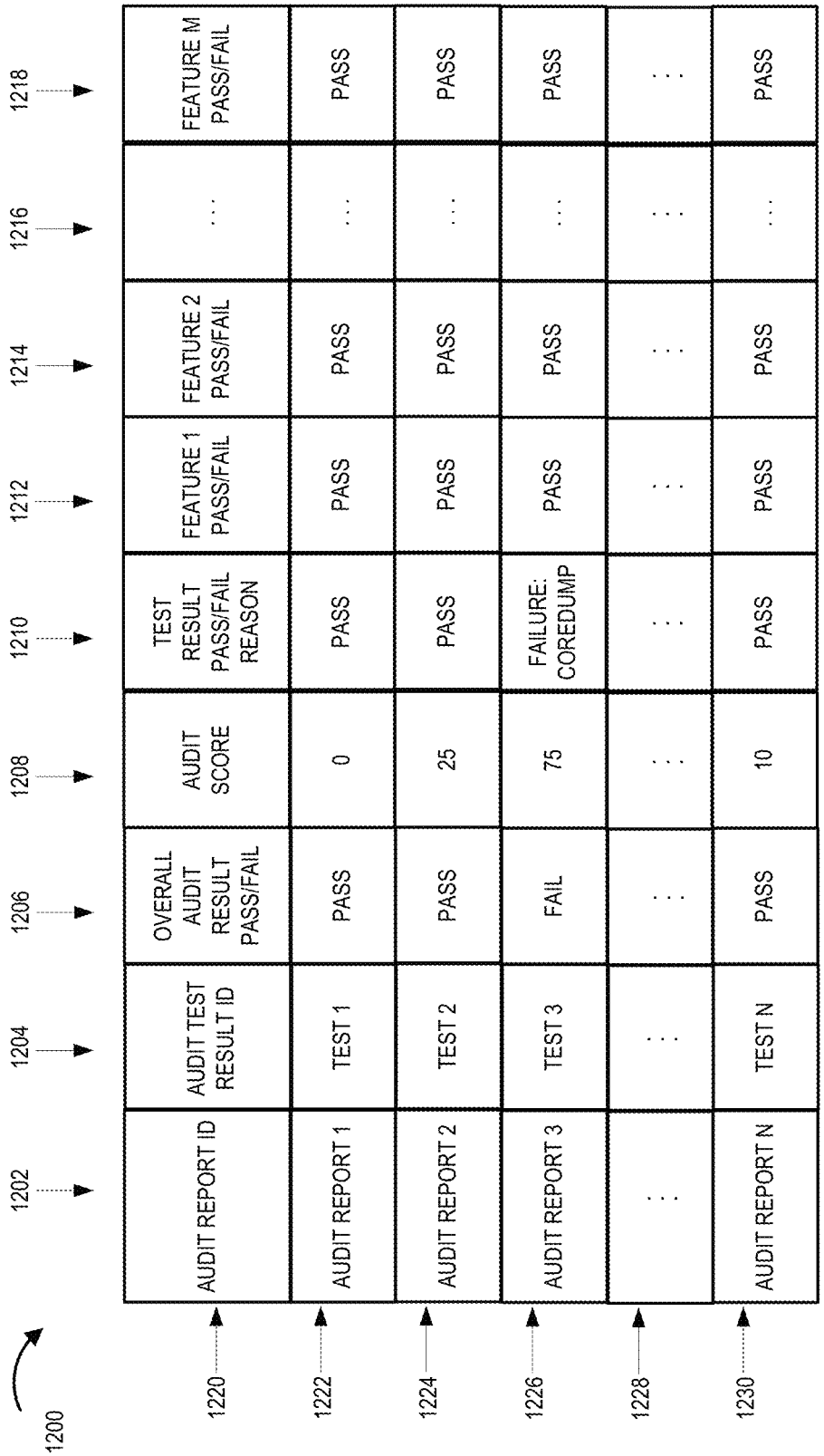
FIG. 12 illustrates an exemplary audit summary report in accordance with an embodiment of the present invention.

FIG. 12 illustrates an exemplary summary audit test report 1200 in the form of a table. Summary audit test report 1200 includes columns 1202, 1204, 1206, 1208, 1210, 1212, 1214, 1216, and 1218 and rows 1220, 1222, 1224, 1226, 1228, 1230. The first row 1220 includes labels identifying the information contained in the each of the columns. The entries in column 1202 identify audit report identifier (col. 1202, row 1220 entry). The audit test result identifier (column 1204, row 1220) indicates that the entries in column 1204 correspond to the audit test result record identifier for the audit test report identified in the same row. The overall audit result pass/fail (column 1206, row 1220) indicates that the entries in column 1206 correspond to an overall audit result from the audit report identified in the same row. The audit score (column 1208, row 1220) indicates that the entries in column 1208 correspond to the audit score from the audit report identified in the same row. The test result pass/fail reason (column 1210, row 1220) indicates that the entries in column 1210 correspond to the test result pass/fail reason from the audit report identified in the same row. This is the result from the test result record identified in column 1204 of the same row which is also included in the audit report identified in the same row. The feature 1 pass/fail (column 1212, row 1220) indicates that the entries in column 1212 correspond to whether the first feature from the call flows being compared by the audit passed or failed the audit. This information is included in the audit report for the audit report identified in the same row as the entry. The feature 2 pass/fail (column 1214, row 1220) indicates that the entries in column 1214 correspond to whether the second feature from the call flows being compared by the audit passed or failed the audit. This information is included in the audit report for the audit report identified in the same row as the entry. The . . . in column 1216 indicates additional entries in the table for features between 2 and M, M being that last feature compared in the audit of the audit report in the same column. The feature M pass/fail (column 1284, row 1220) indicates that the entries in column 1218 correspond to whether the Mth feature from the call flows being compared by the audit passed or failed the audit. This information is included in the audit report for the audit report identified in the same row as the entry, the Mth feature being the last of the features in the call flows compared by the audit. In this way, the summary audit report lists all of the features compared and whether they passed or failed the audit with respect to each of the audit reports.

Row 1222 includes information for the audit report 1 (col. 1202, row 1222 entry) that indicates: (i) the audit was for test 1 included in test result record 1 (col. 1204, row 1222 entry); (ii) the overall audit result was pass (col. 1206, row 1222 entry); (iii) the audit score was 0 (no discrepancies) (col. 1208, row 1222), (iv) the test result was pass indicating that the test result record indicated that the test passed (e.g., no coredump or other problems detected with respect to the test execution and test script result indicated pass) (col. 1210, row 1222 entry), audit result for feature 1 is passed (i.e., comparison of reference call flow feature 1 and test call feature 1 matched indicated by pass) entry (col. 1212, row 1222), audit result for feature 2 is passed (i.e., comparison of reference call flow feature 2 and test call feature 2 matched indicated by pass) entry (col. 1214, row 1222), . . . (col. 1216, row 1222), audit result for feature M is passed (i.e., comparison of reference call flow feature M and test call feature M matched indicated by pass) entry (col. 1218, row 1222).

Row 1224 contains summary information for audit report 2. Row 1226 contains summary information for audit report 3. The " . . . " in row 1228 indicates there is information for additional audit reports not shown. Row 1230 contains summary information for audit report N (N being an integer greater than 3). The summary audit report is available to be outputted in a variety of ways: it may be outputted as file, to a printer, to another device, or displayed on a display. In some embodiments, when summary audit report is outputted to a display the entries are actionable links which when selected display additional data to the display. For example, when the audit report 1 entry is selected the audit report 1 is displayed to the screen (e.g., the audit report 1100 illustrated in FIG. 11).

FIG. 23 illustrates another exemplary audit result report 2300 with descriptions and exemplary remarks jn accordance with an embodiment of the present invention. It includes information on the binder_Id, execution ID, run_ID, test_suite_ID, TC_ID, iteration count, audit result, total feature count, total_match_count, TC_Features_Not-Match, and Audit_Error_Details. The exemplary audit result report 2300 illustrates exemplary call flow features which did not match as well as exemplary audit error details.

Figure 19:
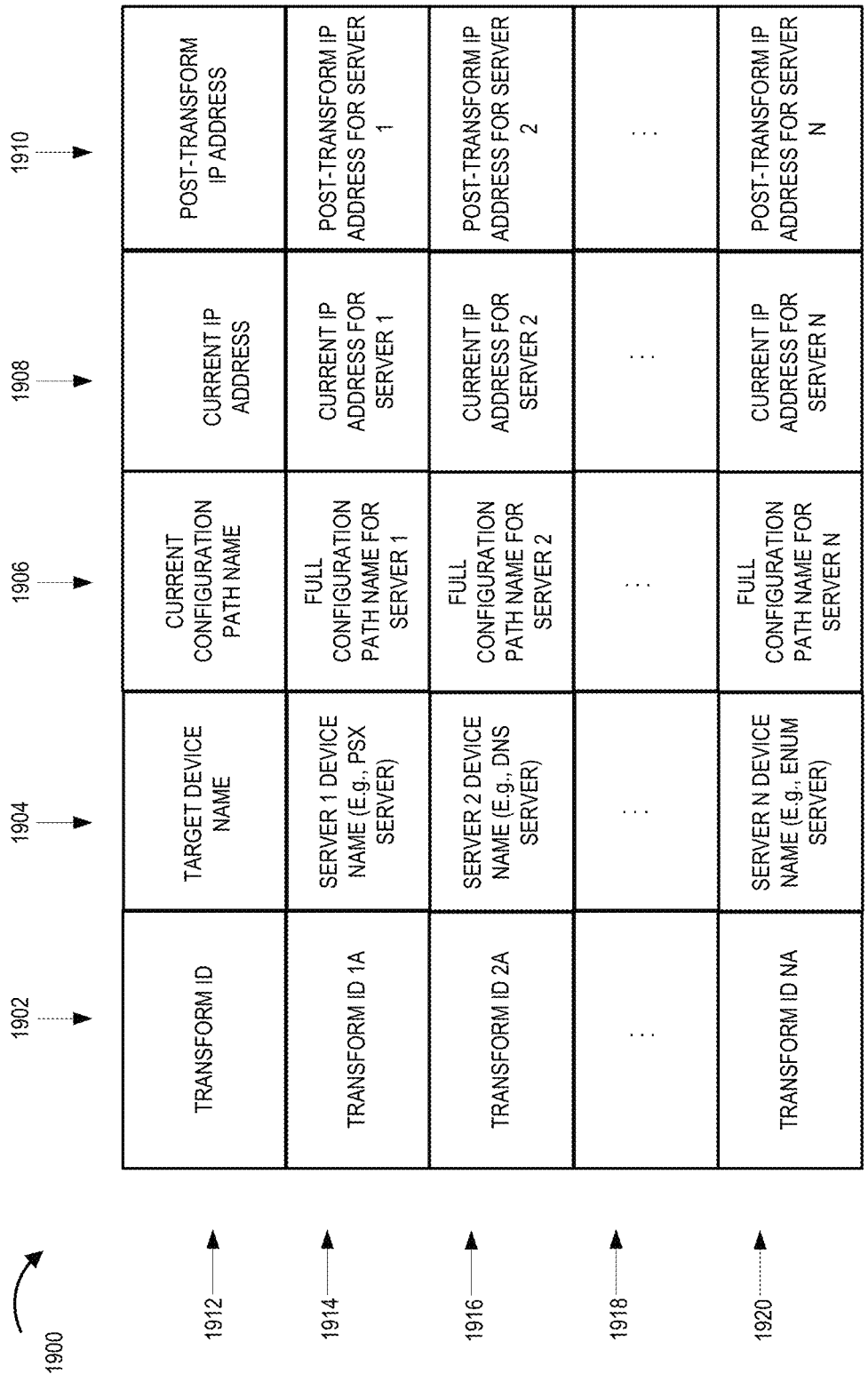
FIG. 19 illustrates an exemplary transform record including a plurality of exemplary transform entries for exemplary network devices.

FIG. 19 illustrates an exemplary transform record 1900 in accordance with an embodiment of the present invention. The exemplary transform record 1900 is in the form of a table and it includes transform entries for transforming addressing information for external devices (e.g., network equipment devices such as servers) from production network addresses configured in the production SBC to addresses compatible for the lab environment or test environment in which the lab SBC will be tested. The exemplary transform record 1900 includes columns 1902, 1904, 1906, 1908, and 1910 and rows 1912, 1914, 1916, 1918, 1920. The first row 1912 includes labels identifying the information contained in each of the columns. The entries in column 1902 identify a transform entry ID (col. 1902, row 1912 entry) to which information in that row corresponds. The entries in column 1904 identify the production configuration target device name (column 1904, row 1912) to which the transform identifier of the same row corresponds. The current configuration path name (column 1906, row 1912) indicates that the entries in column 1906 correspond to production current configuration path name for the configured target device name in the same row. The current IP address (column 1908, row 1912) indicates that the entries in column 1908 correspond to production currently configured IP address for the configured target device name identified in the same row. The post-transform IP address (column 1290, row 1912) indicates that the entries in column 1910 correspond to the IP address for the target device name of the same row after the transform has been applied. It is the address to be used in the lab environment in which the tests will be performed.

Row 1914 includes information for the transform ID TA entry (col. 1902, row 1914 entry) that indicates: (i) transform ID TA is for server 1 (e.g., PSX server) (col. 1904, row 1912 entry); (ii) the col. 1906 row 1914 entry includes the full configuration path for the server 1; (iii) the col. 1908, row 1914 entry includes the currently configured IP address for server 1; (iv) the col. 1910, row 1914 entry includes the post-transform IP address to be applied for the server 1 replacing the IP address in the entry column 1908, row 1914.

Row 1916 includes transform information for transform ID 2A which is for server 2. The " . . . " in row 1918 entries indicates that there are other transform entries for other target devices not shown. Row 1920 includes transform information for transform ID NA corresponding to server N (N being an integer greater than 2).

FIG. 20 illustrates an exemplary transform record including a plurality of exemplary transform entries for exemplary Internet Protocol interfaces. The exemplary transform record 2000 is in the form of a table and it includes transform entries for transforming addressing information for Internet protocol interface from production network addresses configured in the production SBC to addresses compatible for the lab environment or test environment in which the lab SBC will be tested. The exemplary transform record 2000 includes columns 2002, 2004, 2006, 2008, 2010, 2012, and 2014 and rows 2016, 2018, 2020, 2022, and 2024. The first row 2016 includes labels identifying the information contained in each of the columns. The entries in column 2002 identify a transform entry ID (col. 2002, row 2016 entry) to which information in that row corresponds. The entries in column 2004 identify the configured production Internet Protocol Interface ID (column 2004, row 2016) to which the transform identifier of the same row corresponds. The current configuration path name (column 2006, row 2016) indicates that the entries in column 2006 correspond to production current configuration path name for the configured Internet Protocol interface identified in the same row. The current IP address or variable (column 2008, row 2016) indicates that the entries in column 2008 correspond to currently configured production IP address or variable for the configured IP interface identified in the same row. The post-transform IP address or variable (column 2010, row 2016) indicates that the entries in column 2010 correspond to the IP address or variable for the IP interface identified of the same row after the transform has been applied. It is the IP address or variable to be used in the lab environment in which the tests will be performed. The current IP prefix or variable (column 2012, row 2016) indicates that the entries in column 2012 correspond to currently configured production IP prefix or variable for the configured IP interface identified in the same row. The post-transform IP prefix or variable (column 2014, row 2016) indicates that the entries in column 2014 correspond to the IP prefix or variable for the IP interface identified of the same row after the transform has been applied. It is the IP prefix or variable to be used in the lab environment in which the tests will be performed.

Row 2018 includes information for the transform ID 1B entry (col. 2002, row 2018 entry) that indicates: (i) transform ID 1B is for IP Interface 1 (col. 2004, row 2018 entry); (ii) the col. 2006 row 2018 entry includes the current full configuration path for the IP interface 1; (iii) the col. 2008, row 2018 entry includes the currently configured IP address or variable for IP interface 1; (iv) the col. 2010, row 2018 entry includes the post-transform IP address or variable to be applied for the IP interface 1 replacing the IP address or variable in the entry column 2008, row 2018; (v) the col. 2012, row 2018 entry includes the currently configured IP prefix or variable for IP interface 1; (vi) the col. 2014, row 2018 entry includes the post-transform IP prefix or variable to be applied for the IP interface 1 replacing the IP prefix or variable in the entry column 2010, row 2018, Row 2020 includes transform information for transform ID 2B which is for IP interface 2. The " . . . " in row 2022 entries indicates that there are other transform entries for other IP interfaces not shown. Row 2024 includes transform information for transform ID NB corresponding to IP Interface N (N being an integer greater than 2).

Figure 21:
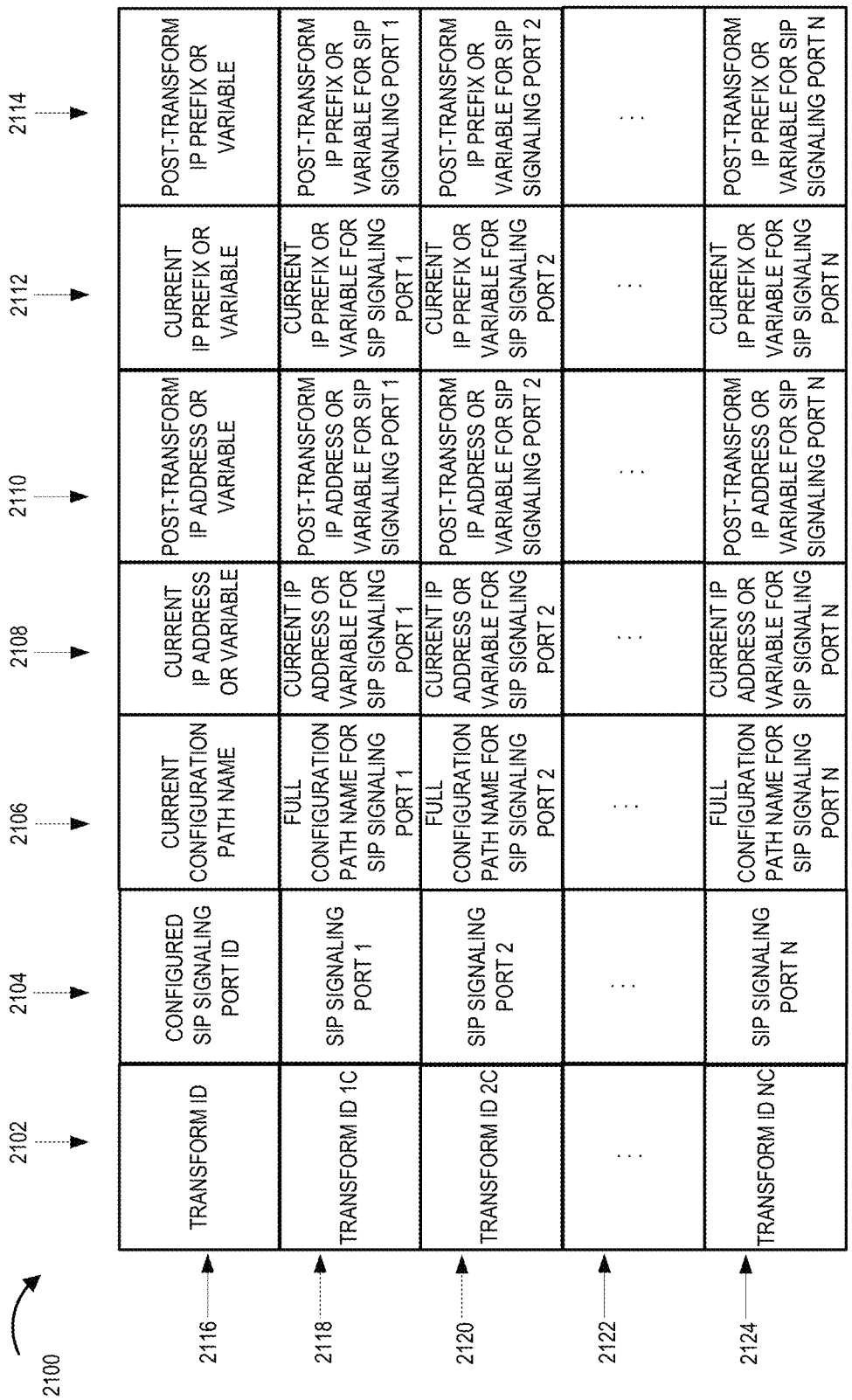
FIG. 21 illustrates an exemplary transform record including a plurality of exemplary transform entries for exemplary SIP signaling ports.

FIG. 21 illustrates an exemplary transform record including a plurality of exemplary transform entries for exemplary SIP signaling ports. The exemplary transform record 2100 is in the form of a table and it includes transform entries for transforming addressing information for SIP signaling ports from production network addresses configured in the production SBC to addresses compatible for the lab environment or test environment in which the lab SBC will be tested. The exemplary transform record 2100 includes columns 2102, 2104, 2106, 2108, 2110, 2112, and 2114 and rows 2116, 2118, 2120, 2122, and 2124. The first row 2116 includes labels identifying the information contained in each of the columns. The entries in column 2102 identify a transform entry ID (col. 2102, row 2116 entry) to which information in that row corresponds. The entries in column 2104 identify the configured production SIP signaling port ID (column 2104, row 2116 entry) to which the transform identifier of the same row corresponds. The current configuration path name (column 2106, row 2116) indicates that the entries in column 2106 correspond to production current configuration path name for the configured SIP signaling port identified in the same row. The current IP address or variable (column 2108, row 2116) indicates that the entries in column 2108 correspond to currently configured production IP address or variable for the configured SIP signaling port identified in the same row. The post-transform IP address or variable (column 2110, row 2116) indicates that the entries in column 2110 correspond to the IP address or variable for the SIP signaling port identified of the same row after the transform has been applied. It is the IP address or variable to be used in the lab environment in which the tests will be performed. The current IP prefix or variable (column 2112, row 2116) indicates that the entries in column 2112 correspond to currently configured production IP prefix or variable for the configured SIP signaling port identified in the same row. The post-transform IP prefix or variable (column 2114, row 2116) indicates that the entries in column 2114 correspond to the IP prefix or variable for the SIP signaling port identified of the same row after the transform has been applied. It is the IP prefix or variable to be used in the lab environment in which the tests will be performed.

Row 2018 includes information for the transform ID 1C entry (col. 2102, row 2118 entry) that indicates: (i) transform ID 1C is for SIP signaling port 1 (col. 2104, row 2118 entry); (ii) the col. 2106 row 2118 entry includes the current full configuration path for the SIP signaling port 1; (iii) the col. 2108, row 2118 entry includes the currently configured IP address or variable for SIP signaling port 1; (iv) the col. 2110, row 2118 entry includes the post-transform IP address or variable to be applied for the SIP signaling port 1 replacing the IP address or variable in the entry column 2108, row 2118; (v) the col. 2112, row 2118 entry includes the currently configured IP prefix or variable for SIP signaling port 1; (vi) the col. 2114, row 2118 entry includes the post-transform IP prefix or variable to be applied for the SIP signaling port 1 replacing the IP prefix or variable in the entry column 2110, row 2118, Row 2120 includes transform information for transform ID 2C which is for SIP signaling port 2. The " . . . " in row 2122 entries indicates that there are other transform entries for other SIP signaling ports not shown. Row 2124 includes transform information for transform ID NC corresponding to SIP signaling port N (N being an integer greater than 2).

Listing of Exemplary Numbered Method Embodiments

Method Embodiment 1. A method of testing a first Session Initiation Protocol (SIP) call processing entity (e.g., SBC) in a lab environment: generating, by an automated test system, configuration information (e.g., a configuration file or record) for use in configuring the first SIP call processing entity for a first test case, said first test case being based on a first reference call flow record; storing, by the automated test system, said generated configuration information; executing, by the automated test system, the first test case, said executing the first test case including sending one or more SIP messages to the first SIP call processing entity, said first SIP call processing entity being configured using said generated configuration information; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

Method Embodiment 1A. A method of testing a first Session Initiation Protocol (SIP) call processing entity (e.g., SBC) in a lab environment: automatically configuring, by an automated test system, the first SIP call processing entity for a first test case, said first test case being based on a first reference call flow record; executing, by the automated test system, the first test case, said executing the first test case including sending one or more SIP messages to the first SIP call processing entity; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

Method Embodiment 1A1. The method of Method Embodiment 1, further comprising: generating, by the automated test system (e.g., learning-based testing system 114), the first test case based on the first reference call flow record.

Method Embodiment 1B. The method of Method Embodiment 1, further comprising: generating, by the automated test system (e.g., learning-based testing system 114), the first test case based on information contained in a first trace record corresponding to a first SIP call processed by a second SIP call processing entity operating in a production network, said first test case being a test script including instructions for exchanging messages with the first SIP call processing entity based on messages captured in the first trace record as being exchanged with the second SIP call processing entity during the first SIP call.

Method Embodiment 1BB. The method of Method Embodiment 1B, wherein the first SIP call processing entity is a back-to-back user agent; and wherein the second SIP call processing entity is a back-to-back user agent.

Method Embodiment 1BBB. The method of Method Embodiment 1B, wherein the second SIP call processing entity is situated on the control signaling path between a first SIP endpoint device and a second SIP endpoint device; and wherein the method of Method Embodiment 1B further comprises: establishing, by the second SIP call processing entity, the first SIP call, said first SIP call being a Voice Over Internet Protocol (VOIP) call between the first SIP endpoint device and the second SIP endpoint.

Method Embodiment 1BBBB. The method of Method Embodiment 1B, wherein the second SIP call processing entity is situated on the control signaling path between a first SIP endpoint device and a second SIP endpoint device; and wherein the automated test system simulates being a first SIP endpoint device and a second SIP endpoint device; wherein the method of Method Embodiment 1B further comprises: establishing, by the second SIP call processing entity, the first SIP call, said first SIP call being a Voice Over Internet Protocol (VOIP) call between the first SIP endpoint device and the second SIP endpoint, said establishing, by the second SIP call processing entity, the first SIP call including: (i) receiving SIP messages from the first SIP endpoint device and sending SIP messages to the first SIP endpoint device, and (ii) receiving SIP messages from the second SIP endpoint device and sending SIP messages to the second SIP endpoint device; establishing, by the first SIP call processing entity, the first SIP test call, said first SIP test call being a Voice Over Internet Protocol (VOIP) call between the first simulated SIP endpoint device of the automated test system and the second simulated SIP endpoint device of the automated test system, said establishing, by the first SIP call processing entity, the first SIP test call including: (i) receiving SIP messages from the first simulated SIP endpoint device and sending SIP messages to the first simulated SIP endpoint device, and (ii) receiving SIP messages from the second simulated SIP endpoint device and sending SIP messages to the second simulated SIP endpoint device.

Method Embodiment 1BBBBB. The method of Method Embodiment 1B, wherein the second SIP call processing entity is situated on the control signaling path between a first SIP endpoint device and a second SIP endpoint device; and wherein the automated test system controls a first SIP test endpoint device and a second SIP test endpoint device; wherein the method of Method Embodiment 1B further comprises: establishing, by the second SIP call processing entity, the first SIP call, said first SIP call being a Voice Over Internet Protocol (VOIP) call between the first SIP endpoint device and the second SIP endpoint, said establishing, by the second SIP call processing entity, the first SIP call including: (i) receiving SIP messages from the first SIP endpoint device and sending SIP messages to the first SIP endpoint device, and (ii) receiving SIP messages from the second SIP endpoint device and sending SIP messages to the second SIP endpoint device; establishing, by the first SIP call processing entity, the first SIP test call, said first SIP test call being a Voice Over Internet Protocol (VOIP) call between the first SIP test endpoint device controlled by the automated test system and the second SIP test endpoint device controlled by the automated test system, said establishing, by the first SIP call processing entity, the first SIP test call including: (i) receiving SIP messages from the first SIP test endpoint device and sending SIP messages to the first SIP test endpoint device, and (ii) receiving SIP messages from the second SIP test endpoint device and sending SIP messages to the second SIP test endpoint device.

Method Embodiment 1BA. The method of Method Embodiment 1B, wherein the first trace record is generated by the second SIP call processing entity (e.g., while performing call processing operations for the first SIP call).

Method Embodiment 1BA1. The method of Method Embodiment 1B, wherein the first trace record is generated by a device or entity external to the second SIP call processing entity which captures and stores signaling for the first SIP call (e.g., in a Packet Capture (PCAP) file).

Method Embodiment 1BA2. The method of Method Embodiment 1B, wherein the first trace record includes signaling information for the first SIP call captured by one or more of the following: (i) the second SIP call processing entity, and (ii) a device or entity external to the second SIP call processing entity which captures and stores signaling communications sent to and received from the second SIP call processing entity.

Method Embodiment 1B1. The method of Method Embodiment 1B, wherein said test script is a wrapper script including one or more SIPp scripts which when executed by the automated test system simulate one or more remote SIP endpoints which exchange messages with the first SIP call processing entity; and wherein the test script uses addressing information for the one or more remote device being simulated (e.g., for the IP address information for the remote devices), the one or more remote devices being configured (e.g., for the IP address information for the remote device), and the first SIP call processing entity (e.g., for IP address information for the first SIP call processing entity) as translated (or transformed) by the automated test system during a twinning operation in which the configuration of the second SIP call processing entity is duplicated with addressing translated and/or transformed for application in a lab environment.

Method Embodiment 1B1A. The method of Method Embodiment 1B1, wherein the test script includes instructions for configuring one or more remote devices (e.g., DNS server, PSX server, ENUM server, security server).

Method Embodiment 1B2. The method of Method Embodiment 1, wherein the first reference call flow record is one of a plurality of call flow records generated from a plurality of non-test SIP calls processed by a second SIP call processing entity operating in a production network, said second SIP call processing entity being a commercially released SIP call processing entity, said production network being a non-test customer network; wherein said plurality of call flow records each include a unique set of features extracted from a call detail record and/or a trace record for the SIP call to which the call flow record corresponds; and wherein the first test case is one of a plurality of test cases generated from the plurality of call flow records.

Method Embodiment 1B3. The method of Method Embodiment 1B2 further comprising: executing, by the automated test system, a non-empty set of test cases from the plurality of generated test cases; prior to executing each of the test cases in the set of test cases using configuration information generated by the automated test system to configure the first SIP call processing entity for the test case to be executed; generating, by the automated test system, a test case call flow record for a SIP test call corresponding to the executed test case; and determining, by the automated test system, whether or not the first SIP call processing entity failed the test case based on a comparison of the test case call flow record generated for the executed test case and a reference call flow record from which the test case was generated.

Method Embodiment 1B3A. The method of Method Embodiment 1B2 further comprising: executing, by the automated test system, a non-empty set of test cases from the plurality of generated test cases; prior to executing each of the test cases in the set of test cases automatically configuring, by the automated test system, the first SIP call processing entity for the test case to be executed; generating, by the automated test system, a test case call flow record for a SIP test call corresponding to the executed test case; and determining, by the automated test system, whether or not the first SIP call processing entity failed the test case based on a comparison of the test case call flow record generated for the executed test case and a reference call flow record from which the test case was generated.

Method Embodiment 1B4. The method of Method Embodiment 1, wherein the first reference call flow record is one of a plurality of call flow records learned by the automated test system based on continuous, in-production sampling of real network traffic.

Method Embodiment 1B5. The method of Method Embodiment 1B4, wherein the plurality of learned call flow records is a stochastic traffic model of a production network in terms of call flows processed or handled by a SIP call processing entity (e.g., SBC) of the production network.

Method Embodiment 1B6. The method of Method Embodiment 1B5, further comprising: pruning learned call flows which are duplicative and/or are not unique; generating a plurality of test cases, each of the plurality of test case corresponding to and being based on one of the non-duplicative and/or unique learned call flows from the plurality of learned call flows; and wherein the first test case is one of the plurality of test cases generated from the plurality of learned call flow records which are non-duplicative and/or unique.

Method Embodiment 1B7. The method of Method Embodiment 1B5, further comprising: performing, by the automated test system, a clustering operation to determine one or more sets of learned call flows having: (i) a first set of features corresponding to input messages received by the first SIP call processing entity, and (ii) a second set of features corresponding to output messages sent by the first SIP call processing entity, said second set of features corresponding to output messages sent by the first SIP call processing entity having the same values while one or more of the features of the first set of features corresponding to the input messages received by the first SIP call processing entity have different values; and pruning, by the automated test system, all but a single call flow from the one or more sets of learned call flows having: (i) a first set of features corresponding to input messages received by the first SIP call processing entity, and (ii) a second set of features corresponding to output messages sent by the first SIP call processing entity, said second set of features corresponding to output messages sent by the first SIP call processing entity having the same values while one or more of the features of the first set of features corresponding to the input messages received by the first SIP call processing entity have different values.

Method Embodiment 1C. The method of Method Embodiment 1, wherein determining, by the automated test system, whether or not the first SIP call processing entity failed the first test case is further based on a comparison of content included in a first test case call detail record and a first call detail record; wherein said first test case call detail record includes information for the first SIP test call; and wherein the first call detail record includes information for a first SIP call processed by a second SIP call processing entity operating in a production network.

Method Embodiment 1D. The method of Method Embodiment 1C, wherein the comparison of content included in the first test case call detail record and the first call detail record includes a comparison of one or more of the following call detail record fields of the first test case detail record and the first call detail record: (i) Call Disconnect Reason, (ii) Call Direction, (iii) Calling Number, (iv) Called Number, (v) Number of Called Num Translations Done by This Node, (vi) Billing Number, (vii) Route Label, (viii) Route Selected, (ix) Ingress Trunk Group Name, (x) Originating Line Information, (xi) Jurisdiction Information Parameter, (xii) Carrier Code, (xiii) Calling party Nature of Address, (xiv) Called party Nature of Address, (xv) Ingress Signaling Type, (xvi) Egress Signaling Type, (xvii) Disconnect Initiator, (xviii) Calling Party Number Presentation Restriction, (xix) Dialed Number NOA, (xx) Ingress Codec Type, (xxi) Egress Codec Type, (xxii) Ingress RTP Packetization Time, (xxiii) Policy Response Call Type, (xxiv) Calling Name, (xxv) Call Disconnect Reason Transmitted to Ingress, (xxvi) Call Disconnect Reason Transmitted to Egress, (xxvii) Script Name, (xxviii) Generic Number Number, (xxix) Generic Number Presentation Restriction Indicator; (xxx) Generic Number Numbering Plan, (xxxi) Generic Number Type, (xxxii) Ingress SRTP (STOP only), (xxxiii) Egress SRTP (STOP only); (xxxiv) Call Recorded Indicator, (xxxv) Transcode Indicator, (xxxvi) Emergency Indicator, (xxxvii) Ingress Zone Name, (xxxviii) Egress Zone Name, (xxxiv) Ingress Zone Id, (xxxv) Egress Zone Id, (xxxvi) Video Cac, (xxxvii) Ingress IP Prefix FoundTG Name, and (xxxviii) Ingress Trunk Group for PSX routing.

Method Embodiment 1E. The method of Method Embodiment 1D, wherein the automated test system determines that the first test case failed when the comparison of said one or more fields of the call detail record fields of the first test case call detail record and the first call detail record indicates that there is mismatch.

Method Embodiment 1E1. The method of Method Embodiment 1, wherein determining, by the automated test system, whether or not the first SIP call processing entity failed the first test case based on a comparison of the first test case call flow record and the first reference call flow record includes: comparing features from the first test case call flow record to corresponding features of the first reference call flow record; assigning a penalty value to each compared feature which does not match; determining a test score for the first test case based on combined sum of the penalty values for each of the features which did not match; determining whether the test score is above a first threshold value; when the test score is determined to be above a first threshold value, determining that the first test case failed; and when the test score is not above the first threshold value, determining that the first test case passed.

Method Embodiment 1E2. The method of Method Embodiment 1E1, wherein the penalty value assigned is a function of the severity of the mismatch.

Method Embodiment 1E3. The method of Method Embodiment 1E2, further comprising: prior to assigning a penalty value to each compared feature which does not match, learning, by the automated test system, what penalty value to assign to a feature mismatch based on prior penalty value assignments received from an operator of the automated test system for the same feature mismatch with respect to the evaluation of different test cases than the first test case.

Method Embodiment 1E4. The method of Method Embodiment 1, wherein said determining, by the automated test system, whether or not the first SIP call processing entity failed the first test case based on a comparison of the first test case call flow record and the first reference call flow record includes: comparing features from the first test case call flow record to corresponding features of the first reference call flow record; identifying the features from the first test case call flow record which did not match the corresponding features of the first reference call flow record; and for each of the features from the first test case call flow record identified as not matching the corresponding feature of the first reference call flow record, determining whether the feature is a non-deterministic feature with respect to the configuration of the first SIP call processing entity and the input messages to the first SIP call processing entity received while processing the first SIP call; and when one or more non-matching features is determined to be a non-deterministic feature, re-executing the first test case and comparing the determined one or more non-deterministic features resulting from re-executed first test case to corresponding features in the reference first call flow record to determine whether there is a match.

Method Embodiment 1F. The method of Method Embodiment 1E, further comprising: generating, by the automated test system, a listing of the call detail record fields whose comparison resulted in a mismatch when one or more mismatches is detected; and storing, by the automated test system, the listing of the call detail record fields whose comparison resulted in a mismatch in an audit result file or record.

Method Embodiment 1G. The method of Method Embodiment 1, wherein determining, by the automated test system, whether or not the first SIP call processing entity failed the first test case is further based on a determination of whether or not the first test case did not complete successfully, the first test case will be determined to not have completed successfully when one or more of the following occur: (i) the execution of the test case does not complete (e.g., the test case is aborted during execution because of a failure experienced by a client device or the first SIP call processing device), (ii) an anomalous condition is detected after the completion of the execution of the test case (e.g., a coredump of the first SIP call processing device is detected or ASAN logs indicate issues occurred during the execution of the test case).

Method Embodiment 2. The method of Method Embodiment 1, wherein the first SIP call processing entity is a first Session Border Controller.

Method Embodiment 3. The method of Method Embodiment 2, wherein the first Session Border Controller is a virtual device implemented as an application executing on a compute node in a cloud.

Method Embodiment 3A. The method of Method Embodiment 2, wherein the first Session Border Controller is a hardware device.

Method Embodiment 4. The method of Method Embodiment 1, wherein the automated test system is implemented as a plurality of applications executing on one or more nodes or servers.

Method Embodiment 4A. The method of Method Embodiment 4, wherein the automated test system is implemented on a Kubernetes system including a plurality of Pods and a data lake or repository, said plurality of Pods being implemented on Kubemetes nodes of the Kubernetes system.

Method Embodiment 4B. The method of Method Embodiment 4A, wherein the plurality of Pods includes one or more of the following: a first Pod including a Trace record and Call Detail Record ingestion application, a second Pod including a traffic learning application, a third Pod including a backup assistant application, a fourth Pod including an anonymizer application, a fifth Pod including a production twinning application, a sixth Pod including a test generator application, a seventh Pod including a test runner application, an eighth Pod including a test auditor application.

Method Embodiment 4C. The method of Method Embodiment 4B, wherein one or more of the applications is implemented as a container.

Method Embodiment 4D. The method of Method Embodiment 4, wherein the plurality of applications includes one or more of the following: a first Pod including a Trace record and Call Detail Record ingestion application, a second Pod including a traffic learning application, a third Pod including a backup assistant application, a fourth Pod including an anonymizer application, a fifth Pod including a production twinning application, a sixth Pod including a test generator application, a seventh Pod including a test runner application, an eighth Pod including a test auditor application.

Method Embodiment 5. The method of Method Embodiment 1, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that extracted features included in the first test case call flow record do not match extracted features included in the first reference call flow record.

Method Embodiment 5A. The method of Method Embodiment 5, wherein extracted features included in a call flow record include call flow features which are deterministic based on the configuration of the SIP call processing entity and the messages received by that SIP call processing entity while processing the SIP call corresponding to the call flow record.

Method Embodiment 5B. The method of Method Embodiment 5, wherein the extracted features included in the first reference call flow record are features of a first SIP call processed by a second SIP call processing entity operating in a production network.

Method Embodiment 5C. The method of Method Embodiment 5B, wherein said extracted features included in the first reference call flow record include call flow features which are deterministic based on the configuration of the second SIP call processing entity and the input messages to the second SIP call processing entity received while processing the first SIP call; and wherein said extracted features included in the first test call flow record include call flow features which are deterministic based on the configuration of the first SIP call processing entity and the input messages to the first SIP call processing entity received while processing the first SIP test call.

Method Embodiment 5C1. The method of Method Embodiment 5C, wherein said extracted features included in the first reference call flow record further includes a first call flow feature which is non-deterministic with respect to the configuration of the second SIP call processing entity and the input messages to the second SIP call processing entity received while processing the first SIP call; and wherein said extracted features included in the first test call flow record further includes a first call flow feature corresponding to the first call flow feature of the first reference call flow record, said first call flow feature of the first test call flow record being non-deterministic with respect to the configuration of the first SIP call processing entity and the input messages to the first SIP call processing entity received while processing the first SIP test call.

Method Embodiment 5C2. The method of Method Embodiment 5C1, wherein the first call flow feature of the first reference call flow record is a routing feature which is probabilistic based on a fixed set of routing possibilities; the method further comprising: in response to determining, by the automated test system, that the first call flow feature of the first reference call flow record does not match the first call flow feature of the first test call flow, performing the following operations: repeat the execution of the first test case up to N times, N being an integer greater than zero, determine for each repeated execution of the first test case whether the first call flow feature from the repeated first test case matches the first call flow feature of the reference call; when it is determined that the first call flow feature of the repeated first test case matches the first call flow feature of the reference call, determining that the execution of the first test case resulted in a first call flow feature matching the first call flow feature of the first reference call flow; and when it is determined that the first call flow of the repeated first test case does not match the first call flow of the first reference call flow determining that the execution of the first test case did not result in the first call flow feature of the first reference call flow being matched.

Method Embodiment 5D. The method of Method Embodiment 1, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates one or more of the following: (i) that the number of SIP messages included in the first test case call flow record and the number of SIP messages included in the first reference call record are different, (ii) that a list of SIP header fields included in each of the SIP messages included in the first test case call flow record and a list of SIP header fields included in each of the SIP messages included in the first reference call flow record are different, and (iii) that a list of parameters included in each of the SIP header fields included in each of the SIP messages included in the first test case call flow record and a list of parameters included in each of the SIP header fields included in each of the SIP messages included in the first reference call flow record are different.

Method Embodiment 6. The method of Method Embodiment 1, further comprising: generating, by the automated test system, the first reference call flow record by extracting features from a first call detail record and a first trace record, said first call detail record and said first trace record both corresponding to a first SIP call processed by a second SIP call processing entity operating in a production network; storing, by the automated test system, the extracted features in the first reference call flow record, and wherein the features extracted from the first call detail record and the first trace record include for each call leg of the first SIP call: (i) a call leg identifier, (ii) a listing of SIP messages received by the second SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

Method Embodiment 6A. The method of Method Embodiment 6, wherein said production network is a non-test communications network being utilized by a customer (e.g., an Enterprise or network operator) in their normal course of business (i.e., production network is a customer's actual network being utilized for actual call traffic as opposed to a lab network utilized for testing with test call traffic); wherein said production SIP call processing entity is a non-test SIP call production entity (e.g., the production SIP call processing entity is a commercially released SIP call processing entity as opposed to a pre-production SIP call processing entity utilized for testing prior to commercial release).

Method Embodiment 6B. The method of Method Embodiment 6, wherein said listing of SIP messages received by the second SIP call processing device for the call leg corresponding to the call leg identifier and an order or sequence in which the SIP messages for the call leg corresponding to the call leg identifier were received include SIP Request codes for SIP Request messages and SIP Response codes for SIP Response messages.

Method Embodiment 7. The method of Method Embodiment 6, wherein said generating, by the automated test system, a first test case call flow record for the first SIP test call corresponding to the first test case includes: generating, by the automated test system, the first test case call flow record by extracting features from a first test case call detail record and a first test case trace record, said first test case call detail record and said first test case trace record both corresponding to the first SIP test call processed by the first SIP call processing entity during the execution of the first test case, said first SIP call processing entity operating in a lab environment; storing, by the automated test system, the features extracted from the first test case call detail record and the first test case trace record in the first test case call flow record, and wherein the features extracted from the first test case call detail record and the first test case trace record include for each call leg of the first test case SIP call: (i) a call leg identifier, (ii) a listing of SIP messages received by the first SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

Method Embodiment 7A. The method of Method Embodiment 7, wherein said first SIP call has multiple call legs; and wherein said first SIP test call has multiple call legs.

Method Embodiment 7B. The method of Method Embodiment 7, wherein the first test case trace record is generated by the first SIP call processing entity (e.g., while performing call processing operations for the first SIP test call).

Method Embodiment 7B1. The method of Method Embodiment 7, wherein the first test case trace record is generated by a device or entity external to the first SIP call processing entity which captures and stores signaling for the first SIP test call (e.g., in a Packet Capture (PCAP) file).

Method Embodiment 7B2. The method of Method Embodiment 7, wherein the first test case trace record includes signaling information for the first SIP test call captured by one or more of the following: (i) the first SIP call processing entity, and (ii) a device or entity external to the first SIP call processing entity which captures and stores signaling communications sent to and received from the first SIP call processing entity.

Method Embodiment 8. The method of Method Embodiment 7, wherein the features extracted from the first call detail record and the first trace record further include for each SIP message including a SDP message of each call leg of the first SIP call: (i) a listing of SDP session description fields included in the SDP message, (ii) a listing of SDP time description fields included in the SDP message, and (iii) a listing of SDP media description fields present in the SDP message; and wherein the features extracted from the first test case call detail record and the first test case trace record further include for each SIP message including a SDP message of each call leg of the first SIP test call: (i) a listing of SDP session description fields included in the SDP message, (ii) a listing of SDP time description fields included in the SDP message, and (iii) a listing of SDP media description fields present in the SDP message.

Method Embodiment 9. The method of Method Embodiment 8, wherein the features extracted from the first call detail record and the first trace record further include for each SIP message including a SDP message of each call leg of the first SIP call: (i) a listing of parameters corresponding to each of the session description fields in the SDP message, (ii) a listing of the SDP attributes included in the SDP message, and (iii) a listing of codecs included in the SDP message and the order in which the codecs are listed; and wherein the features extracted from the first test case call detail record and the first test case trace record further include for each SIP message including a SDP message of each call leg of the first SIP test call: (i) a listing of parameters corresponding to each of the session description fields in the SDP message, (ii) a listing of the SDP attributes included in the SDP message, and (iii) a listing of codecs included in the SDP message and the order in which the codecs are listed.

Method Embodiment 9A. The method of Method Embodiment 9, wherein the extracted features from the first call detail record and the first trace record do not include: IP address values included in a SIP message, contact addresses (e.g., SIP URL values) included in a SIP message, values of the branch and tag parameters included in a via header of a SIP message, ordering of header fields in a SIP message, and ordering of SDP fields in a SDP message included in a SIP message.

Method Embodiment 9B. The method of Method Embodiment 9A, wherein the extracted features from the first test case call detail record and the first test case trace record do not include: IP address values included in a SIP message, contact addresses (e.g., SIP URL values) included in a SIP message, values of the branch and tag parameters included in a via header of a SIP message, ordering of header fields in a SIP message, and ordering of SDP fields in a SDP message included in a SIP message.

Method Embodiment 9C. The method of Method Embodiment 9B, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that the extracted features included in the first test case call flow record do not match the extracted features included in the first reference call flow record.

Method Embodiment 10. The method of Method Embodiment 6, wherein the first SIP call processing entity is a first Session Border Controller; wherein the second SIP call processing entity is a second Session Border Controller; and wherein the first Session Border Controller includes a different version or release of software than the second Session Border Controller.

Method Embodiment 10A. The method of Method Embodiment 10, wherein said first Session Border Controller includes a modified version of the software included in the second Session Border Controller (e.g., first SBC includes version 2.0 of software which includes updates or changes to the version 1.0 software used in the second SBC.

Method Embodiment 11. The method of Method Embodiment 1, wherein the first test case includes a first SIPp test script.

Method Embodiment 12. The method of Method Embodiment 6, further comprising: prior to configuring the first SIP call processing entity for the first test case, performing, by the automated test system, a twinning configuration procedure, said twinning configuration procedure including: downloading from the second SIP call processing entity, by the automated test system, first configuration information for the second SIP call processing entity, said first configuration information corresponding to configuration information for the second SIP call processing entity when the second SIP call processing entity processed the first SIP call; and generating transforms to modify the downloaded first configuration information to generate a first test configuration for the first SIP call processing entity, said transforms including one or more SIP signaling port transforms (e.g., transforms for configured SIP signaling port(s) in the first configuration information), one or more remote device contact transforms (e.g., transforms for configured contact information for PSX server(s), Diameter Rx server(s), DNS server(s), ENUM server(s) in the first configuration information), and one or more IP interface transforms (e.g., transforms for configured IP interface(s) in the first configuration information).

Method Embodiment 13. The method of Method Embodiment 12, wherein said automatically configuring, by the automated test system, the first SIP call processing entity for the first test case, includes: loading second configuration information onto the first SIP call processing entity, by the automated test system, said second configuration information including at least some of said first configuration information; and applying said generated transforms to modify first configuration information included in the second configuration to generate a first test configuration for the first SIP call processing entity.

Method Embodiment 13A. The method of Method Embodiment 13, wherein said applying said generated transforms to modify first configuration information included in the second configuration to generate a first test configuration for the first SIP call processing entity includes: applying at least one SIP signaling port transforms which modifies an IP address (e.g., a private IPv4 address) for a first SIP signaling port on the second SIP call processing device to a different IP address (e.g., a different private IPv4 address) to be used by a first SIP signaling port on the first SIP call processing device; applying at least one remote device contact transform which modifies an Internet Protocol address for a first remote device in the first configuration information to a different IP address for a first test remote device (e.g., modifying a production DNS server IP address to a lab DNS server IP address); and applying at least IP interface transform which modifies an IP address (e.g., an IPv6 address) for a first IP interface on the second SIP call processing device to a different IP address (e.g., a different IPv6 address) to be used by a first IP interface on the first SIP call processing device.

Method Embodiment 14. The method of Method Embodiment 1, wherein said executing, by the automated test system, the first test case further includes: emulating, by the first automated test system, one or more devices or entities which communicate with the first SIP call processing entity during the execution of the first test case.

Method Embodiment 15. The method of Method Embodiment 14, wherein emulating the one or more devices or entities includes one or more of the following: (i) exchanging, by the automated test system, one or more SIP messages (e.g., SIP requests and SIP responses) with the first SIP call processing entity as indicated in a test script for the first test case, (ii) receiving by the automated test system one or more requests from the first SIP call processing entity sent to the one or more emulated devices or entities, and (iii) responding as indicated in the test script for the first test case to the received requests from the first SIP call processing entity.

Method Embodiment 16. The method of Method Embodiment 15, wherein said emulating, by the first automated test system, one or more devices or entities which communicate with the first SIP call processing entity during the execution of the first test case further includes emulating one or more of the following: a SIP communications device, a SIP client device, a SIP endpoint device, a SIP server, a peer SIP call processing entity, a Session Border Controller (SBC), a Private Branch Exchange (PBX), a Policy and Routing (PSX) server, a Domain Namer Server (DNS), an Electronic Number Mapping System (ENUM) server, a Media Server, a Diameter Rx server, Radius server, and security server.

Method Embodiment 17. The method of Method Embodiment 14, wherein said one or more devices or entities includes: (i) emulating a first SIP communications device, and (ii) emulating a second SIP communications device, the first SIP communications device being emulated and said second SIP communications device being emulated utilizing Session Initiation Protocol messages to communicate with the first SIP call processing device; wherein said emulating, by the first automated test system, a first SIP communications device includes exchanging SIP messages with the first SIP call processing entity to establish a first SIP call; and wherein said emulating, by the first automated test system, a second SIP communications device includes exchanging SIP messages with the first SIP call processing entity to establish the first SIP call; wherein said sending one or more SIP messages to the first SIP call processing entity includes sending a first SIP INVITE message to the first SIP call processing entity from a first IP address corresponding to the emulated first SIP device.

Method Embodiment 18. The method of Method Embodiment 17, wherein the SIP messages exchanged between the automated test system and the first SIP call processing entity are included in a test script for the first test case which is executed by the automated test system during the execution of the first test case; wherein the SIP messages exchanged between the automated test system and the first SIP call processing entity are included in the test script for the first test case which is executed by the automated test system during the execution of the first test case.

Method Embodiment 19. The method of Method Embodiment 17, wherein the first SIP communications device and the second SIP communications devices being emulated by the automated test system are smartphones each executing a VOIP application utilizing SIP messaging.

Method Embodiment 20. The method of Method Embodiment 17, wherein the first SIP communications device is one of the following: a SIP endpoint device (e.g., smartphone), a SBC, an Interconnect Border Control Function entity or device, a SIP Call Routing Engine, and a SIP application server; and wherein the second SIP communications device is one of the following: a SIP endpoint device (e.g., smartphone), a SBC, an Interconnect Border Control Function entity or device, a SIP Call Routing Engine, and a SIP application server.

Method Embodiment 21. The method of Method Embodiment 1, wherein said executing, by the automated test system, the first test case further includes: controlling, by the first automated test system, one or more devices or entities which communicate with the first SIP call processing entity during the execution of the first test case; and wherein controlling the one or more devices or entities includes one or more of the following: (i) configuring the one or more devices or entities based on configuration information included in the first test script (e.g., using collected meta data and/or transforms for the lab environment), (ii) controlling a device or entity to exchange one or more SIP messages with the first SIP call processing entity as indicated in a test script for the first test case, (iii) controlling a device or entity to receive one or more requests from the first SIP call processing entity sent to the device or entity, and (iv) controlling the device or entity to respond as indicated in the test script for the first test case to the received requests from the first SIP call processing entity.

Method Embodiment 22. The method of Method Embodiment 6, wherein said first SIP call processing entity is a SIP Call Routing Engine, and wherein said second SIP call processing entity is a SIP Call Routing Engine.

Method Embodiment 23. The method of Method Embodiment 6, wherein said first SIP call processing entity is a SIP Application Server; and wherein said second SIP call processing entity is a SIP Application Server.

Method Embodiment 24. The method of Method Embodiment 6, wherein said first SIP call processing entity is a Policy and Routing (PSX) Server; and wherein said second SIP call processing entity is a SIP Policy and Routing Server.

Method Embodiment 25. A method of testing a first Session Initiation Protocol (SIP) call processing entity (e.g., SBC) in a lab environment: generating, by a test generator of an automated test system, a first test case based on first reference call flow record for the first call or a trace record for the first call; executing, by the automated test system, the first test case, said executing the first test case including sending one or more SIP messages to the first SIP call processing entity; generating, by the automated test system, a first test case call flow record for a first SIP test call corresponding to the first test case; and determining, by the automated test system, whether or not the first SIP call processing entity failed the first test case based on a comparison of the first test case call flow record and the first reference call flow record for the first call.

Method Embodiment 26. A method of testing a first Session Initiation Protocol (SIP) call processing entity (e.g., lab SBC) in a lab environment: performing, by an automated test system, a twinning configuration procedure on a second SIP call processing entity (e.g. production SBC), said second SIP call processing entity operating in a production network; generating, by the automated test system, configuration information for use in configuring the first SIP call processing entity in the lab environment for a plurality of test cases based on configuration information obtained during said twinning configuration procedure, said plurality of test cases including a first test case based on a first reference call flow record for a first SIP call processed by the second SIP call processing entity or based on a first trace record for the first SIP call; storing, by the automated test system, said generated configuration information; and executing, by the automated test system, the first test case, said executing the first test case including sending one or more SIP messages to the first SIP call processing entity while said first SIP call processing entity is operating in said lab environment, said first SIP call processing entity being configured using said generated configuration information.

Method Embodiment 27. The method of Method Embodiment 26, wherein said twinning procedure includes: downloading from the second SIP call processing entity, by the automated test system, first configuration information for the second SIP call processing entity, said first configuration information corresponding to configuration information for the second SIP call processing entity when the second SIP call processing entity processed a first plurality of SIP calls, said first plurality of SIP calls including the first SIP call; and generating transforms to modify the downloaded first configuration information to generate a first test configuration for the first SIP call processing entity, said transforms including one or more SIP signaling port transforms (e.g., transforms for configured SIP signaling port(s) in the first configuration information), one or more remote device contact transforms (e.g., transforms for configured contact information for PSX server(s), Diameter Rx server(s), DNS server(s), ENUM server(s) in the first configuration information), and one or more IP interface transforms (e.g., transforms for configured IP interface(s) in the first configuration information).

Method Embodiment 28. The method of Method Embodiment 27, further comprising: applying said generated transforms to modify first configuration information included in the downloaded configuration information from the second SIP call processing entity to generate the first test configuration for the first SIP call processing entity.

Method Embodiment 29. The method of Method Embodiment 28, further comprising: prior to executing said first test case, loading the first test configuration onto the first SIP call processing entity.

Method Embodiment 30. The method of Method Embodiment 28, wherein said applying said generated transforms to modify first configuration information included in the downloaded configuration information from the second SIP call processing entity to generate the first test configuration for the first SIP call processing entity includes: applying at least one SIP signaling port transforms which modifies an IP address (e.g., a private IPv4 address) for a first SIP signaling port on the second SIP call processing device to a different IP address (e.g., a different private IPv4 address) to be used by a first SIP signaling port on the first SIP call processing device; applying at least one remote device contact transform which modifies an Internet Protocol address for a first remote device in the first configuration information to a different IP address for a first test remote device (e.g., modifying a production DNS server IP address to a lab DNS server IP address); and applying at least IP interface transform which modifies an IP address (e.g., an IPv6 address) for a first IP interface on the second SIP call processing device to a different IP address (e.g., a different IPv6 address) to be used by a first IP interface on the first SIP call processing device.

Method Embodiment 31. The method of Method Embodiment 26, wherein said executing, by the automated test system, the first test case further includes: emulating, by the first automated test system, one or more devices or entities which communicate with the first SIP call processing entity during the execution of the first test case.

Method Embodiment 32. The method of Method Embodiment 31, wherein emulating the one or more devices or entities includes one or more of the following: (i) exchanging, by the automated test system, one or more SIP messages (e.g., SIP requests and SIP responses) with the first SIP call processing entity as indicated in a test script for the first test case, (ii) receiving by the automated test system one or more requests from the first SIP call processing entity sent to the one or more emulated devices or entities, and (iii) responding as indicated in the test script for the first test case to the received requests from the first SIP call processing entity.

Method Embodiment 33. The method of Method Embodiment 31, wherein said emulating, by the first automated test system, one or more devices or entities which communicate with the first SIP call processing entity during the execution of the first test case further includes emulating one or more of the following: a SIP communications device, a SIP client device, a SIP endpoint device, a SIP server, a peer SIP call processing entity, a Session Border Controller (SBC), a Private Branch Exchange (PBX), a Policy and Routing (PSX) server, a Domain Namer Server (DNS), an Electronic Number Mapping System (ENUM) server, a Media Server, a Diameter Rx server, Radius server, and security server.

Method Embodiment 34. The method of Method Embodiment 33, wherein the first SIP communications device is one of the following: a SIP endpoint device (e.g., smartphone), a SBC, an Interconnect Border Control Function entity or device, a SIP Call Routing Engine, and a SIP application server; and wherein the second SIP communications device is one of the following: a SIP endpoint device (e.g., smartphone), a SBC, an Interconnect Border Control Function entity or device, a SIP Call Routing Engine, and a SIP application server.

Method Embodiment 35. The method of Method Embodiment 26, wherein said executing, by the automated test system, the first test case further includes: controlling, by the first automated test system, one or more devices or entities which communicate with the first SIP call processing entity during the execution of the first test case; and wherein controlling the one or more devices or entities includes one or more of the following: (i) configuring the one or more devices or entities based on configuration information included in the first test script (e.g., using collected meta data and/or transforms for the lab environment), (ii) controlling a device or entity to exchange one or more SIP messages with the first SIP call processing entity as indicated in a test script for the first test case, (iii) controlling a device or entity to receive one or more requests from the first SIP call processing entity sent to the device or entity, and (iv) controlling the device or entity to respond as indicated in the test script for the first test case to the received requests from the first SIP call processing entity.

Method Embodiment 36. The method of Method Embodiment 26, further comprising: performing, by an automated test system, a second twinning configuration procedure on a third SIP call processing entity (e.g. production SBC), said third SIP call processing entity operating in a different production network than said second SIP call processing entity; generating, by the automated test system, second configuration information for use in configuring the first SIP call processing entity in the lab environment for a second plurality of test cases based on configuration information obtained during said second twinning configuration procedure, said second plurality of test cases including a second test case based on a second reference call flow record for a second SIP call processed by the third SIP call processing entity or based on a second trace record for the second SIP call; executing, by the automated test system, the second test case, said executing the second test case including sending one or more SIP messages to the first SIP call processing entity while said first SIP call processing entity is operating in said lab environment, said first SIP call processing entity being configured using said generated second configuration information.

Method Embodiment 37. The method of Method Embodiment 26, further comprising: performing, by an automated test system, a second twinning configuration procedure on the second SIP call processing entity (e.g. production SBC) after said configuration of the second SIP call processing entity has been modified; generating, by the automated test system, second configuration information for use in configuring the first SIP call processing entity in the lab environment for a second plurality of test cases based on configuration information obtained during said second twinning configuration procedure, said second plurality of test cases including a second test case based on a second reference call flow record for a second SIP call processed by the second SIP call processing entity or based on a second trace record for the second SIP call; executing, by the automated test system, the second test case, said executing the second test case including sending one or more SIP messages to the first SIP call processing entity while said first SIP call processing entity is operating in said lab environment, said first SIP call processing entity being configured using said generated second configuration information.

LISTING OF EXEMPLARY NUMBERED SYSTEM AND APPARATUS EMBODIMENTS

System Embodiment 1. An automated test system for testing a first Session Initiation Protocol (SIP) call processing entity (e.g., SBC) in a lab environment comprising: memory; and a first processor, said first processor controlling the automated test system to perform the following operations: generating, by the automated test system, configuration information (e.g., a configuration file or record) for use in configuring the first SIP call processing entity for a first test case, said first test case being based on a first reference call flow record; storing, by the automated test system, said generated configuration information; executing, by the automated test system, the first test case, said executing the first test case including sending one or more SIP messages to the first SIP call processing entity, said first SIP call processing entity being configured using said generated configuration information; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

System Embodiment 1A. An automated test system for testing a first Session Initiation Protocol (SIP) call processing entity (e.g., SBC) in a lab environment comprising: memory; and a first processor, said first processor controlling the automated test system to perform the following operations: automatically configuring, by an automated test system, the first SIP call processing entity for a first test case, said first test case being based on a first reference call flow record; executing, by the automated test system, the first test case, said executing the first test case including sending one or more SIP messages to the first SIP call processing entity; generating, by the automated test system, a first test case call flow record for a first SIP test call corresponding to the first test case; determining, by the automated test system, whether or not the first SIP call processing entity failed the first test case based on a comparison of the first test case call flow record and the first reference call flow record.

System Embodiment 1A1. The system of System Embodiment 1, wherein said first processor further controls the automated test system to perform the following additional operation: generating, by the automated test system (e.g., learning-based testing system 114), the first test case based on the first reference call flow record.

System Embodiment 1B. The system of System Embodiment 1, wherein said first processor further controls the automated test system to perform the following additional operation: generating, by the automated test system (e.g., learning-based testing system 114), the first test case based on information contained in a first trace record corresponding to a first SIP call processed by a second SIP call processing entity operating in a production network, said first test case being a test script including instructions for exchanging messages with the first SIP call processing entity based on messages captured in the first trace record as being exchanged with the second SIP call processing entity during the first SIP call.

System Embodiment 1BB. The system of System Embodiment 1B, wherein the first SIP call processing entity is a back-to-back user agent; and wherein the second SIP call processing entity is a back-to-back user agent.

System Embodiment 1BBB. The system of System Embodiment 1B, wherein the second SIP call processing entity is situated on the control signaling path between a first SIP endpoint device and a second SIP endpoint device; and wherein the first SIP call is established by the second SIP call processing entity, said first SIP call being a Voice Over Internet Protocol (VOIP) call between the first SIP endpoint device and the second SIP endpoint.

System Embodiment 1BBBB. The system of System Embodiment 1B, wherein the second SIP call processing entity is situated on the control signaling path between a first SIP endpoint device and a second SIP endpoint device; and wherein the automated test system simulates being a first SIP endpoint device and a second SIP endpoint device; wherein the first SIP call is established, by the second SIP call processing entity, said first SIP call being a Voice Over Internet Protocol (VOIP) call between the first SIP endpoint device and the second SIP endpoint; wherein the second SIP call processing entity establishes said first SIP call by performing the following operations: (i) receiving SIP messages from the first SIP endpoint device and sending SIP messages to the first SIP endpoint device, and (ii) receiving SIP messages from the second SIP endpoint device and sending SIP messages to the second SIP endpoint device; wherein the first SIP test call is established, by the first SIP call processing entity, said first SIP test call being a Voice Over Internet Protocol (VOIP) call between the first simulated SIP endpoint device of the automated test system and the second simulated SIP endpoint device of the automated test system; and wherein the first SIP call processing entity establishes the first SIP test call by performing the following operations: (i) receiving SIP messages from the first simulated SIP endpoint device and sending SIP messages to the first simulated SIP endpoint device, and (ii) receiving SIP messages from the second simulated SIP endpoint device and sending SIP messages to the second simulated SIP endpoint device.

System Embodiment 1BBBBB. The system of System Embodiment 1B, wherein the second SIP call processing entity is situated on the control signaling path between a first SIP endpoint device and a second SIP endpoint device; and wherein the automated test system controls a first SIP test endpoint device and a second SIP test endpoint device; wherein the second SIP call processing entity establishes the first SIP call, said first SIP call being a Voice Over Internet Protocol (VOIP) call between the first SIP endpoint device and the second SIP endpoint, said establishing, by the second SIP call processing entity, the first SIP call including: (i) receiving SIP messages from the first SIP endpoint device and sending SIP messages to the first SIP endpoint device, and (ii) receiving SIP messages from the second SIP endpoint device and sending SIP messages to the second SIP endpoint device; wherein the first SIP call processing entity establishes the first SIP test call, said first SIP test call being a Voice Over Internet Protocol (VOIP) call between the first SIP test endpoint device controlled by the automated test system and the second SIP test endpoint device controlled by the automated test system, the first SIP call processing entity performs the following operations during establishment of the first SIP test call: (i) receiving SIP messages from the first SIP test endpoint device and sending SIP messages to the first SIP test endpoint device, and (ii) receiving SIP messages from the second SIP test endpoint device and sending SIP messages to the second SIP test endpoint device.

System Embodiment 1BA. The system of System Embodiment 1B, wherein the first trace record is generated by the second SIP call processing entity (e.g., while performing call processing operations for the first SIP call).

System Embodiment 1BA1. The system of System Embodiment 1B, wherein the first trace record is generated by a device or entity external to the second SIP call processing entity which captures and stores signaling for the first SIP call (e.g., in a Packet Capture (PCAP) file).

System Embodiment 1BA2. The system of System Embodiment 1B, wherein the first trace record includes signaling information for the first SIP call captured by one or more of the following: (i) the second SIP call processing entity, and (ii) a device or entity external to the second SIP call processing entity which captures and stores signaling communications sent to and received from the second SIP call processing entity.

System Embodiment 1B1. The system of System Embodiment 1B, wherein said test script is a wrapper script including one or more SIPp scripts which when executed by the automated test system simulate one or more remote SIP endpoints which exchange messages with the first SIP call processing entity; and wherein the test script uses addressing information for the one or more remote device being simulated (e.g., for the IP address information for the remote devices), the one or more remote devices being configured (e.g., for the IP address information for the remote device), and the first SIP call processing entity (e.g., for IP address information for the first SIP call processing entity) as translated (or transformed) by the automated test system during a twinning operation in which the configuration of the second SIP call processing entity is duplicated with addressing translated and/or transformed for application in a lab environment.

System Embodiment 1B1A. The system of System Embodiment 1B1, wherein the test script includes instructions for configuring one or more remote devices (e.g., DNS server, PSX server, ENUM server, security server).

System Embodiment 1B2. The system of System Embodiment 1, wherein the first reference call flow record is one of a plurality of call flow records generated from a plurality of non-test SIP calls processed by a second SIP call processing entity operating in a production network, said second SIP call processing entity being a commercially released SIP call processing entity, said production network being a non-test customer network; wherein said plurality of call flow records each include a unique set of features extracted from a call detail record and/or a trace record for the SIP call to which the call flow record corresponds; and wherein the first test case is one of a plurality of test cases generated from the plurality of call flow records.

System Embodiment 1B3. The system of System Embodiment 1B2, wherein said first processor further controls the automated test system to perform the following additional operations: executing, by the automated test system, a non-empty set of test cases from the plurality of generated test cases; prior to executing each of the test cases in the set of test cases using configuration information generated by the automated test system to configure the first SIP call processing entity for the test case to be executed; generating, by the automated test system, a test case call flow record for a SIP test call corresponding to the executed test case; and determining, by the automated test system, whether or not the first SIP call processing entity failed the test case based on a comparison of the test case call flow record generated for the executed test case and a reference call flow record from which the test case was generated.

System Embodiment 1B3A. The system of System Embodiment 1B2, wherein said first processor further controls the automated test system to perform the following additional operations: executing, by the automated test system, a non-empty set of test cases from the plurality of generated test cases; prior to executing each of the test cases in the set of test cases automatically configuring, by the automated test system, the first SIP call processing entity for the test case to be executed; generating, by the automated test system, a test case call flow record for a SIP test call corresponding to the executed test case; and determining, by the automated test system, whether or not the first SIP call processing entity failed the test case based on a comparison of the test case call flow record generated for the executed test case and a reference call flow record from which the test case was generated.

System Embodiment 1B4. The system of System Embodiment 1, wherein the first reference call flow record is one of a plurality of call flow records learned by the automated test system based on continuous, in-production sampling of real network traffic.

System Embodiment 1B5. The system of System Embodiment 1B4, wherein the plurality of learned call flow records is a stochastic traffic model of a production network in terms of call flows processed or handled by a SIP call processing entity (e.g., SBC) of the production network.

System Embodiment 1B6. The system of System Embodiment 1B5, wherein said first processor further controls the automated test system to perform the following additional operations: pruning learned call flows which are duplicative and/or are not unique; generating a plurality of test cases, each of the plurality of test case corresponding to and being based on one of the non-duplicative and/or unique learned call flows from the plurality of learned call flows; and wherein the first test case is one of the plurality of test cases generated from the plurality of learned call flow records which are non-duplicative and/or unique.

System Embodiment 1B7. The system of System Embodiment 1B5, wherein said first processor further controls the automated test system to perform the following additional operations: performing, by the automated test system, a clustering operation to determine one or more sets of learned call flows having: (i) a first set of features corresponding to input messages received by the first SIP call processing entity, and (ii) a second set of features corresponding to output messages sent by the first SIP call processing entity, said second set of features corresponding to output messages sent by the first SIP call processing entity having the same values while one or more of the features of the first set of features corresponding to the input messages received by the first SIP call processing entity have different values; and pruning, by the automated test system, all but a single call flow from the one or more sets of learned call flows having: (i) a first set of features corresponding to input messages received by the first SIP call processing entity, and (ii) a second set of features corresponding to output messages sent by the first SIP call processing entity, said second set of features corresponding to output messages sent by the first SIP call processing entity having the same values while one or more of the features of the first set of features corresponding to the input messages received by the first SIP call processing entity have different values.

System Embodiment 1C. The system of System Embodiment 1, wherein determining, by the automated test system, whether or not the first SIP call processing entity failed the first test case is further based on a comparison of content included in a first test case call detail record and a first call detail record; wherein said first test case call detail record includes information for the first SIP test call; and wherein the first call detail record includes information for a first SIP call processed by a second SIP call processing entity operating in a production network.

System Embodiment 1D. The system of System Embodiment 1C, wherein the comparison of content included in the first test case call detail record and the first call detail record includes a comparison of one or more of the following call detail record fields of the first test case detail record and the first call detail record: (i) Call Disconnect Reason, (ii) Call Direction, (iii) Calling Number, (iv) Called Number, (v) Number of Called Num Translations Done by This Node, (vi) Billing Number, (vii) Route Label, (viii) Route Selected, (ix) Ingress Trunk Group Name, (x) Originating Line Information, (xi) Jurisdiction Information Parameter, (xii) Carrier Code, (xiii) Calling party Nature of Address, (xiv) Called party Nature of Address, (xv) Ingress Signaling Type, (xvi) Egress Signaling Type, (xvii) Disconnect Initiator, (xviii) Calling Party Number Presentation Restriction, (xix) Dialed Number NOA, (xx) Ingress Codec Type, (xxi) Egress Codec Type, (xxii) Ingress RTP Packetization Time, (xxiii) Policy Response Call Type, (xxiv) Calling Name, (xxv) Call Disconnect Reason Transmitted to Ingress, (xxvi) Call Disconnect Reason Transmitted to Egress, (xxvii) Script Name, (xxviii) Generic Number Number, (xxix) Generic Number Presentation Restriction Indicator; (xxx) Generic Number Numbering Plan, (xxxi) Generic Number Type, (xxxii) Ingress SRTP (STOP only), (xxxiii) Egress SRTP (STOP only); (xxxiv) Call Recorded Indicator, (xxxv) Transcode Indicator, (xxxvi) Emergency Indicator, (xxxvii) Ingress Zone Name, (xxxviii) Egress Zone Name, (xxxiv) Ingress Zone Id, (xxxv) Egress Zone Id, (xxxvi) Video Cac, (xxxvii) Ingress IP Prefix FoundTG Name, and (xxxviii) Ingress Trunk Group for PSX routing.

System Embodiment 1E. The system of System Embodiment 1D, wherein the automated test system determines that the first test case failed when the comparison of said one or more fields of the call detail record fields of the first test case call detail record and the first call detail record indicates that there is mismatch.

System Embodiment 1E1. The method of System Embodiment 1, wherein said determining, by the automated test system, whether or not the first SIP call processing entity failed the first test case based on a comparison of the first test case call flow record and the first reference call flow record includes: comparing features from the first test case call flow record to corresponding features of the first reference call flow record; assigning a penalty value to each compared feature which does not match; determining a test score for the first test case based on combined sum of the penalty values for each of the features which did not match; determining whether the test score is above a first threshold value; when the test score is determined to be above a first threshold value, determining that the first test case failed; and when the test score is not above the first threshold value, determining that the first test case passed.

System Embodiment 1E2. The system of System Embodiment 1E1, wherein the penalty value assigned is a function of the severity of the mismatch.

System Embodiment 1E3. The system of System Embodiment 1E2, wherein said first processor further controls the automated test system to perform the following additional operation: prior to assigning a penalty value to each compared feature which does not match, learning, by the automated test system, what penalty value to assign to a feature mismatch based on prior penalty value assignments received from an operator of the automated test system for the same feature mismatch with respect to the evaluation of different test cases than the first test case.

System Embodiment 1E4. The system of System Embodiment 1, wherein said determining, by the automated test system, whether or not the first SIP call processing entity failed the first test case based on a comparison of the first test case call flow record and the first reference call flow record includes: comparing features from the first test case call flow record to corresponding features of the first reference call flow record; identifying the features from the first test case call flow record which did not match the corresponding features of the first reference call flow record; and for each of the features from the first test case call flow record identified as not matching the corresponding feature of the first reference call flow record, determining whether the feature is a non-deterministic feature with respect to the configuration of the first SIP call processing entity and the input messages to the first SIP call processing entity received while processing the first SIP call; and when one or more non-matching features is determined to be a non-deterministic feature, re-executing the first test case and comparing the determined one or more non-deterministic features resulting from re-executed first test case to corresponding features in the reference first call flow record to determine whether there is a match.

System Embodiment 1F. The system of System Embodiment 1E, wherein said first processor further controls the automated test system to perform the following additional operations: generating, by the automated test system, a listing of the call detail record fields whose comparison resulted in a mismatch when one or more mismatches is detected; and storing, by the automated test system, the listing of the call detail record fields whose comparison resulted in a mismatch in an audit result file or record.

System Embodiment 1G. The system of System Embodiment 1, wherein determining, by the automated test system, whether or not the first SIP call processing entity failed the first test case is further based on a determination of whether or not the first test case did not complete successfully, the first test case will be determined to not have completed successfully when one or more of the following occur: (i) the execution of the test case does not complete (e.g., the test case is aborted during execution because of a failure experienced by a client device or the first SIP call processing device), (ii) an anomalous condition is detected after the completion of the execution of the test case (e.g., a coredump of the first SIP call processing device is detected or ASAN logs indicate issues occurred during the execution of the test case).

System Embodiment 2. The system of System Embodiment 1, wherein the first SIP call processing entity is a first Session Border Controller.

System Embodiment 3. The system of System Embodiment 2, wherein the first Session Border Controller is a virtual device implemented as an application executing on a compute node in a cloud.

System Embodiment 3A. The system of System Embodiment 2, wherein the first Session Border Controller is a hardware device.

System Embodiment 4. The system of System Embodiment 1, wherein the automated test system is implemented as a plurality of applications executing on one or more nodes or servers.

System Embodiment 4A. The system of System Embodiment 4, wherein the automated test system is implemented on a Kubernetes system including a plurality of Pods and a data lake or repository, said plurality of Pods being implemented on Kubernetes nodes of the Kubernetes system.

System Embodiment 4B. The system of System Embodiment 4A, wherein the plurality of Pods includes one or more of the following: a first Pod including a Trace record and Call Detail Record ingestion application, a second Pod including a traffic learning application, a third Pod including a backup assistant application, a fourth Pod including an anonymizer application, a fifth Pod including a production twinning application, a sixth Pod including a test generator application, a seventh Pod including a test runner application, an eighth Pod including a test auditor application.

System Embodiment 4C. The system of System Embodiment 4B, wherein one or more of the applications is implemented as a container.

System Embodiment 4D. The system of System Embodiment 4, wherein the plurality of applications includes one or more of the following: a first Pod including a Trace record and Call Detail Record ingestion application, a second Pod including a traffic learning application, a third Pod including a backup assistant application, a fourth Pod including an anonymizer application, a fifth Pod including a production twinning application, a sixth Pod including a test generator application, a seventh Pod including a test runner application, an eighth Pod including a test auditor application.

System Embodiment 5. The system of System Embodiment 1, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that extracted features included in the first test case call flow record do not match extracted features included in the first reference call flow record.

System Embodiment 5A. The system of System Embodiment 5, wherein extracted features included in a call flow record include call flow features which are deterministic based on the configuration of the SIP call processing entity and the messages received by that SIP call processing entity while processing the SIP call corresponding to the call flow record.

System Embodiment 5B. The system of System Embodiment 5, wherein the extracted features included in the first reference call flow record are features of a first SIP call processed by a second SIP call processing entity operating in a production network.

System Embodiment 5C. The system of System Embodiment 5B, wherein said extracted features included in the first reference call flow record include call flow features which are deterministic based on the configuration of the second SIP call processing entity and the input messages to the second SIP call processing entity received while processing the first SIP call; and wherein said extracted features included in the first test call flow record include call flow features which are deterministic based on the configuration of the first SIP call processing entity and the input messages to the first SIP call processing entity received while processing the first SIP test call.

System Embodiment 5C1. The system of System Embodiment 5C, wherein said extracted features included in the first reference call flow record further includes a first call flow feature which is non-deterministic with respect to the configuration of the second SIP call processing entity and the input messages to the second SIP call processing entity received while processing the first SIP call; and wherein said extracted features included in the first test call flow record further includes a first call flow feature corresponding to the first call flow feature of the first reference call flow record, said first call flow feature of the first test call flow record being non-deterministic with respect to the configuration of the first SIP call processing entity and the input messages to the first SIP call processing entity received while processing the first SIP test call.

System Embodiment 5C2. The system of System Embodiment 5C1, wherein the first call flow feature of the first reference call flow record is a routing feature which is probabilistic based on a fixed set of routing possibilities; wherein said first processor further controls the automated test system to perform the following additional operations: in response to determining, by the automated test system, that the first call flow feature of the first reference call flow record does not match the first call flow feature of the first test call flow, performing the following operations: repeat the execution of the first test case up to N times, N being an integer greater than zero, determine for each repeated execution of the first test case whether the first call flow feature from the repeated first test case matches the first call flow feature of the reference call; when it is determined that the first call flow feature of the repeated first test case matches the first call flow feature of the reference call, determining that the execution of the first test case resulted in a first call flow feature matching the first call flow feature of the first reference call flow; and when it is determined that the first call flow of the repeated first test case does not match the first call flow of the first reference call flow determining that the execution of the first test case did not result in the first call flow feature of the first reference call flow being matched.

System Embodiment 5D. The system of System Embodiment 1, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates one or more of the following: (i) that the number of SIP messages included in the first test case call flow record and the number of SIP messages included in the first reference call record are different, (ii) that a list of SIP header fields included in each of the SIP messages included in the first test case call flow record and a list of SIP header fields included in each of the SIP messages included in the first reference call flow record are different, and (iii) that a list of parameters included in each of the SIP header fields included in each of the SIP messages included in the first test case call flow record and a list of parameters included in each of the SIP header fields included in each of the SIP messages included in the first reference call flow record are different.

System Embodiment 6. The system of System Embodiment 1, wherein said first processor further controls the automated test system to perform the following additional operations: generating, by the automated test system, the first reference call flow record by extracting features from a first call detail record and a first trace record, said first call detail record and said first trace record both corresponding to a first SIP call processed by a second SIP call processing entity operating in a production network; storing, by the automated test system, the extracted features in the first reference call flow record, and wherein the features extracted from the first call detail record and the first trace record include for each call leg of the first SIP call: (i) a call leg identifier, (ii) a listing of SIP messages received by the second SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

System Embodiment 6A. The system of System Embodiment 6, wherein said production network is a non-test communications network being utilized by a customer (e.g., an Enterprise or network operator) in their normal course of business (i.e., production network is a customer's actual network being utilized for actual call traffic as opposed to a lab network utilized for testing with test call traffic); and wherein said production SIP call processing entity is a non-test SIP call production entity (e.g., the production SIP call processing entity is a commercially released SIP call processing entity as opposed to a pre-production SIP call processing entity utilized for testing prior to commercial release).

System Embodiment 6B. The system of System Embodiment 6, wherein said listing of SIP messages received by the second SIP call processing device for the call leg corresponding to the call leg identifier and an order or sequence in which the SIP messages for the call leg corresponding to the call leg identifier were received include SIP Request codes for SIP Request messages and SIP Response codes for SIP Response messages.

System Embodiment 7. The system of System Embodiment 6, wherein said generating, by the automated test system, a first test case call flow record for the first SIP test call corresponding to the first test case includes: generating, by the automated test system, the first test case call flow record by extracting features from a first test case call detail record and a first test case trace record, said first test case call detail record and said first test case trace record both corresponding to the first SIP test call processed by the first SIP call processing entity during the execution of the first test case, said first SIP call processing entity operating in a lab environment; storing, by the automated test system, the features extracted from the first test case call detail record and the first test case trace record in the first test case call flow record, and wherein the features extracted from the first test case call detail record and the first test case trace record include for each call leg of the first test case SIP call: (i) a call leg identifier, (ii) a listing of SIP messages received by the first SIP call processing device for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

System Embodiment 7A. The system of System Embodiment 7, wherein said first SIP call has multiple call legs; and wherein said first SIP test call has multiple call legs.

System Embodiment 7B. The system of System Embodiment 7, wherein the first test case trace record is generated by the first SIP call processing entity (e.g., while performing call processing operations for the first SIP test call).

System Embodiment 7B1. The system of System Embodiment 7, wherein the first test case trace record is generated by a device or entity external to the first SIP call processing entity which captures and stores signaling for the first SIP test call (e.g., in a Packet Capture (PCAP) file).

System Embodiment 7B2. The system of System Embodiment 7, wherein the first test case trace record includes signaling information for the first SIP test call captured by one or more of the following: (i) the first SIP call processing entity, and (ii) a device or entity external to the first SIP call processing entity which captures and stores signaling communications sent to and received from the first SIP call processing entity.

System Embodiment 8. The system of System Embodiment 7, wherein the features extracted from the first call detail record and the first trace record further include for each SIP message including a SDP message of each call leg of the first SIP call: (i) a listing of SDP session description fields included in the SDP message, (ii) a listing of SDP time description fields included in the SDP message, and (iii) a listing of SDP media description fields present in the SDP message; and wherein the features extracted from the first test case call detail record and the first test case trace record further include for each SIP message including a SDP message of each call leg of the first SIP test call: (i) a listing of SDP session description fields included in the SDP message, (ii) a listing of SDP time description fields included in the SDP message, and (iii) a listing of SDP media description fields present in the SDP message.

System Embodiment 9. The system of System Embodiment 8, wherein the features extracted from the first call detail record and the first trace record further include for each SIP message including a SDP message of each call leg of the first SIP call: (i) a listing of parameters corresponding to each of the session description fields in the SDP message, (ii) a listing of the SDP attributes included in the SDP message, and (iii) a listing of codecs included in the SDP message and the order in which the codecs are listed; and wherein the features extracted from the first test case call detail record and the first test case trace record further include for each SIP message including a SDP message of each call leg of the first SIP test call: (i) a listing of parameters corresponding to each of the session description fields in the SDP message, (ii) a listing of the SDP attributes included in the SDP message, and (iii) a listing of codecs included in the SDP message and the order in which the codecs are listed.

System Embodiment 9A. The system of System Embodiment 9, wherein the extracted features from the first call detail record and the first trace record do not include: IP address values included in a SIP message, contact addresses (e.g., SIP URL values) included in a SIP message, values of the branch and tag parameters included in a via header of a SIP message, ordering of header fields in a SIP message, and ordering of SDP fields in a SDP message included in a SIP message.

System Embodiment 9B. The system of System Embodiment 9A, wherein the extracted features from the first test case call detail record and the first test case trace record do not include: IP address values included in a SIP message, contact addresses (e.g., SIP URL values) included in a SIP message, values of the branch and tag parameters included in a via header of a SIP message, ordering of header fields in a SIP message, and ordering of SDP fields in a SDP message included in a SIP message.

System Embodiment 9C. The system of System Embodiment 9B, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that the extracted features included in the first test case call flow record do not match the extracted features included in the first reference call flow record.

System Embodiment 10. The system of System Embodiment 6, wherein the first SIP call processing entity is a first Session Border Controller; wherein the second SIP call processing entity is a second Session Border Controller; and wherein the first Session Border Controller includes a different version or release of software than the second Session Border Controller.

System Embodiment 10A. The system of System Embodiment 10, wherein said first Session Border Controller includes a modified version of the software included in the second Session Border Controller (e.g., first SBC includes version 2.0 of software which includes updates or changes to the version 1.0 software used in the second SBC.

System Embodiment 11. The system of System Embodiment 1, wherein the first test case includes a first SIPp test script.

System Embodiment 12. The system of System Embodiment 6, wherein said first processor further controls the automated test system to perform the following additional operations: prior to configuring the first SIP call processing entity for the first test case, performing, by the automated test system, a twinning configuration procedure, said twinning configuration procedure including: downloading from the second SIP call processing entity, by the automated test system, first configuration information for the second SIP call processing entity, said first configuration information corresponding to configuration information for the second SIP call processing entity when the second SIP call processing entity processed the first SIP call; and generating transforms to modify the downloaded first configuration information to generate a first test configuration for the first SIP call processing entity, said transforms including one or more SIP signaling port transforms (e.g., transforms for configured SIP signaling port(s) in the first configuration information), one or more remote device contact transforms (e.g., transforms for configured contact information for PSX server(s), Diameter Rx server(s), DNS server(s), ENUM server(s) in the first configuration information), and one or more IP interface transforms (e.g., transforms for configured IP interface(s) in the first configuration information).

System Embodiment 13. The system of System Embodiment 12, wherein said automatically configuring, by the automated test system, the first SIP call processing entity for the first test case, includes: loading second configuration information onto the first SIP call processing entity, by the automated test system, said second configuration information including at least some of said first configuration information; and applying said generated transforms to modify first configuration information included in the second configuration to generate a first test configuration for the first SIP call processing entity.

System Embodiment 14. The system of System Embodiment 1, wherein said executing, by the automated test system, the first test case further includes: emulating, by the first automated test system, one or more devices or entities which communicate with the first SIP call processing entity during the execution of the first test case.

System Embodiment 15. The system of System Embodiment 14, wherein emulating the one or more devices or entities includes one or more of the following: (i) exchanging, by the automated test system, one or more SIP messages (e.g., SIP requests and SIP responses) with the first SIP call processing entity as indicated in a test script for the first test case, (ii) receiving by the automated test system one or more requests from the first SIP call processing entity sent to the one or more emulated devices or entities, and (iii) responding as indicated in the test script for the first test case to the received requests from the first SIP call processing entity.

System Embodiment 16. The system of System Embodiment 15, wherein said emulating, by the first automated test system, one or more devices or entities which communicate with the first SIP call processing entity during the execution of the first test case further includes emulating one or more of the following: a SIP communications device, a SIP client device, a SIP endpoint device, a SIP server, a peer SIP call processing entity, a Session Border Controller (SBC), a Private Branch Exchange (PBX), a Policy and Routing (PSX) server, a Domain Namer Server (DNS), an Electronic Number Mapping System (ENUM) server, a Media Server, a Diameter Rx server, Radius server, and security server.

System Embodiment 17. The system of System Embodiment 14, wherein said one or more devices or entities includes: (i) emulating a first SIP communications device, and (ii) emulating a second SIP communications device, the first SIP communications device being emulated and said second SIP communications device being emulated utilizing Session Initiation Protocol messages to communicate with the first SIP call processing entity; wherein said emulating, by the first automated test system, a first SIP communications device includes exchanging SIP messages with the first SIP call processing entity to establish a first SIP call; and wherein said emulating, by the first automated test system, a second SIP communications device includes exchanging SIP messages with the first SIP call processing entity to establish the first SIP call; and wherein said sending one or more SIP messages to the first SIP call processing entity includes sending a first SIP INVITE message to the first SIP call processing entity from a first IP address corresponding to the emulated first SIP device.

System Embodiment 18. The system of System Embodiment 17, wherein the SIP messages exchanged between the automated test system and the first SIP call processing entity are included in a test script for the first test case which is executed by the automated test system during the execution of the first test case; and wherein the SIP messages exchanged between the automated test system and the first SIP call processing entity are included in the test script for the first test case which is executed by the automated test system during the execution of the first test case.

System Embodiment 19. The system of System Embodiment 17, wherein the first SIP communications device and the second SIP communications devices being emulated by the automated test system are smartphones each executing a VOIP application utilizing SIP messaging.

System Embodiment 20. The system of System Embodiment 17, wherein the first SIP communications device is one of the following: a SIP endpoint device (e.g., smartphone), a SBC, an Interconnect Border Control Function entity or device, a SIP Call Routing Engine, and a SIP application server; and wherein the second SIP communications device is one of the following: a SIP endpoint device (e.g., smartphone), a SBC, an Interconnect Border Control Function entity or device, a SIP Call Routing Engine, and a SIP application server.

System Embodiment 21. The system of System Embodiment 1, wherein said executing, by the automated test system, the first test case further includes: controlling, by the first automated test system, one or more devices or entities which communicate with the first SIP call processing entity during the execution of the first test case; and wherein controlling the one or more devices or entities includes one or more of the following: (i) configuring the one or more devices or entities based on configuration information included in the first test script (e.g., using collected meta data and/or transforms for the lab environment), (ii) controlling a device or entity to exchange one or more SIP messages with the first SIP call processing entity as indicated in a test script for the first test case, (iii) controlling a device or entity to receive one or more requests from the first SIP call processing entity sent to the device or entity, and (iv) controlling the device or entity to respond as indicated in the test script for the first test case to the received requests from the first SIP call processing entity.

System Embodiment 22. The system of System Embodiment 6, wherein said first SIP call processing entity is a SIP Call Routing Engine, and wherein said second SIP call processing entity is a SIP Call Routing Engine.

System Embodiment 23. The system of System Embodiment 6, wherein said first SIP call processing entity is a SIP Application Server; and wherein said second SIP call processing entity is a SIP Application Server.

System Embodiment 24. The system of System Embodiment 6, wherein said first SIP call processing entity is a Policy and Routing (PSX) Server; and wherein said second SIP call processing entity is a SIP Policy and Routing Server.

System Embodiment 25. An automated test system for testing a first Session Initiation Protocol (SIP) call processing entity (e.g., SBC) in a lab environment comprising: memory; and a first processor, said first processor controlling the automated test system to perform the following operations: generating, by the test generator of an automated test system, a first test case based on first reference call flow record for the first call or a trace record for the first call; executing, by the automated test system, the first test case, said executing the first test case including sending one or more SIP messages to the first SIP call processing entity; generating, by the automated test system, a first test case call flow record for a first SIP test call corresponding to the first test case; and determining, by the automated test system, whether or not the first SIP call processing entity failed the first test case based on a comparison of the first test case call flow record and the first reference call flow record for the first call.

System Embodiment 26. An automated test system for testing a first Session Initiation Protocol (SIP) call processing entity (e.g., SBC) in a lab environment comprising: memory; and a first processor, said first processor controlling the automated test system to perform the following operations: performing, by the automated test system, a twinning configuration procedure on a second SIP call processing entity (e.g. production SBC), said second SIP call processing entity operating in a production network; generating, by the automated test system, configuration information for use in configuring the first SIP call processing entity in the lab environment for a plurality of test cases based on configuration information obtained during said twinning configuration procedure, said plurality of test cases including a first test case based on a first reference call flow record for a first SIP call processed by the second SIP call processing entity or based on a first trace record for the first SIP call; storing, by the automated test system, said generated configuration information; and executing, by the automated test system, the first test case, said executing the first test case including sending one or more SIP messages to the first SIP call processing entity while said first SIP call processing entity is operating in said lab environment, said first SIP call processing entity being configured using said generated configuration information.

System Embodiment 27. The system of System Embodiment 26, wherein said twinning procedure includes: downloading from the second SIP call processing entity, by the automated test system, first configuration information for the second SIP call processing entity, said first configuration information corresponding to configuration information for the second SIP call processing entity when the second SIP call processing entity processed a first plurality of SIP calls, said first plurality of SIP calls including the first SIP call; and generating transforms to modify the downloaded first configuration information to generate a first test configuration for the first SIP call processing entity, said transforms including one or more SIP signaling port transforms (e.g., transforms for configured SIP signaling port(s) in the first configuration information), one or more remote device contact transforms (e.g., transforms for configured contact information for PSX server(s), Diameter Rx server(s), DNS server(s), ENUM server(s) in the first configuration information), and one or more IP interface transforms (e.g., transforms for configured IP interface(s) in the first configuration information).

System Embodiment 28. The system of System Embodiment 27, wherein said first processor further controls the automated test system to perform the following additional operation: applying said generated transforms to modify first configuration information included in the downloaded configuration information from the second SIP call processing entity to generate the first test configuration for the first SIP call processing entity.

System Embodiment 29. The system of System Embodiment 28, wherein said first processor further controls the automated test system to perform the following additional operation: prior to executing said first test case, loading the first test configuration onto the first SIP call processing entity.

System Embodiment 30. The system of System Embodiment 28, wherein said applying said generated transforms to modify first configuration information included in the downloaded configuration information from the second SIP call processing entity to generate the first test configuration for the first SIP call processing entity includes: applying at least one SIP signaling port transforms which modifies an IP address (e.g., a private IPv4 address) for a first SIP signaling port on the second SIP call processing device to a different IP address (e.g., a different private IPv4 address) to be used by a first SIP signaling port on the first SIP call processing device; applying at least one remote device contact transform which modifies an Internet Protocol address for a first remote device in the first configuration information to a different IP address for a first test remote device (e.g., modifying a production DNS server IP address to a lab DNS server IP address); and applying at least IP interface transform which modifies an IP address (e.g., an IPv6 address) for a first IP interface on the second SIP call processing device to a different IP address (e.g., a different IPv6 address) to be used by a first IP interface on the first SIP call processing device.

System Embodiment 31. The system of System Embodiment 26, wherein said executing, by the automated test system, the first test case further includes: emulating, by the first automated test system, one or more devices or entities which communicate with the first SIP call processing entity during the execution of the first test case.

System Embodiment 32. The system of System Embodiment 31, wherein emulating the one or more devices or entities includes one or more of the following: (i) exchanging, by the automated test system, one or more SIP messages (e.g., SIP requests and SIP responses) with the first SIP call processing entity as indicated in a test script for the first test case, (ii) receiving by the automated test system one or more requests from the first SIP call processing entity sent to the one or more emulated devices or entities, and (iii) responding as indicated in the test script for the first test case to the received requests from the first SIP call processing entity.

System Embodiment 33. The system of System Embodiment 31, wherein said emulating, by the first automated test system, one or more devices or entities which communicate with the first SIP call processing entity during the execution of the first test case further includes emulating one or more of the following: a SIP communications device, a SIP client device, a SIP endpoint device, a SIP server, a peer SIP call processing entity, a Session Border Controller (SBC), a Private Branch Exchange (PBX), a Policy and Routing (PSX) server, a Domain Namer Server (DNS), an Electronic Number Mapping System (ENUM) server, a Media Server, a Diameter Rx server, Radius server, and security server.

System Embodiment 34. The system of System Embodiment 33, wherein the first SIP communications device is one of the following: a SIP endpoint device (e.g., smartphone), a SBC, an Interconnect Border Control Function entity or device, a SIP Call Routing Engine, and a SIP application server; and wherein the second SIP communications device is one of the following: a SIP endpoint device (e.g., smartphone), a SBC, an Interconnect Border Control Function entity or device, a SIP Call Routing Engine, and a SIP application server.

System Embodiment 35. The system of System Embodiment 26, wherein said executing, by the automated test system, the first test case further includes: controlling, by the first automated test system, one or more devices or entities which communicate with the first SIP call processing entity during the execution of the first test case; and wherein controlling the one or more devices or entities includes one or more of the following: (i) configuring the one or more devices or entities based on configuration information included in the first test script (e.g., using collected meta data and/or transforms for the lab environment), (ii) controlling a device or entity to exchange one or more SIP messages with the first SIP call processing entity as indicated in a test script for the first test case, (iii) controlling a device or entity to receive one or more requests from the first SIP call processing entity sent to the device or entity, and (iv) controlling the device or entity to respond as indicated in the test script for the first test case to the received requests from the first SIP call processing entity.

System Embodiment 36. The system of System Embodiment 26, wherein said first processor further controls the automated test system to perform the following additional operations: performing, by the automated test system, a second twinning configuration procedure on a third SIP call processing entity (e.g. production SBC), said third SIP call processing entity operating in a different production network than said second SIP call processing entity; generating, by the automated test system, second configuration information for use in configuring the first SIP call processing entity in the lab environment for a second plurality of test cases based on configuration information obtained during said second twinning configuration procedure, said second plurality of test cases including a second test case based on a second reference call flow record for a second SIP call processed by the third SIP call processing entity or based on a second trace record for the second SIP call; executing, by the automated test system, the second test case, said executing the second test case including sending one or more SIP messages to the first SIP call processing entity while said first SIP call processing entity is operating in said lab environment, said first SIP call processing entity being configured using said generated second configuration information.

System Embodiment 37. The system of System Embodiment 26, wherein said first processor further controls the automated test system to perform the following additional operations: performing, by an automated test system, a second twinning configuration procedure on the second SIP call processing entity (e.g. production SBC) after said configuration of the second SIP call processing entity has been modified; generating, by the automated test system, second configuration information for use in configuring the first SIP call processing entity in the lab environment for a second plurality of test cases based on configuration information obtained during said second twinning configuration procedure, said second plurality of test cases including a second test case based on a second reference call flow record for a second SIP call processed by the second SIP call processing entity or based on a second trace record for the second SIP call; and executing, by the automated test system, the second test case, said executing the second test case including sending one or more SIP messages to the first SIP call processing entity while said first SIP call processing entity is operating in said lab environment, said first SIP call processing entity being configured using said generated second configuration information.

LISTING OF EXEMPLARY NUMBERED
NON-TRANSITORY COMPUTER READABLE
MEDIUM EMBODIMENTS

Non-transitory Computer Readable Medium Embodiment 1. A non-transitory computer readable medium including a first set of computer executable instructions which when executed by a processor of an automated test system cause the automated test system to perform the following operations: generating configuration information for use in configuring a first SIP call processing entity for a first test case, said first test case being based on a first reference call flow record; executing the first test case, said executing the first test case including sending one or more SIP messages to the first SIP call processing entity; generating a first test case call flow record for a first SIP test call corresponding to the first test case; and determining whether or not the first SIP call processing entity failed the first test case based on a comparison of the first test case call flow record and the first reference call flow record.

Non-transitory Computer Readable Medium Embodiment 2. A non-transitory computer readable medium including a first set of computer executable instructions which when executed by a processor of an automated test system cause the automated test system to perform the following operations: performing, by the automated test system, a twinning configuration procedure on a second SIP call processing entity (e.g. production SBC), said second SIP call processing entity operating in a production network; generating, by the automated test system, configuration information for use in configuring the first SIP call processing entity in the lab environment for a plurality of test cases based on configuration information obtained during said twinning configuration procedure, said plurality of test cases including a first test case based on a first reference call flow record for a first SIP call processed by the second SIP call processing entity or based on a first trace record for the first SIP call; storing, by the automated test system, said generated configuration information; and executing, by the automated test system, the first test case, said executing the first test case including sending one or more SIP messages to the first SIP call processing entity while said first SIP call processing entity is operating in said lab environment, said first SIP call processing entity being configured using said generated configuration information.

While various embodiments have been discussed above and in the claims below, it should be appreciated that not necessarily all embodiments include the same features and some of the features described herein are not necessary but can be desirable in some embodiments. Numerous additional features, embodiments and benefits of various embodiments are discussed in the claims which follow.

The techniques of various embodiments may be implemented using software, hardware and/or a combination of software and hardware. Various embodiments are directed to apparatus, e.g., systems/devices, Kubernetes systems, Kubernetes nodes, automated test systems, database systems, data lakes, call processing devices, SIP call processing devices, session border controllers, communications devices, network nodes, network equipment devices, and/or servers. Various embodiments are also directed to methods, e.g., method of controlling and/or operating devices such as, e.g., systems/devices, Kubernetes systems, Kubernetes nodes, automated test systems, database systems, data lakes, call processing devices, SIP call processing devices, session border controllers, communications devices, network nodes, network equipment devices, and/or servers. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., system/device, Kubernetes systems, Kubernetes nodes, automated test system or device, database system, data lake, call processing device, SIP call processing device, session border controller, communications device, network node, network equipment device, and/or server, including a processor configured to implement one, multiple or all of the steps of one or more methods of the invention.

In some embodiments, the processor or processors, e.g., CPUs, of one or more devices, e.g., computing nodes such as e.g., systems/devices, Kubernetes systems, Kubernetes nodes, automated test systems, database systems, data lakes, call processing devices, SIP call processing devices, session border controllers, communications devices, network nodes, network equipment devices, and/or servers. are configured to perform the steps of the methods described as being performed by the computing nodes, e.g., systems/devices, Kubernetes systems, Kubernetes nodes, automated test systems, database systems, data lakes, call processing devices, SIP call processing devices, session border controllers, communications devices, network nodes, network equipment devices, and/or servers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as e.g., systems/devices, Kubernetes systems, Kubernetes nodes, automated test systems, database systems, data lakes, call processing devices, SIP call processing devices, session border controllers, communications devices, network nodes, network equipment devices, and/or servers with a processor which includes a component corresponding to each of the steps of the various described methods performed by the device in which the processor is included. In some but not all embodiments a device, e.g., systems/devices, Kubernetes systems, Kubernetes nodes, automated test systems, database systems, data lakes, call processing devices, SIP call processing devices, session border controllers, communications devices, network nodes, network equipment devices, and/or servers, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., systems/devices, Kubernetes systems, Kubernetes nodes, automated test systems, database systems, data lakes, call processing devices, SIP call processing devices, session border controllers, communications devices, network nodes, network equipment devices, and/or servers described in the present application.

Numerous additional variations on the methods and apparatus of the various embodiments described above will be apparent to those skilled in the art in view of the above description. Numerous additional embodiments, within the scope of the present invention, will be apparent to those of ordinary skill in the art in view of the above description and the claims which follow. Such variations and embodiments are to be considered within the scope of the invention.

What is claimed is:

1. A method of testing a first Session Initiation Protocol (SIP) call processing entity in a lab environment comprising:
generating, by an automated test system, a first reference call flow record by: (i) extracting features from a first call detail record and a first trace record, and (ii) storing the extracted features in the first reference call flow record, said first call detail record and said first trace record both corresponding to a first SIP call, said first SIP call having been processed by a second SIP call processing entity operating in a production network;
generating, by the automated test system, a first test case based on the first reference call flow record for the first SIP call or the first trace record for the first SIP call;
executing, by the automated test system, the first test case, said executing the first test case including sending one or more SIP messages to the first SIP call processing entity;
generating, by the automated test system, a first test case call flow record for a first SIP test call corresponding to the first test case; and
determining, by the automated test system, whether or not the first SIP call processing entity failed the first test case based on a comparison of the first test case call flow record and the first reference call flow record; and
wherein the features extracted from the first call detail record and the first trace record include for each call leg of the first SIP call: (i) a call leg identifier, (ii) a listing of SIP messages received by the second SIP call processing entity for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

2. The method of claim 1,
wherein the first reference call flow record is one of a plurality of call flow records learned by the automated test system based on continuous in-production sampling of real network traffic.

3. The method of claim 2,
wherein the plurality of learned call flow records is a stochastic traffic model of a production network in terms of call flows processed by a SIP call processing entity of the production network.

4. The method of claim 1,
wherein the first reference call flow record is one of a plurality of call flow records generated from a plurality of non-test SIP calls processed by said second SIP call processing entity operating in the production network, said second SIP call processing entity being a commercially released SIP call processing entity, said production network being a non-test customer network;
wherein said plurality of call flow records each include a unique set of features extracted from a call detail record and a trace record for the SIP call to which the call flow record corresponds; and
wherein the first test case is one of a plurality of test cases generated from the plurality of call flow records.

5. The method of claim 4, wherein said determining, by the automated test system, whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that extracted features included in the first test case call flow record do not match the extracted features included in the first reference call flow record.

6. The method of claim 4,
wherein the first SIP call processing entity is a first Session Border Controller; and
wherein the second SIP call processing entity is a second Session Border Controller.

7. The method of claim 6, wherein the first Session Border Controller is a virtual device implemented as an application executing on a compute node in a cloud.

8. The method of claim 7, wherein the automated test system is implemented on a Kubernetes system including a plurality of Pods and a data lake or repository, said plurality of Pods being implemented on Kubernetes nodes of the Kubernetes system.

9. The method of claim 1, wherein said generating, by the automated test system, a first test case call flow record for the first SIP test call corresponding to the first test case includes:
generating, by the automated test system, the first test case call flow record by: (i) extracting features from a first test case call detail record and a first test case trace record, and (ii) storing the features extracted from the first test case call detail record and the first test case trace record in the first test case call flow record, said first test case call detail record and said first test case trace record both corresponding to the first SIP test call processed by the first SIP call processing entity during the execution of the first test case, said first SIP call processing entity operating in the lab environment;

wherein the features extracted from the first test case call detail record and the first test case trace record include for each call leg of the first SIP test call: (i) a call leg identifier, (ii) a listing of SIP messages received by the first SIP call processing entity for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

10. The method of claim 1, further comprising:

prior to executing the first test case, generating, by the automated test system, configuration information for use in configuring the first SIP call processing entity for the first test case based on configuration information of the second SIP call processing entity when the second SIP call processing entity processed the first SIP call; and using said generated configuration information to configure the first SIP call processing entity for the first test case.

11. The method of claim 1, wherein the first SIP call processing entity and the second SIP call processing entity are both a first type of SIP call processing entity, the first type of SIP call processing entity being one of the following: (i) a SIP Call Routing Engine, (ii) a SIP Application Server, or (iii) a Policy and Routing Server.

12. An automated test system for testing a first Session Initiation Protocol (SIP) call processing entity in a lab environment comprising:

memory; and a first processor, said first processor controlling the automated test system to perform the following operations:
generating a first reference call flow record by: (i) extracting features from a first call detail record and a first trace record, and (ii) storing the extracted features in the first reference call flow record, said first call detail record and said first trace record both corresponding to a first SIP call, said first SIP call having been processed by a second SIP call processing entity operating in a production network;

generating a first test case based on the first reference call flow record for the first SIP call or the first trace record for the first SIP call;

executing the first test case, said executing the first test case including sending one or more SIP messages to the first SIP call processing entity;

generating a first test case call flow record for a first SIP test call corresponding to the first test case; and determining whether or not the first SIP call processing entity failed the first test case based on a comparison of the first test case call flow record and the first reference call flow record; and wherein the features extracted from the first call detail record and the first trace record include for each call leg of the first SIP call: (i) a call leg identifier, (ii) a listing of SIP messages received by the second SIP call processing entity for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

13. The automated test system of claim 12, wherein the first reference call flow record is one of a plurality of call flow records learned by the automated test system based on continuous in-production sampling of real network traffic.

14. The automated test system of claim 13, wherein the plurality of learned call flow records is a stochastic traffic model of a production network in terms of call flows processed by a SIP call processing entity of the production network.

15. The automated test system of claim 12, wherein the first reference call flow record is one of a plurality of call flow records generated from a plurality of non-test SIP calls processed by said second SIP call processing entity operating in the production network, said second SIP call processing entity being a commercially released SIP call processing entity, said production network being a non-test customer network;

wherein said plurality of call flow records each include a unique set of features extracted from a call detail record and a trace record for the SIP call to which the call flow record corresponds; and wherein the first test case is one of a plurality of test cases generated from the plurality of call flow records.

16. The automated test system of claim 15, wherein said determining whether or not the first SIP call processing entity failed the first test case based on a comparison of the first test case call flow record and the first reference call flow record includes: determining that the first SIP call processing entity failed the first test case when the comparison of the first test case call flow record and the first reference call flow record indicates that extracted features included in the first test case call flow record do not match the extracted features included in the first reference call flow record.

17. The automated test system of claim 16, wherein the first SIP call processing entity is a first Session Border Controller; and wherein the second SIP call processing entity is a second Session Border Controller.

18. The automated test system of claim 17, wherein the first Session Border Controller is a virtual device implemented as an application executing on a compute node in a cloud.

19. The automated test system of claim 12, wherein said generating a first test case call flow record for the first SIP test call corresponding to the first test case includes:

generating the first test case call flow record by: (i) extracting features from a first test case call detail record and a first test case trace record, and (ii) storing the features extracted from the first test case call detail record and the first test case trace record in the first test case call flow record, said first test case call detail record and said first test case trace record both corresponding to the first SIP test call processed by the first SIP call processing entity during the execution of the first test case, said first SIP call processing entity operating in the lab environment;

wherein the features extracted from the first test case call detail record and the first test case trace record include for each call leg of the first SIP test call: (i) a call leg identifier, (ii) a listing of SIP messages received by the first SIP call processing entity for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

20. The automated test system of claim 12, wherein the automated test system is implemented on a Kubernetes system including a plurality of Pods and a data lake or repository, said plurality of Pods being implemented on Kubernetes nodes of the Kubernetes system.

21. The automated test system of claim 12,
wherein, prior to executing the first test case, the first processor further controls the automated test system to perform the additional operations of generating configuration information for use in configuring the first SIP call processing entity for the first test case based on configuration information of the second SIP call processing entity when the second SIP call processing entity processed the first SIP call; and
using said generated configuration information to configure the first SIP call processing entity for the first test case.

22. The automated test system of claim 12,
wherein the first SIP call processing entity and the second SIP call processing entity are both a first type of SIP call processing entity, the first type of SIP call processing entity being one of the following: (i) a SIP Call Routing Engine, (ii) a SIP Application Server, or (iii) a Policy and Routing Server.

23. A non-transitory computer readable medium including a first set of computer executable instructions which when executed by a processor of an automated test system cause the automated test system to perform the following operations:
generating a first reference call flow record by: (i) extracting features from a first call detail record and a first trace record, and (ii) storing the extracted features in the first reference call flow record, said first call detail record and said first trace record both corresponding to a first SIP call, said first SIP call having been processed by a second SIP call processing entity operating in a production network;
generating a first test case based on the first reference call flow record for the first SIP call or the first trace record for the first SIP call;
executing the first test case, said executing the first test case including sending one or more SIP messages to the first SIP call processing entity;
generating a first test case call flow record for a first SIP test call corresponding to the first test case; and
determining whether or not the first SIP call processing entity failed the first test case based on a comparison of the first test case call flow record and the first reference call flow record; and
wherein the features extracted from the first call detail record and the first trace record include for each call leg of the first SIP call: (i) a call leg identifier, (ii) a listing of SIP messages received by the second SIP call processing entity for the call leg corresponding to the call leg identifier and an order or sequence in which the SIP messages for the call leg corresponding to the call leg identifier were received, (iii) a listing of SIP header fields included in each of the received SIP messages for the call leg corresponding to the call leg identifier; and (iv) a listing of SIP header field parameters included in each SIP header field of each of the received SIP messages for the call leg corresponding to the call leg identifier.

\* \* \* \* \*